United States Patent [19]

Jennings

[11] Patent Number: 4,930,102
[45] Date of Patent: May 29, 1990

[54] DYNAMIC ACTIVITY-CREATING DATA-DRIVEN COMPUTER ARCHITECTURE

[75] Inventor: Glenn A. Jennings, Riverside, Calif.

[73] Assignee: The Regents of the University of California, Alameda, Calif.

[21] Appl. No.: 914,738

[22] Filed: Oct. 6, 1986

Related U.S. Application Data

[62] Division of Ser. No. 490,154, Apr. 29, 1983.

[51] Int. Cl.$^5$ .............................................. G11C 7/00
[52] U.S. Cl. ................... 364/900; 364/926.1; 364/926.4; 364/926.5; 364/939; 364/939.5; 364/965; 364/965.6; 364/965.7
[58] Field of Search ................... 365/219, 221, 78; 364/200, 900

[56] References Cited

U.S. PATENT DOCUMENTS

| | | | |
|---|---|---|---|
| 4,156,288 | 5/1979 | Spandorfer | 365/78 |
| 4,236,225 | 11/1980 | Jansen et al. | 364/900 |
| 4,833,655 | 5/1989 | Wolf et al. | 365/221 |

Primary Examiner—Gareth D. Shaw
Assistant Examiner—Kevin A. Kriess
Attorney, Agent, or Firm—Poms, Smith, Lande & Rose

[57] ABSTRACT

A computer architecture wherein data inputs causes the dynamic creation of appropriate activities employing stored functions as necessary to accomplish the desired end result for the data. The architecture employs a large scale multi-processing environment for parallel computation. A fast forward propogating queue structure and improved interfacing crossbar are employed.

10 Claims, 59 Drawing Sheets

EACH FCONT = 0  WILL INTRODUCE ONE MULTIPLEXER DELAY TIME
EACH FCONT = 1  WILL INTRODUCE ONE LATCH STAGE IN PATH OF DATA WHICH CANNOT BE BYPASSED.

Fig. 22.

| | | INDEPENDENT VARIABLES | | RESULTING BEHAVIOUR | | |
|---|---|---|---|---|---|---|
| STAGE #1 | STATE #1 | DATA PRESENT | NEXT "WILL ACCEPT" | FLAG "I WILL ACCEPT" | SHIFT DATA OUT | GATE INCOMING DATA TO THE LATCHES | ENABLE CLOCK |
| | STATE #2 | DATA PRESENT | NEXT "WILL NOT ACCEPT" | FLAG "I WILL NOT ACCEPT" | SHIFT NOTHING OUT (PRESENT "ABSENT" TO OUTPUT) | DON'T ACCEPT INCOMING DATA | INHIBIT CLOCK |
| | STATE #3 | NO DATA PRESENT | NEXT "WILL ACCEPT" | FLAG "I WILL ACCEPT" | PROPAGATE INCOMING DATA DIRECTLY TO OUTPUT (BYPASS THE LATCHES) | DON'T LATCH INCOMING DATA (STAGE REMAINS EMPTY) | |
| | STATE #4 | NO DATA PRESENT | NEXT "WILL NOT ACCEPT" | FLAG "I WILL ACCEPT" | SHIFT NOTHING OUT | GATE INCOMING DATA TO THE LATCHES | ENABLE CLOCK |

NOTE: S MAY EQUAL ZERO (∅)

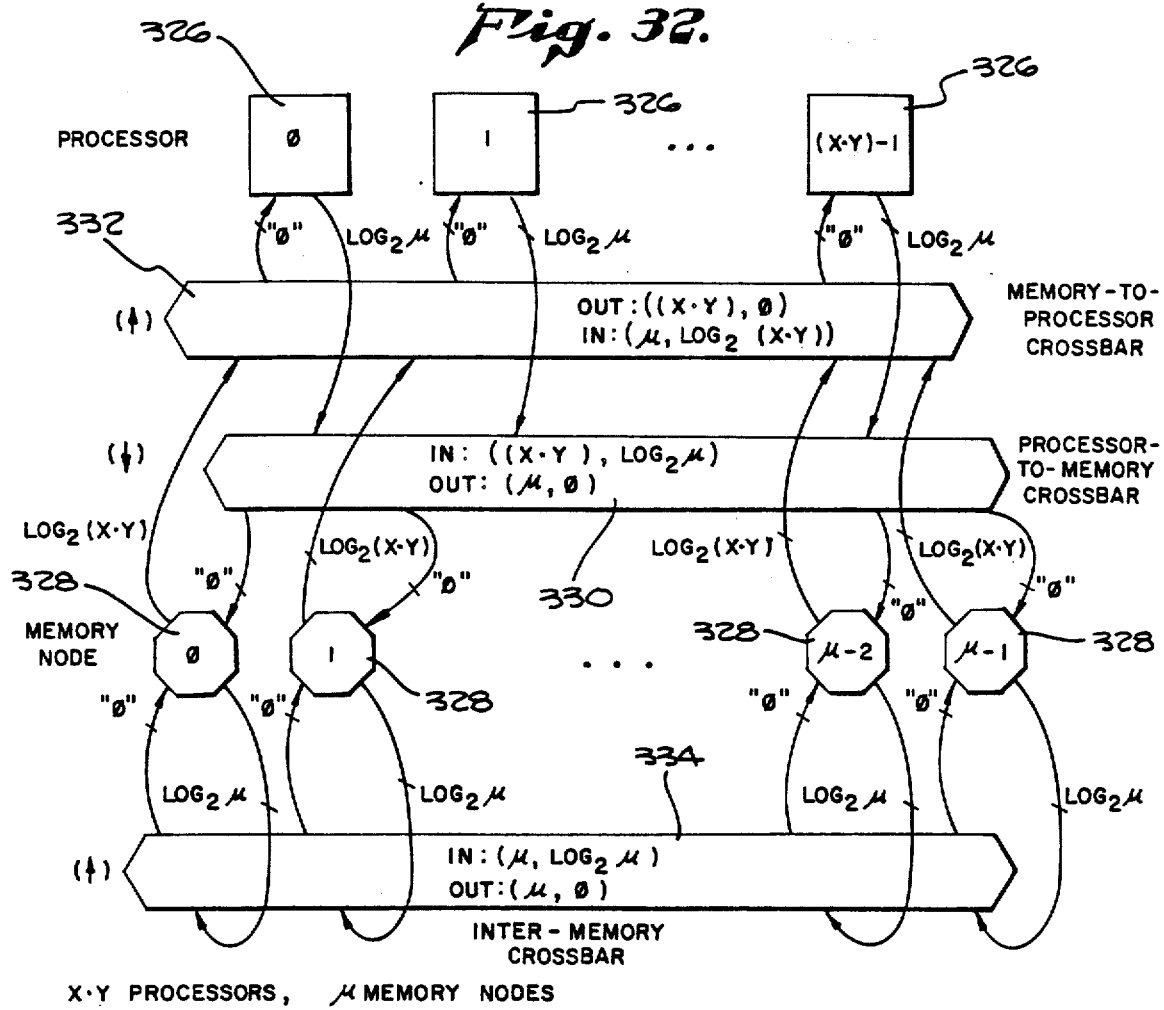
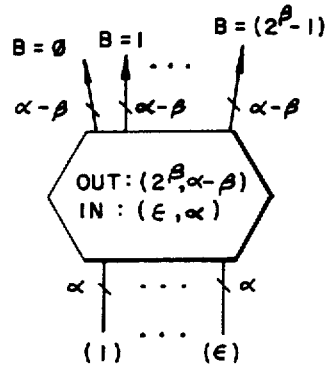
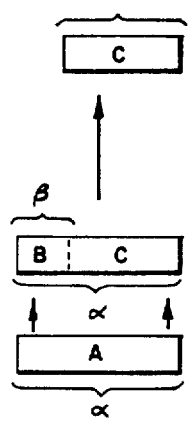
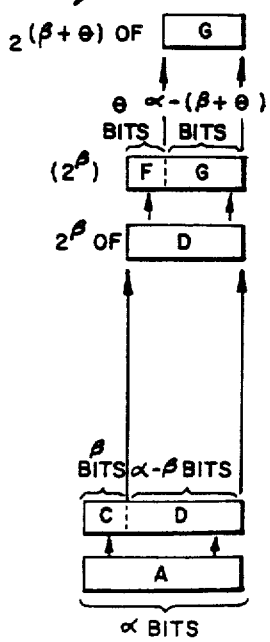

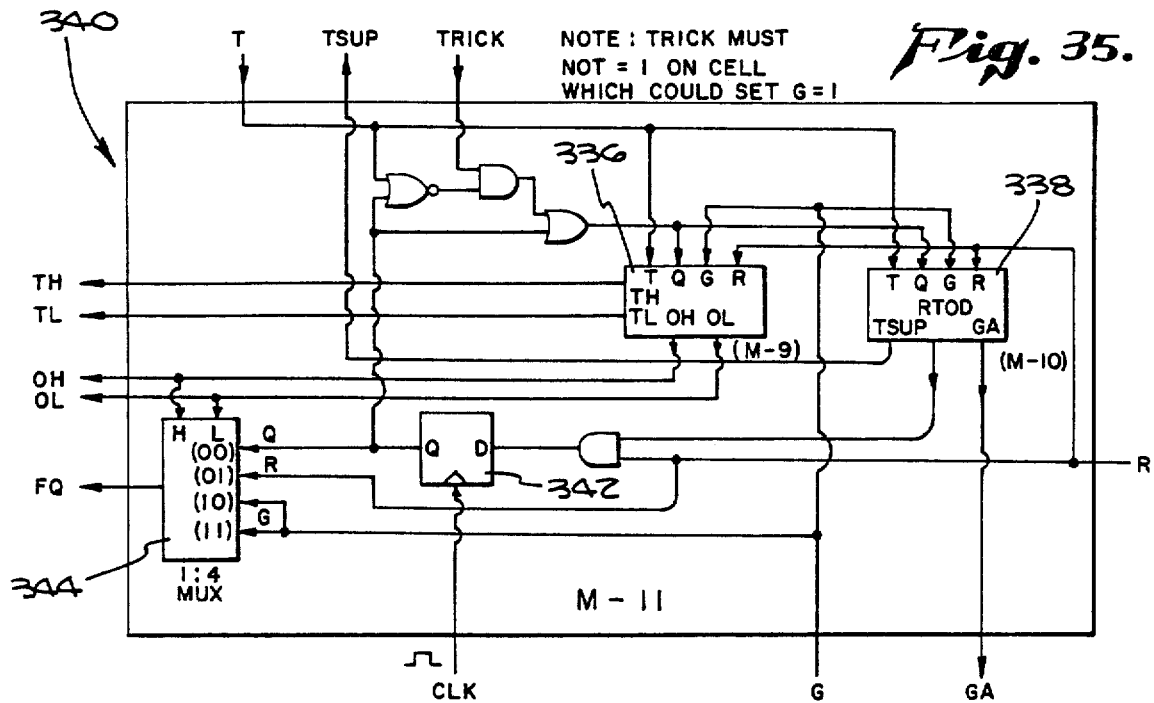
Fig. 35.
| OH= | OL= | FQ= |
|---|---|---|
| 1 | 1 | G |
| 1 | 0 | G |
| 0 | 1 | R |
| 0 | 0 | Q |
Fig. 37.
| TH= | TL= | TD= |
|---|---|---|
| 1 | 1 | G |
| 1 | 0 | G |
| 0 | 1 | R |
| 0 | 0 | Q |
Fig. 38.
| OH= | OL= | FD= |
|---|---|---|
| 1 | 1 | G |
| 1 | 0 | G |
| 0 | 1 | R |
| 0 | 0 | Q |
Fig. 39.
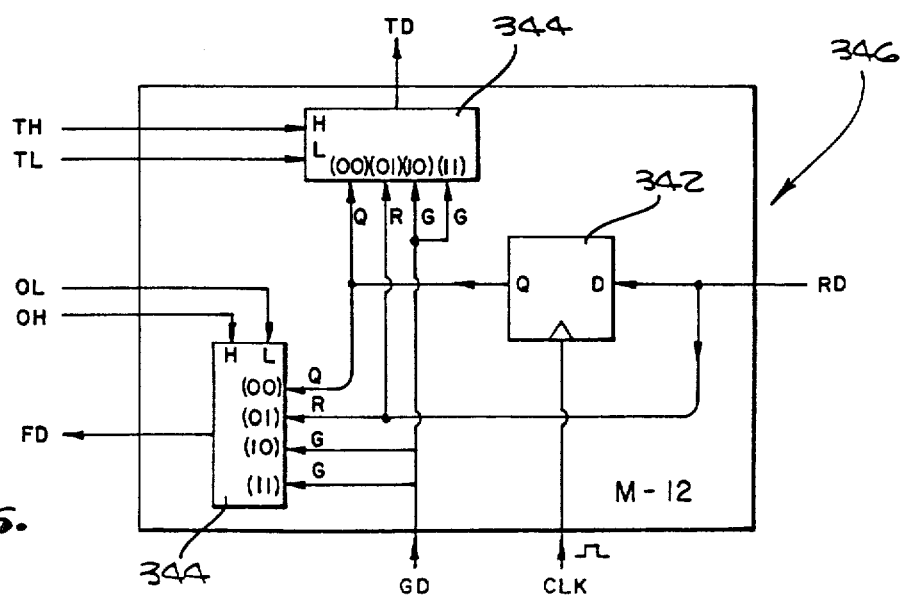
Fig. 36.

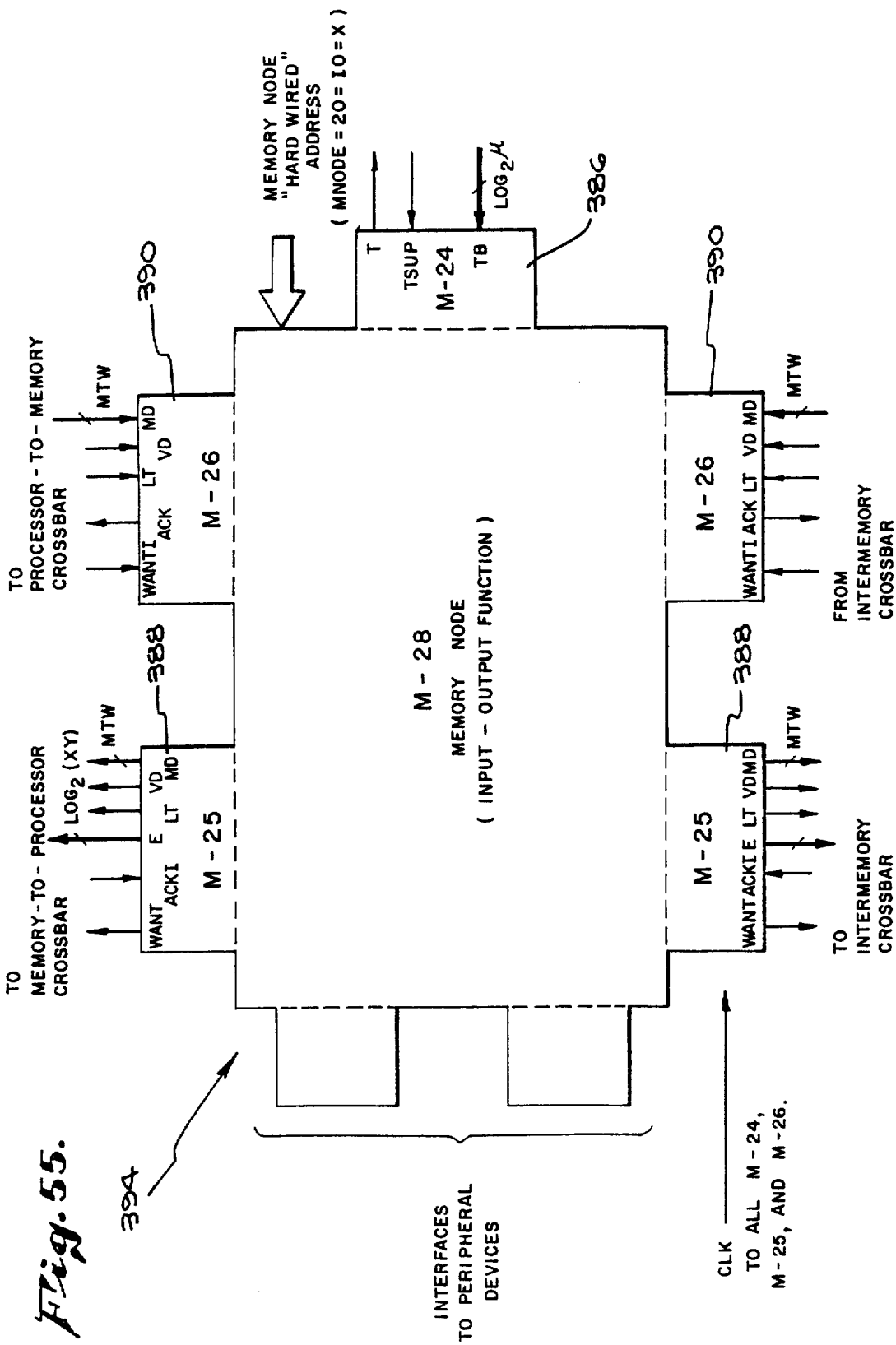

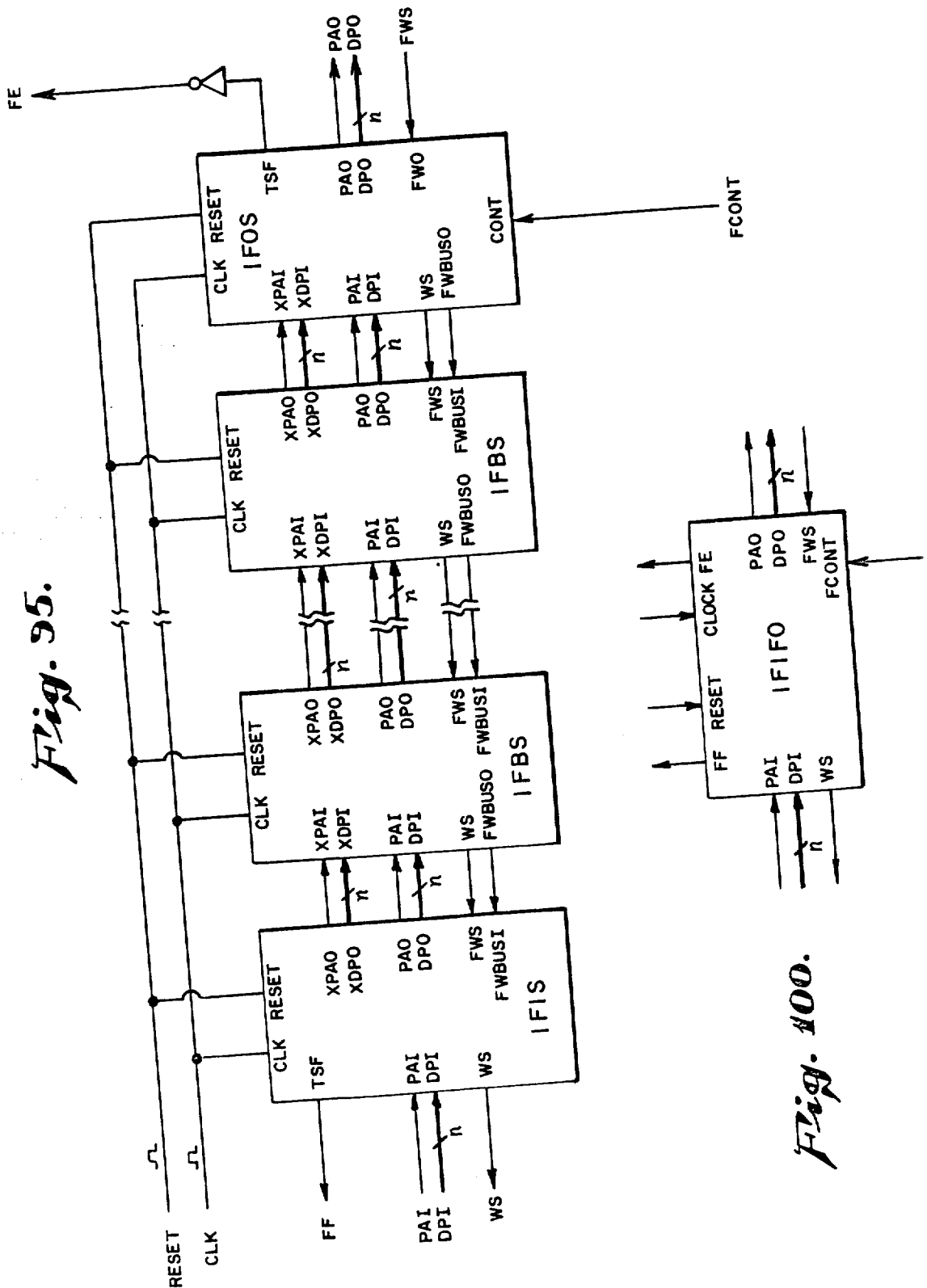

Fig. 104. STATE TABLE for the improved FAST-FORWARD-PROPOGATION FIFO BASIC STAGE

| case | independent variables | | | dependent variables | | | |
|---|---|---|---|---|---|---|---|
| | $TSF_t$ ($= Q_t$ of the master stage [p/a]) | $FWS_t$ | $CONT_t$ | $DO_t$ | $WS_t$ | CTs at arrival of clock at end time t | $Q_{t+1}$ |
| A | 1 | 1 | 0 | $Q_t(=1)$ | 1 | ⌐ | $DI_t$ |
| B | 0 | 1 | 0 | $XI_t$ | 1 | ⌐ | 0 |
| C | 1 | 0 | 0 | 0 | 0 | 0 | $Q_t$ |
| D | 0 | 0 | 0 | 0 | 1 | ⌐ | $DI_t$ |
| E | 1 | 1 | 1 | $Q_t(=1)$ | 1 | ⌐ | $DI_t$ |
| F | 0 | 1 | 1 | $Q_t(=0)$ | 1 | ⌐ | $DI_t$ |
| G | 1 | 0 | 1 | 0 | 0 | 0 | $Q_t$ |
| H | 0 | 0 | 1 | 0 | 0 | 0 | $Q_t$ | cases A, E, and F: standard FIFO forward march; latch is output, input is latched.
cases C, G, and H: everything freeze: inhibit latch clocking, output a false.
case B: bypass the latch; output data from XI (bus), latch is left empty.
case D: init. as a latch stage; input is latched, output a false.

DYNAMIC ACTIVITY-CREATING DATA-DRIVEN COMPUTER ARCHITECTURE

This is a divisional of co-pending application Ser. No. 490,154 filed on Apr. 29, 1983.

BACKGROUND OF THE INVENTION

The present invention relates to large system computer architecture and, more particularly, to interfacing elements employed between devices in large computer systems for the transfer of data such as queues and crossbars.

Basic digital computing operates in the cycles shown on FIG. 1. In what is referred to as a Von Neuman computer a sequence of instructions are alternately fetched from their location in memory into an execution register and executed. The computational sequences begin by providing the computer with a first instruction address for execution. Thereafter, the address of the next instruction is automatically calculated by the hardware as a result of the previous execution.

A simple Von Neuman system is shown in FIG. 2. The arithmetic and control unit 10 sequentially fetches and executes a series of instructions located in instructional memory 12. Typically, the instructions from memory 12 cause the arithmetic and control unit 10 to operate on data read in through input lines and/or maintained in data memory 14. The results of the calculations can be output to be seen by an operator on a device such as typewriter 16.

Certain computational projects of large magnitude have traditionally imposed severe time constraints on computational ability. Things such as major conversion problems and military command and control systems requiring repetitive, rapid, and immediate results fall into this category. To solve such problems, the Von Neuman type computer has been made bigger and bigger and faster and faster. Recently, much thought has been given to deviating from this approach and having the data drive the problem rather than the problem drive the data. Much of the impetus for research in this area has been as a result of recent developments in hardware wherein microprocessors and "smart" chips have been made available in smaller and smaller sizes and at lower and lower costs. Such an approach is shown in its simplest form in FIG. 3. In such a system, the driving data elements are referred to as tokens. The tokens cause the "firing" of an activity which generates results depending upon the value of the tokens. Assume that an activity is implemented by a separate chip, and that chip 18 has two inputs 20 and 22 and an output 24. Assume further that chip 18 in the presence of both inputs 20, 22 will produce their sum at the output 24. The activity of chip 18 is simply of the summing of the inputs.

Such a series of activities can be hard-implemented as "activity chips" or can be treated as logical entities emulated by more general devices, such as microprocessors 26 are shown interconnected in FIG. 4 in what is referred to as a Petri net. Each of the activities 26 performs a function (indicated as $f_1$-$f_5$ respectively) on the input(s). Such Petri nets are pre-established and do not change during the course of a computation. Each of the activities 26 is independent and, therefore, the sequence of computations is a function of the arrival of the tokens. When tokens A and B are present and available for function $f_1$, its output is available as a input to functions $f_2$ and $f_4$. Token C in the presence of the output of function $f_1$ will cause function $f_2$ to be calculated providing the second input for function $f_4$ which, in turn, provides one of the two inputs required for function $f_5$. The presence of tokens D and E cause the output of function of $f_3$ to be made available as the second input for function $f_5$.

Turning now to FIG. 5, a simplified drawing of a computer system of the Von Neuman type as used in real-time on-line systems is shown. The main memory 30 as accessed by the arithmetic and control unit (not shown) contains resident system programs 32, resident sub-routines 34 (usually re-entrant i.e., more than one program can be using them at a time), and a large section of available memory 36 wherein programs can be loaded for temporary execution. The majority of the programs and data are maintained on a mass storage device 38. When, as a result of an appropriate stimulus such as an interrupt, data arrival, or the like, the resident system program 32 requires the execution of a program on the mass storage device 38, that program is transferred from the mass storage device 38 into an unoccupied portion of available execution memory 36 as symbolized by the dotted area 40. When the program has been transferred into area 40, control is transferred to the first instruction and execution proceeds normally. During the execution procedure, the program within dotted area 40 can employ one or more of the sub-routines 34. When the program has completed its operation, dotted area 40 is merely returned to available status. That is, programs are not transferred back to mass storage 38. In the preferred mode of operation of such systems, the programs on mass storage device 38 are maintained in "dump" format and coded according to "run anywhere" techniques. Thus, a simple block transfer from mass storage 38 into execution memory 36 can be accomplished and the program will run wherever loaded. Moreover, the program can be located and operated simultaneously in more than one available area within memory 36.

A more exotic version of such a system is shown in simplified form in FIG. 6. Such a multi-processor system is typically found in military command and control systems wherein such a large quantity of functions must be accomplished that no single processor (e.g. computer) can accomplish the entire task. In such a system, one or more mass storage devices 38 containing programs and data are interfaced with a communication bus 42. The processors 44 are also interfaced with the communication buss 42. In such manner, the processors 44 can communicate between one another along the buss 42 as well as accessing the mass storage 38. When operating in a task oriented mode, a common task list or queue is maintained and tasks are assigned to the next available processor 44 in response to an initiating stimulus.

Communication crossbar circuits and fast propagating first in, first out (FIFO) queues have been postulated for use in such large systems in order to eliminate potential bottlenecks. That is, when one entity needs to communicate with another, a bottleneck can occur if a communication path between the two cannot be established immediately. In such case, a communication crossbar circuit is proposed. In like manner, when a large number of items are placed on a queue having many stages, a potential bottleneck can occur if the next piece of available data is many stages away from the requester and a considerable period of time and clock pulses must be occupied in order to shift the data to the user.

The proposed devices to date either exist on paper only or, if built, only operate as a stand-alone device. This is because of the inability of the designer of such apparatus to recognize the limitations which must be included within such apparatus when working in the given environment. For example, a common technique is to make such devices operate asynchronously to the system. The patents to Faustini (3,757,231), Mallerich, Jr. (3,736,575), and Derickson, III, et al (3,972,034) are examples of such apparatus. Faustini describes an asynchronous unclocked FIFO which shifts stage by stage. Mallerich describes an improvement over Faustini which operates in the same manner, but with fewer components. The Derickson patent includes the description of a FIFO as part thereof beginning with the description in column 3. That FIFO also is asynchronous.

In a single computer of the Von Neuman type, the problem cannot occur because any word in memory will always be completely accessed That is, a word in memory will always be written into completely or read completely In an interrupt-operated system having different priority levels, recognition of the potential problem being discussed herein is recognized by the technique of "re-entrant" coding which must be employed whenever common data can be accessed by multiple programming levels. Still in all, even in that case, reading and writing are on a complete word basis.

By contrast, if a common memory location is being accessed asynchronously, it is possible for one device to be accessing a particular memory location as, for example, by reading from it simultaneously with another device reading into it. Such an occurrence can result in completely garbled and unintelligible data. The reason that this is not normally considered or accounted for is that, typically, it only happens on rare occasions. Thus, the designer running a short test case probably does not have the event occur or, if it does, it is not recognized. As a practical matter, however, it is something which does occur and must be accounted for.

Thus, any crossbar or FIFO operating within a computer architecture as to be herein described must be synchronized to the clock driving the system so that appropriate preventive measures can be incorporated to prevent such potentially catastrophic events from occurring.

It is the object of the present invention to provide a data driven computer architecture having the benefits of data driven initiation with the flexibility of more traditional Von Neuman computers.

It is a further object of the present invention to provide such an architecture with interfacing mechanisms which maximize the flow rate of data between elements and minimizes the time delays inherent therein.

SUMMARY

The foregoing objectives have been met in a computer architecture of the Petri Net type wherein pre-established sub-functions, defining a total function, process portions of common input data asynchronously to generate a single combined output reflecting the total function as applied to the input data by the improvement comprising, each unique sub-function existing in a storage area as a replicator which can be copied and used by a processor as needed on a dynamic basis; and, each replicator when copied and used having the ability, when presented with data to be processed by it, of determining if the data is within its present processing power and, if it is, processing it and presenting the results to its output; otherwise, subdividing the data, making copies of itself and spawning a combining logic having the original output destination as its output destination, designating the input of the combining logic as the output designation of the copies, presenting the subdivided data to respective ones of the copies for processing, and terminating itself, whereby a sequence of replicator copies and combining logic will be automatically generated at run-time which has the capability of processing the data input thereto and then be discarded when finished with its processing of that data.

In the preferred embodiment, the copies of the replicators and the spawned combining logic are placed as activities in a queue structure according to a unique embodiment described herein and accessed by a plurality of processors through a unique cross bar structure described herein whereby each activity is processed asynchronously on a processor-available basis.

The activities are disposed in a queue or FIFO comprising a plurality of stages into which data can be placed at input points and from which data can be removed at output points upon the occurrence of respective clock pulses of a clock line to which it is synchronized and by which it is driven, wherein the improvement comprises, status means interconnecting the stages for passing each stage's status to the stage in front of it and behind it between the clock pulses; and, shifting means interconnecting the stages for shifting data between stages towards output points over unused stages between clock pulses at combinatorial logic speeds whereby the availability of data at the output points during the clock pulses is maximized.

The basic crossbar circuit shown for selectively connecting between respective ones of a plurality, M, of inputs and respective ones of a plurality, N, of outputs comprises, M input bar circuit means disposed in spaced, non-intersecting relationship for respectively conducting signals as applied to respective ones of the input bar circuit means; N output bar circuit means disposed in spaced, non-intersecting relationship to one another and in close adjacent spaced relationship to the input bar circuit means for respectively conducting signals as supplied to respective ones of the output bar circuit means, each of the output bar circuit means being oriented to intersect each of the input bar circuit means once; and, a plurality (M x N) of control interfaced circuit means connecting the input bar circuit means to the output bar circuit means at each of respective ones of the intersections of the bar circuit means for recognizing its associated input bar circuit means number, m, in a signal applied to the M input bar circuit means and responding thereto, for recognizing its associated output bar circuit means member, n, in a responded-to signal, for establishing a connection along input bar circuit means, m, and output bar circuit means, n, through the intersection thereof and flagging the bar circuit means, m and n, as "in use" if not previously in use, sending an "in use" signal back along input bar circuit means m if "in use", and flagging the bar circuit means m and n as "not in use" when use of the established connection is completed.

DESCRIPTION OF THE DRAWINGS

FIG. 22 is a table showing the four states possible in the stage of FIG. 21 according to the present invention and what action should be taken.

FIGS. 23–101 comprise detailed drawings of the implementation of the crossbar and queue FIFO circuits employed in the present invention and, in particular:

FIG. 23 shows circuit M-1 which is the P-bit rotating one-bit circuit.

FIG. 31 shows circuit M-8 which is the P-compete 2's path-latching broadcast crossbar circuit.

FIG. 32 is a block diagram showing the memory system crossbar facility.

FIG. 35 shows circuit M-11 which is the free-memory queue master bit circuit.

FIG. 36 shows circuit M-12 which is the free-memory queue slate bit circuit.

FIG. 55 shows circuit M-28 which is the memory code for input-output circuit.

FIG. 56 shows a shorthand notation for the M-8 circuit.

FIG. 57 shows the bit fields of the address.

FIG. 60 is a shorthand notation showing one possible configuration of address bit-field "C".

FIGS. 90-95 are improvement circuits on circuits 79-82 to remove inherent delays.

FIG. 100 is the symbolic representation of the circuit of FIG. 96.

FIG. 101 is a table provided to show how a basic stage responds to the three independent variable TSF, FWS, and CONT.

DESCRIPTION OF THE PREFERRED EMBODIMENT

Figure 7:
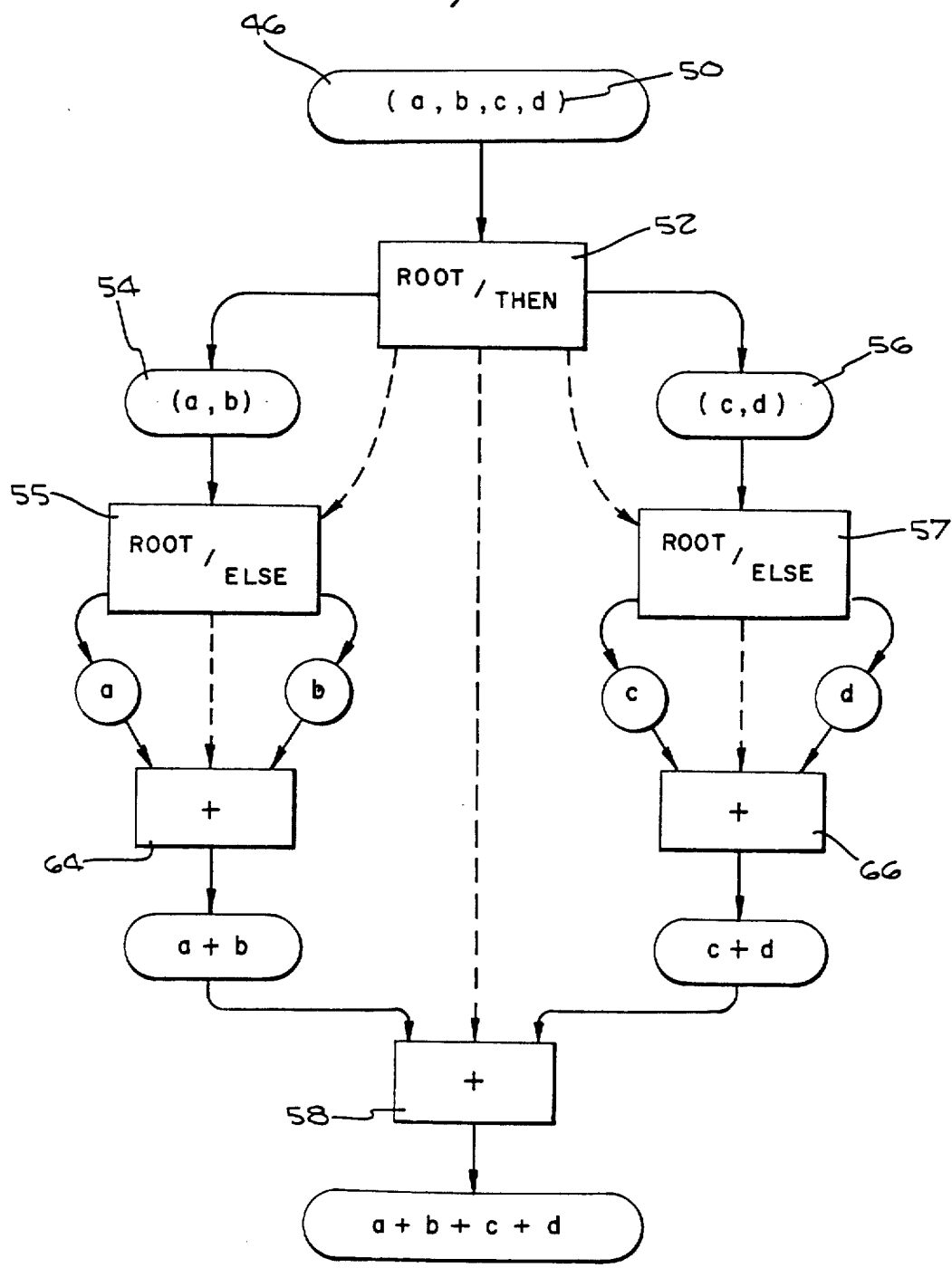
FIG. 7 is a simplified block diagram demonstrating the basic premise of the present invention wherein data is presented to a copy of a replicator defining a basic function which has the capability of spawning additional activities and copies of itself as necessary to accomplish the computational task necessary on the data presented.

Referring first to FIG. 7, the basic premise of the computer architecture of the present invention is shown in simplified form. Only the initial portion of the computation's Petri net is initially present in the machine as indicated by activity group ROOT within box 52. The Petri net for the entire computation is a function of the data entering this initial portion, and, therefore, cannot be pre-established as in the traditional data driven computer.

Assume now that initial ROOT of 52 is the initial step in generating a Petri net execution graph which will sum all elements of an incoming vector (of any length) into a single scalar. FIG. 7 shows the introduction of a four-element vector 50 borne on a token 46 to initial ROOT 52. ROOT 52 responds dynamically to this vector, in simple terms, in this way: the ROOT activity group sees that vector 50 is "too large" and, therefore, spawns a second group of activities called the THEN group, also within box 52. The ROOT group of box 52 then vanishes. That is, the activities of the ROOT group have "fired" once and thereafter immediately vanish. The initial THEN group of 52 itself sets up more of the Petri net as follows: it generates an addition ("+") activity 58; it absorbs the original vector 50 and breaks it into two halves 54 and 56; and it spawns two new ROOT activity groups in boxes 55 and 57, and guides the split vector 54 to the new ROOT group of 55, and split vector 56 to the new ROOT group of 57. Having done its work, the initial THEN activity group of box 52 vanishes.

Except for its position in the overall Petri net (which is dynamically generated piecemeal), the ROOT group of 55 is behaviorally identical to the original ROOT group of 52. The two groups are, in fact, isomorphic, built according to a single master blueprint. The blueprint designated a "REPLICATOR" (and not shown in FIG. 7) is the fundamental for of stored program in the present invention. A replicator is a blueprint for an activity group. When the THEN group of 52 "spawned" the two ROOT groups of 55 and 57, the static replicator defining a ROOT group was called on as the pattern for construction.

Continuing with the example, the left ROOT of 55 operates on its input vector 54 independently of the right ROOT 57 operating on its vector 56. This is the parallelism consequential of any Petri net scheme. One can also see that the original ROOT of 52 led to the generation of the two new ROOTs 55 and 57, so that the overall computation was recursively defined. Single activities fire once, only once, and them immediately vanish. This forces the synamically generated activity groups to be acyclic and, viewed as a unit, also vanishing once they have been used. This, in turn, means the overall dynamically-generated Petri net will be acyclic; that is, without "loops" in which any activity is traversed twice (since activities vanish on their first traversal). These characteristics are fundamental to the present invention.

The ROOT group of 55 examines its incoming vector 54 and determines that the vector is "small enough". That ROOT group then spawns and ELSE group of box 55 which creates a waiting addition activity 64, absorbs incoming vector 54 and breaks it into isolated scalars "a" and "b" shown as inputs to activity 64, guiding those scalars to the prepared activity. The ROOT group of 55 vanishes after spawning the ELSE group of 55 and the ELSE group vanishes after the above steps. It should be seen that the right-hand ROOT group of box 57 undergoes similar behavior (behavior which is isomorphic to the left-hand group) but due to its context (that is, its global placement in the overall Petri net), it is not identical. The right-hand group absorbs its own vector as determined by its context, has its own local behavior as affected by that incoming vector and produces its own result destined ultimately for the right-hand input of the waiting addition activity 58. The linkage mechanisms cause the overall computation to be deterministic. That is, there is no ambiguity as to which activity will absorb which token, nor where a result will go once produced.

The computation proceeds to the point where only the four isolated scalars "a", "b", "c", and "d" (each on its own token), along with the three addition activities 64, 66, and 58, are the only entities remaining in the system. The linkages completely determine their interaction, as indicated by the arrows. Activity 64 absorbs the "a" and "b", produces the sum "a+b" and vanishes. Activity 66 produces "c+d" and the single activity 58. The ultimate posture should be clear: a single token "a+b+c+d" and no activities.

It is a fundamental feature of the present invention that the creation of new activities can be initiated (if not totally carried out) by existing activities in the system. The new activities are built having a very specific relationship to one another and to the context they are introduced into. These new activities and their interrelationships constitute a "sub-graph" (referred to as a "group" in the above text). A sub-graph is itself a Petri net. Existing activities, under stimulus of the data they are currently processing, may choose to initiate construction of an activity group (a Petri net sub-graph of new activities which are properly interrelated) according to a pre-established pattern. The pattern, called the replicator, is accessed and used by the existing activity to establish the new activities. The existing activity also provides the information needed to interface ("concatenate") the new sub-graph properly to the existing overall Petri net. This latter information needed to link the new sub-graph to its context is provided by the "parent" activity (the activity initiating the creation) and not by the replicator. The replicator only indicates how that information must be applied. It is here that one should begin to see the detailed interaction of data (leading to decisions as to whether or not an activity group is to be created and, if so, according to which replicator's pattern), context (providing the linkage data needed to interface the new sub-graph properly to the existing Petri net), and replicators (which are the analog of a Von Neumann "program"; that is, the static descriptions which are stored to effect the computation intended by the programmer or the "code" as distinct from the execution of that code).

Figure 1:
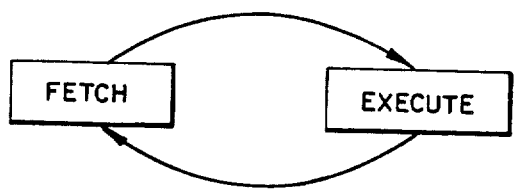
FIG. 1 is a block diagram of a prior art computing cycle of the Von Neuman type wherein the operating instructions are alternately fetched and executed.
Figure 2:
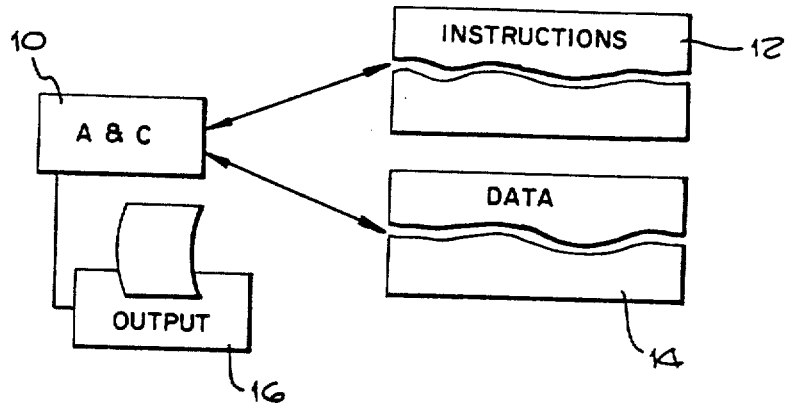
FIG. 2 is a block diagram of a prior art computer system of the Von Neuman type.
Figure 3:
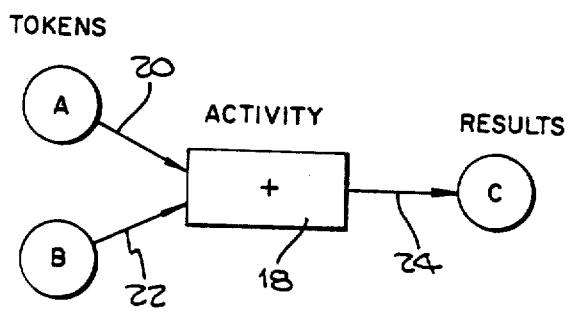
FIG. 3 is a simplified block diagram showing a basic prior art approach to data driven computing.
Figure 4:
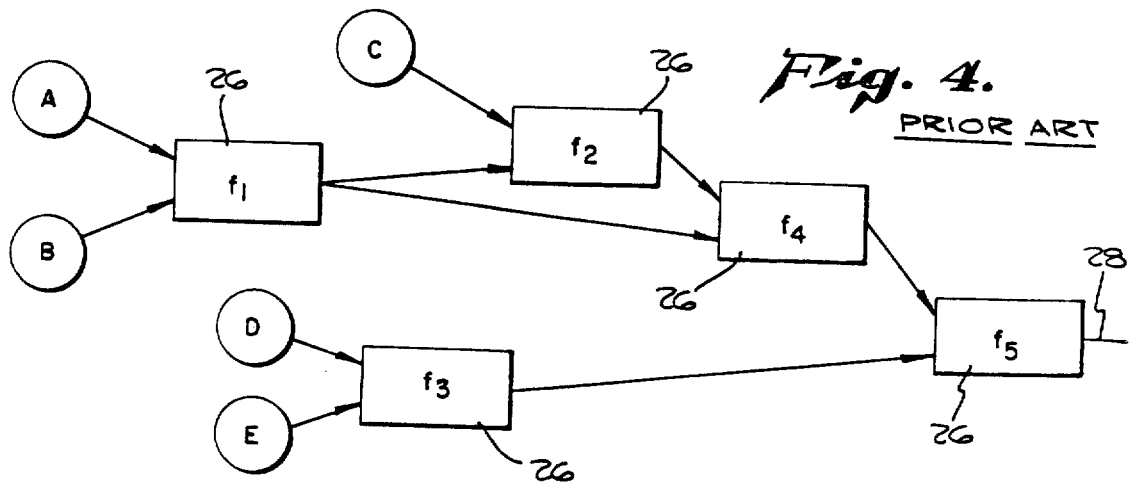
FIG. 4 is a block diagram of a prior art activity driven structure referred to as a Petri Net.
Figure 5:
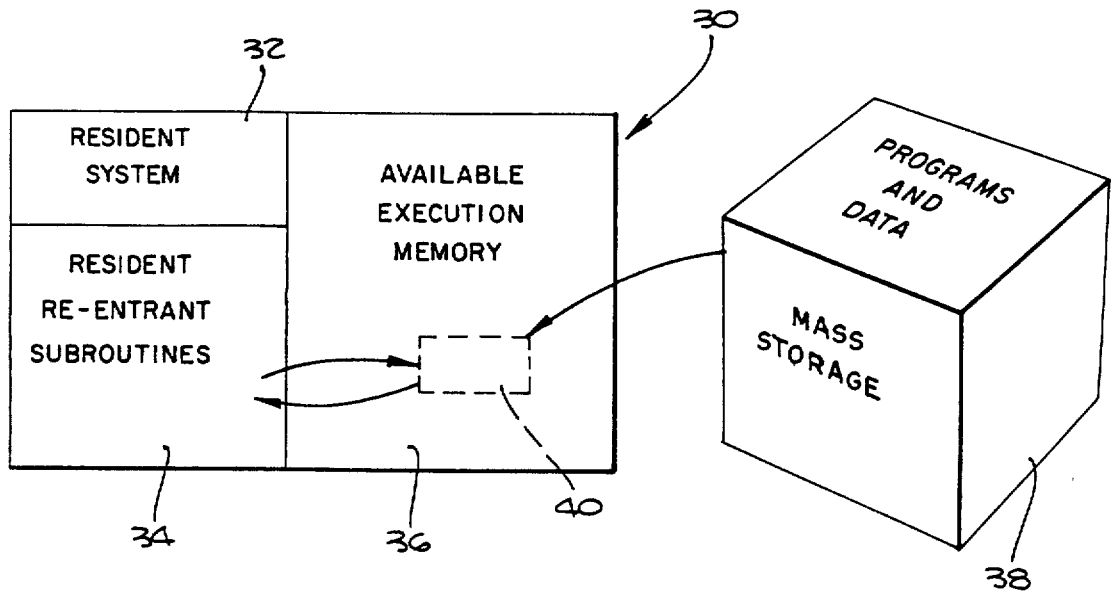
FIG. 5 is a simplified drawing of a prior art computer system of the Von Neuman type as used in real-time on-line systems.
Figure 6:
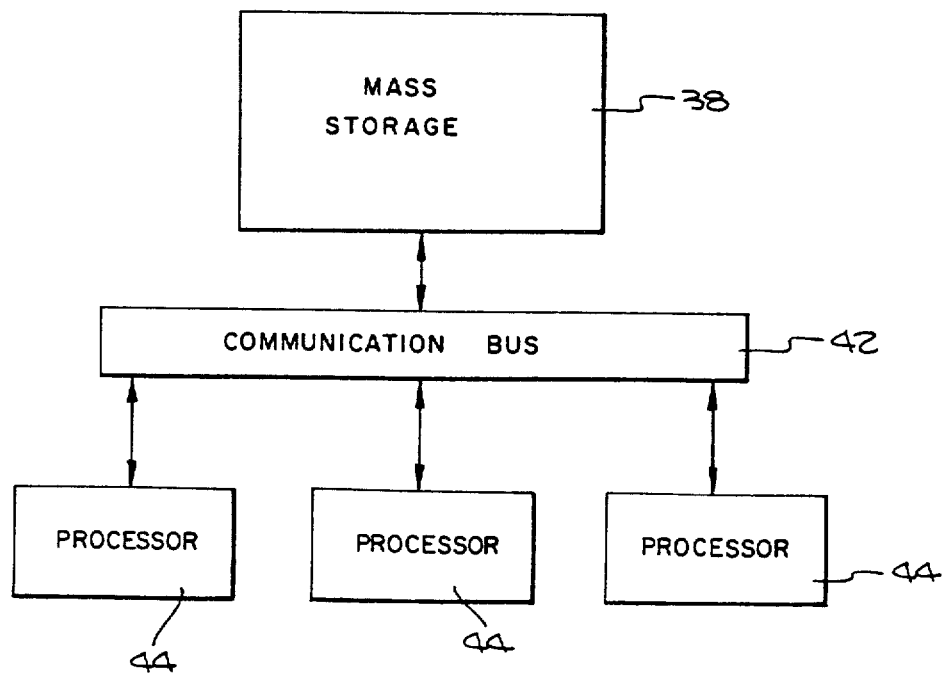
FIG. 6 is a block diagram of a prior art multi-processing system.

Note that in the simplified example of FIG. 7, the activities are dynamic and the basic elements (i.e., the functions) are allocated on an as-needed basis. Once utilized, the functions are merely discarded. It is envisioned that the functions would be operated and executed in a manner similar to that discussed with respect to FIGS. 5 and 6 above and, therefore, no greater detail is to be set forth herein in this regard.

Figure 8:
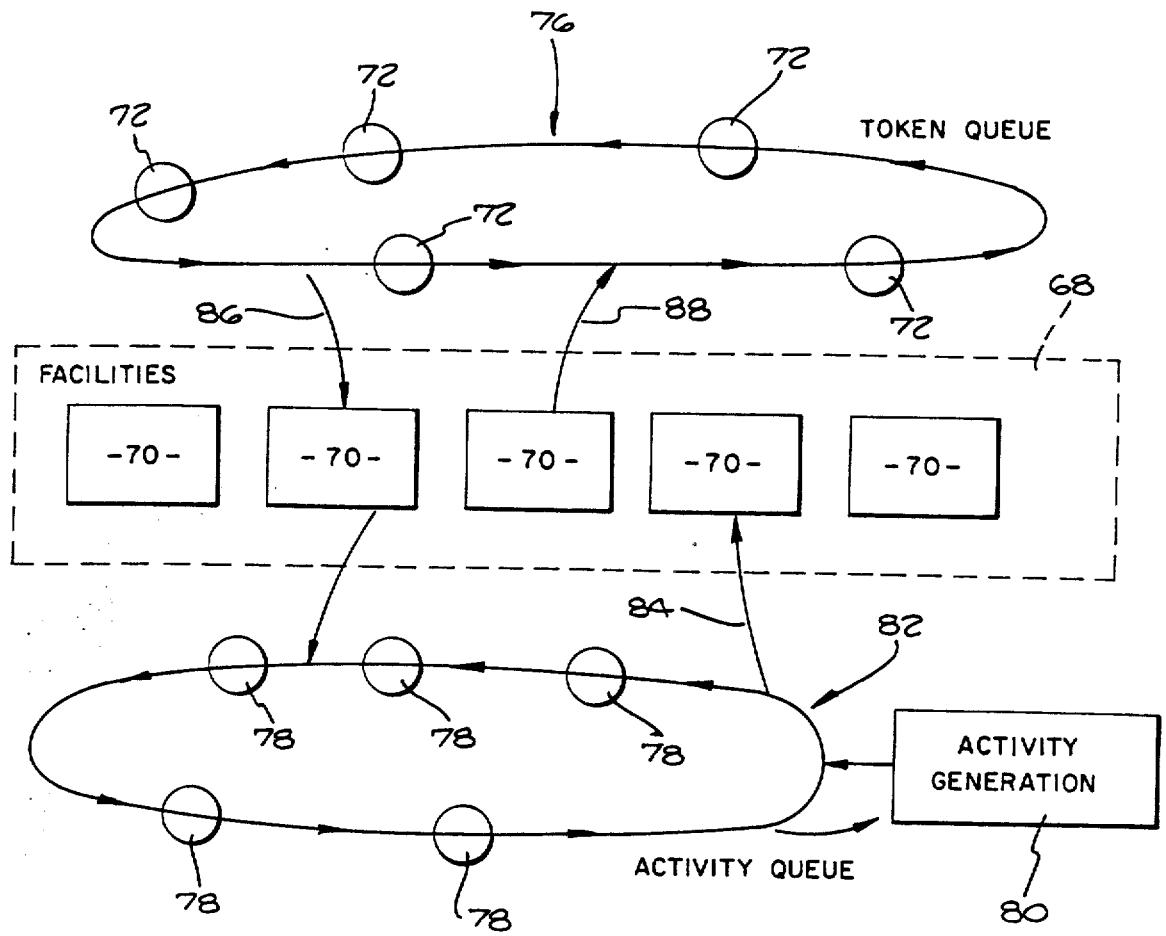
FIG. 8 is a simplified block diagram showing the computer architecture of the present invention in its basic form.

Turning now to FIG. 8, certain aspects of the computer architecture of the present invention can be seen. As envisioned, the computational facilities, as indicated by the dotted box 68, comprise a multitude of individual computer processors 70. It is not inconceivable with modern technology that in a large computational system according to the present invention there could be thousands of computer processors 70 comprising facilities 68. The system is stimulated by tokens 72. These are placed onto a token queue, generally indicated as 76, by action of executing activities in the computing facilities 68 ("input" and "output" activities guide data between external devices and the token queue 76). The token queue 76 can be accessed by all the processors 70. Activities 78 are generated by executing activities involved in the "spawning" process discussed earlier, according to patterns stored in replicator storage; activity generation, with the replicator store, is generally indicated at this time as box 80. As activities 78 are generated, they are placed on an activity queue, generally indicated as 82, which is also accessible by all the processors 70. As facilities 68 become available, the activities 78 are removed from the activity queue 82 and assigned to appropriate facilities 68, as symbolized by the arrow 84. The activity needs data (generally speaking) in order to fire and, therefore, it expects to find that data on tokens 72 in the token queue 76. The scheme used to establish token flow through the dynamically-generated Petri net takes the form of "labels" on both tokens and activities which are supported by the architecture. As a match between a token 72 label and a label on an activity 78 within facilities 68 is recognized, the token 72 is provided to the activity 78, as symbolized by the arrow 86. That token 72 is removed from the token queue 76 and effectively attached to the activity 78 to effect the process called "absorption" in earlier text. Subsequent generation of a result token 72 will cause it to be placed on the token queue 76, as symbolized by the arrow 88.

It is contemplated that in a highly active system a virtual swarm of tokens and activities will be occupying the respective queues 76, 82. Making the tokens 72 and activities 78 available to the facilities 68 and to one another in the most expedient manner is, therefore, a major concern of the computer architecture of the present invention.

Figure 9:
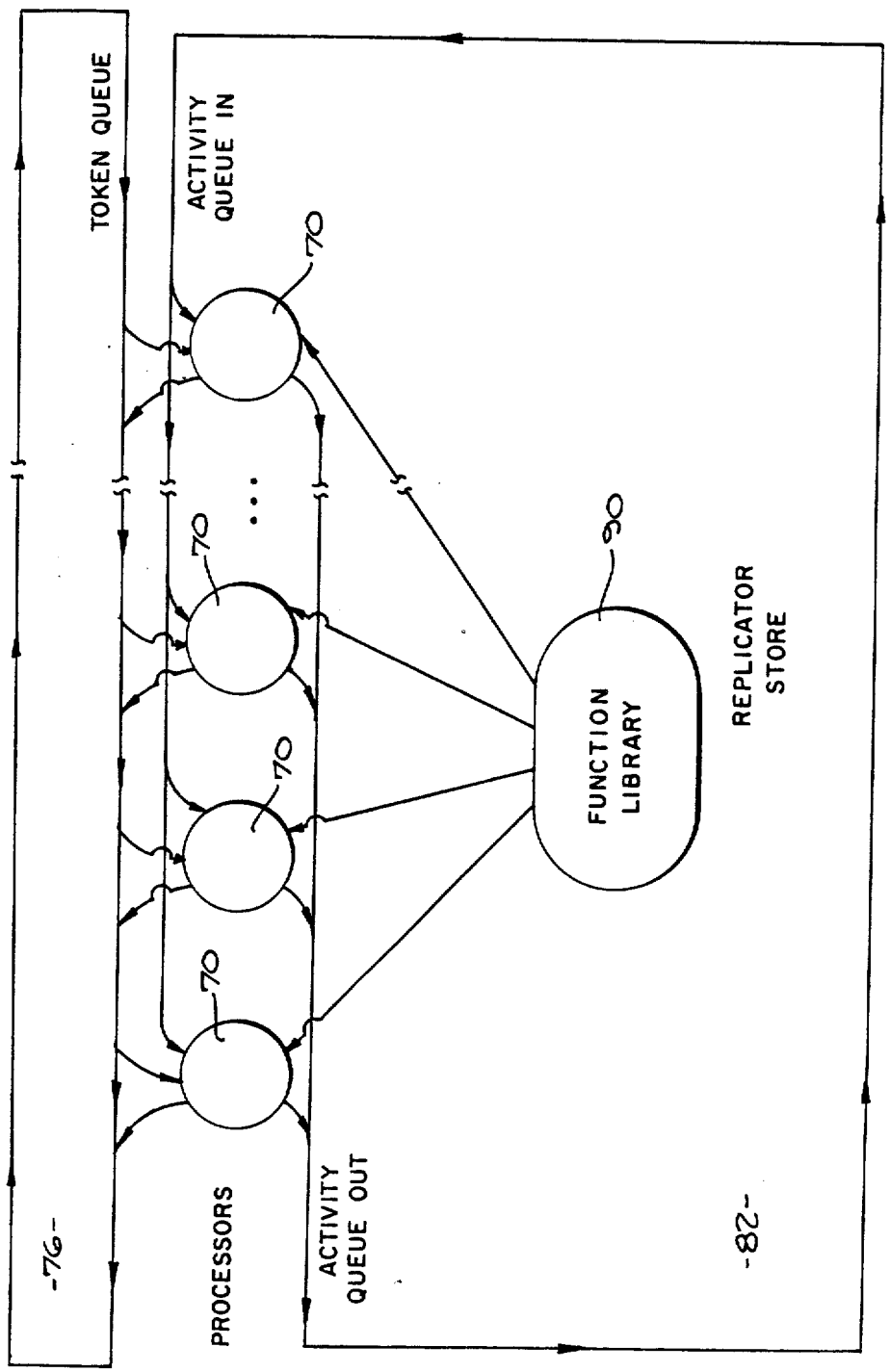
FIG. 9 is a simplified diagram of the computer architecture of the present invention in an improved form.
Figure 10:
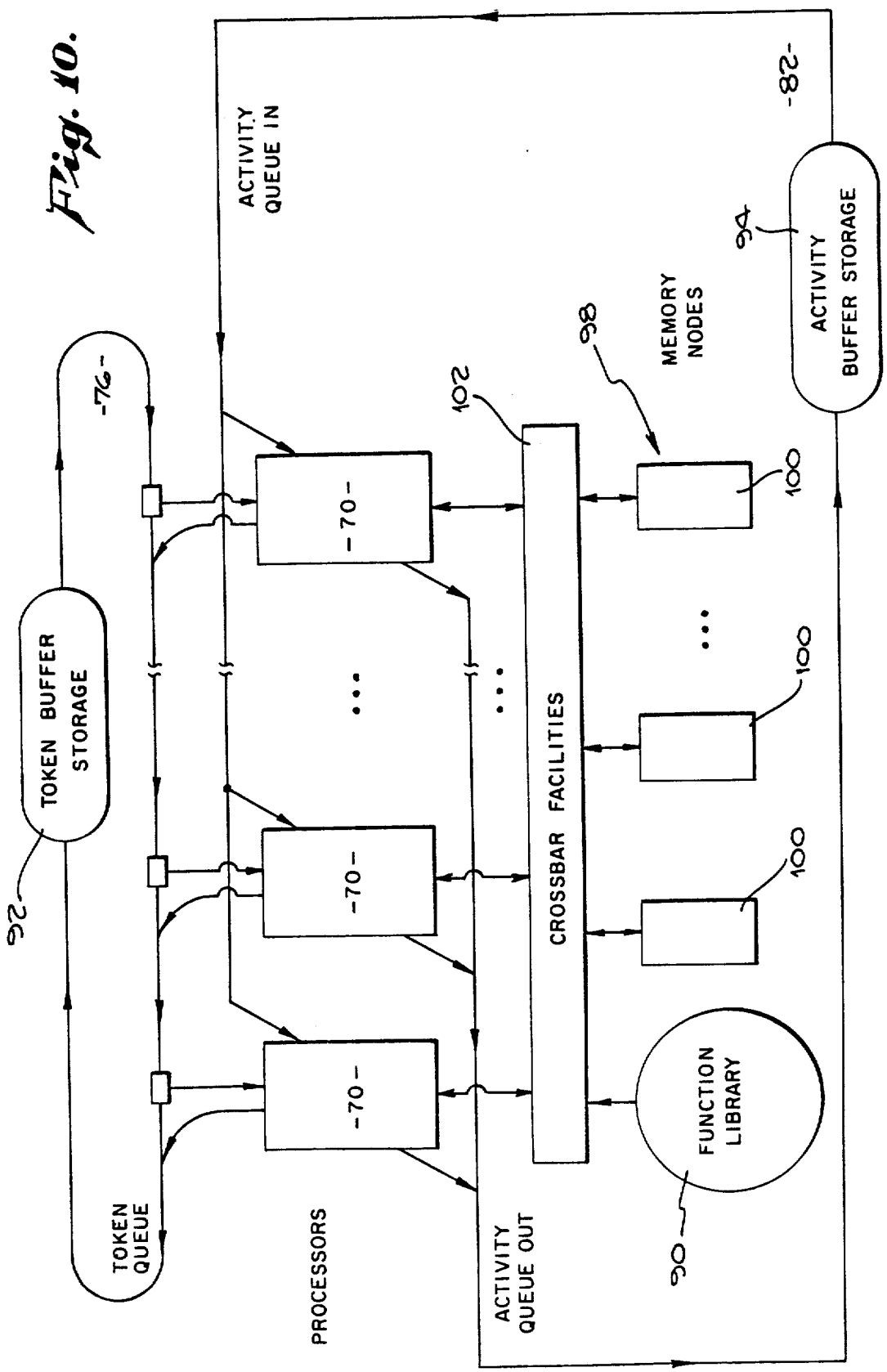
FIG. 10 is a diagram of the computer architecture according to the present invention in yet a further refined form for improved operation.
Figure 11:
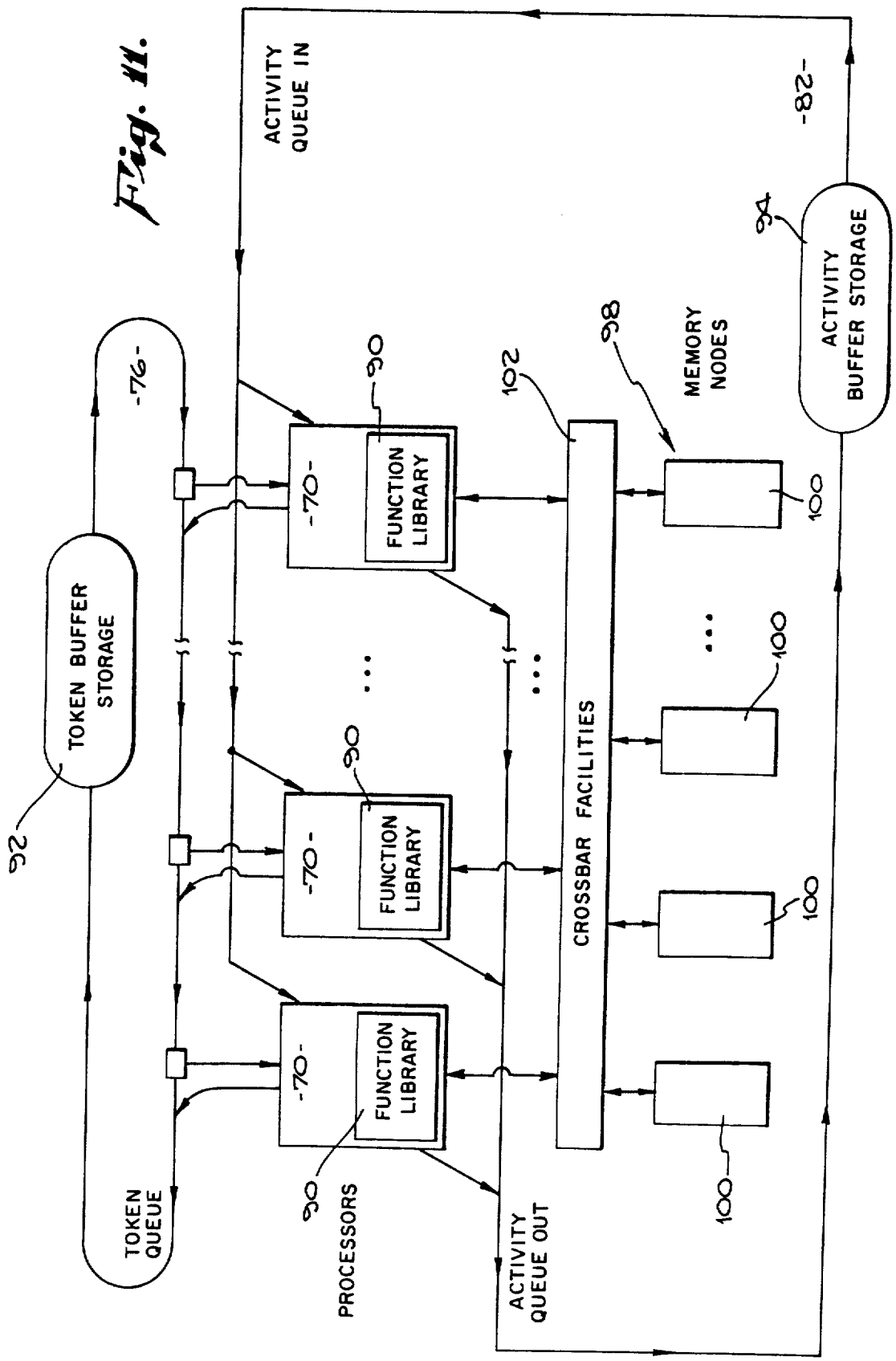
FIG. 11 is a diagram of the computer architecture of the present invention in its most refined and preferred form.

As shown in FIGS. 9–11, several constructions according to the architecture concept of the present invention will be described.

In implementing the novel computer architecture of the present invention, there are two major areas of concern requiring considerations and apparatus for implementation beyond the scope of anything available presently in the art in order to make the architecture an achievable reality operating in a manner which totally realizes the desired objective. Those considerations are, of course, a practical interface system between the various physical components and a practical and time-efficient queuing structure for holding the waiting activities, tokens, and replicator descriptors (within the function library) in a manner which allows them to be readily and easily accessible to the facilities requiring them. Both these requirements have been addressed by the applicant herein and solutions are described hereinafter. Both the novel cross-bar circuitry and the accordian-store queue structure will be described functionally, and, thereafter, described with particularity with reference to a specific design.

Figure 12:
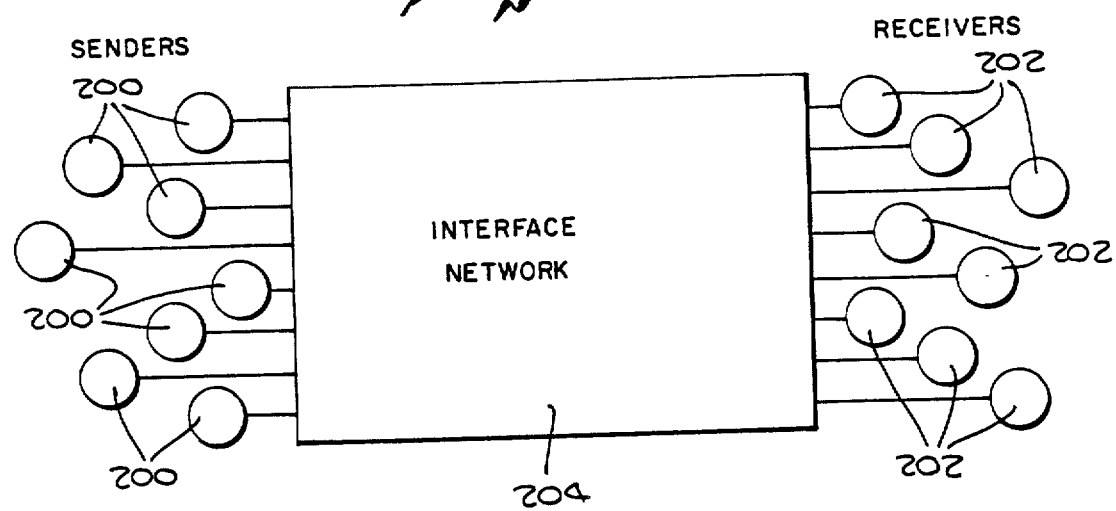
FIG. 12 is a basic block diagram showing the necessity for an interface between senders and receivers of messages and signals.

Turning first to FIG. 12, the problem is shown in its simplest form. At any particular time, the elements of the system fall into a plurality of senders, generally indicated as 200, who wish to communicate with a plurality of receivers, generally indicated as 202. What is desired is an interface network 204 to which the senders 200 and receivers 202 can be connected such that any sender 200 can call for and obtain a direct path to any receiver 202 connected to the interface network.

Figure 13:
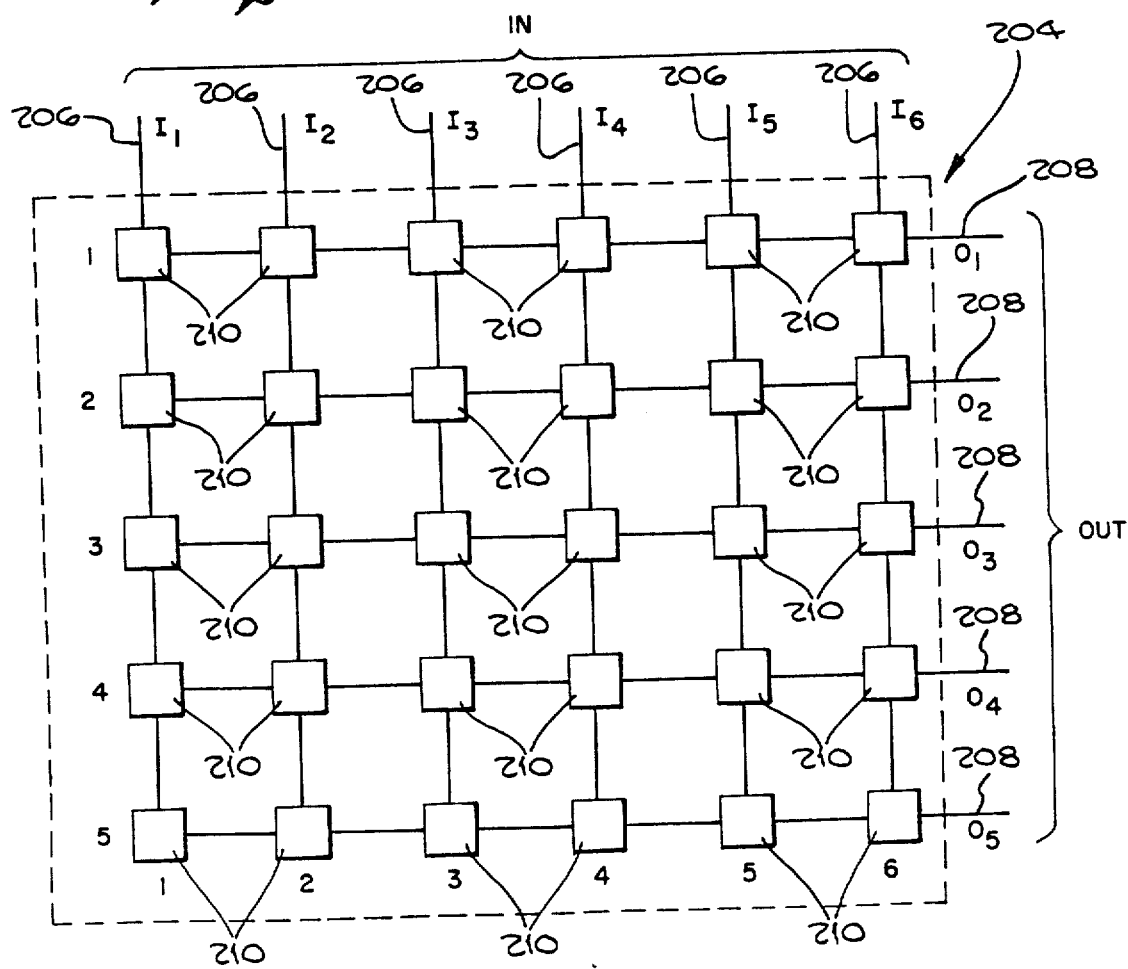
FIG. 13 is a simplified drawing of the internal workings of the interface network shown as a block in FIG. 12.

Turning now to FIG. 13, the internal workings of the interface network 204 are broken down to a functional level. The interface network 204 is contained within the dotted box so indicated. A series of input lines 236 (labelled "I$_1$" to "I$_6$") enter interface network 204 and a plurality of output lines 208 (labelled "O$_1$" through "O$_5$") leave interface network 204. As can be seen, the input lines 206 connect to internal columns labelled "1" through "6", respectively. Likewise, the output lines 208 connect to internal rows labelled "1" through "5", respectively. Assume that each intersection of a row and column has a control logic 210 associated therewith. The problem to be solved, therefore, can be seen to be one of establishing the control logic 210 in a workable manner to accomplish the desired objectives. Assume, for example, that it is desired to effect an interconnection between input $I_1$ 206 and output $O_3$ 208. The control logic 210 at the junction of column 1, row 1, must recognize that the desired address resides on row 3. Control, therefore, must be passed through the control logic 210 at row 1, column 1, to the control logic 220 at row 2, column 1. That control logic 210 must, of course, make the same type of evaluation. Upon the request signal arriving at control logic 210 for row 3, column 1, the address identity must be recognized. The function of control logic 210 for row 3, column 1, then becomes one of requesting forward for control of the row 3 output line 108 (i.e., output $O_3$). Each control logic block 210 along row 3 must be asked whether it has taken control of the row 3 output line 208. If any one of them has, this must be signaled back across row 3 to the control logic block 210 at row 3, column 1 which is initiating the horizontal request. This lack of availability, then, is sent vertically along the control logic blocks 210 of column 1 to the requester. In the event that no control logic block 210 along row 3 has control of the row 3 output line 208, control logic block 210 must then be so informed and, itself, cause the row 3 output line 208 to be in a "occupied" state and a successful path message sent vertically along the control logic block 210 of column 1 to the initiator on line $I_1$ 206.

As can be seen, such logic capability as must, therefore, be incorporated in each control logic block 210 is fairly complex. That is only part of the problem. Crossbar circuits affecting the above-described interconnecting logic are not completely unknown in the art as previously mentioned. On the other hand, known crossbar circuits are hard wired and unflexible so as to not be easily adaptable to a large system as wherein the crossbar circuit of the present invention must operate.

Figure 14:
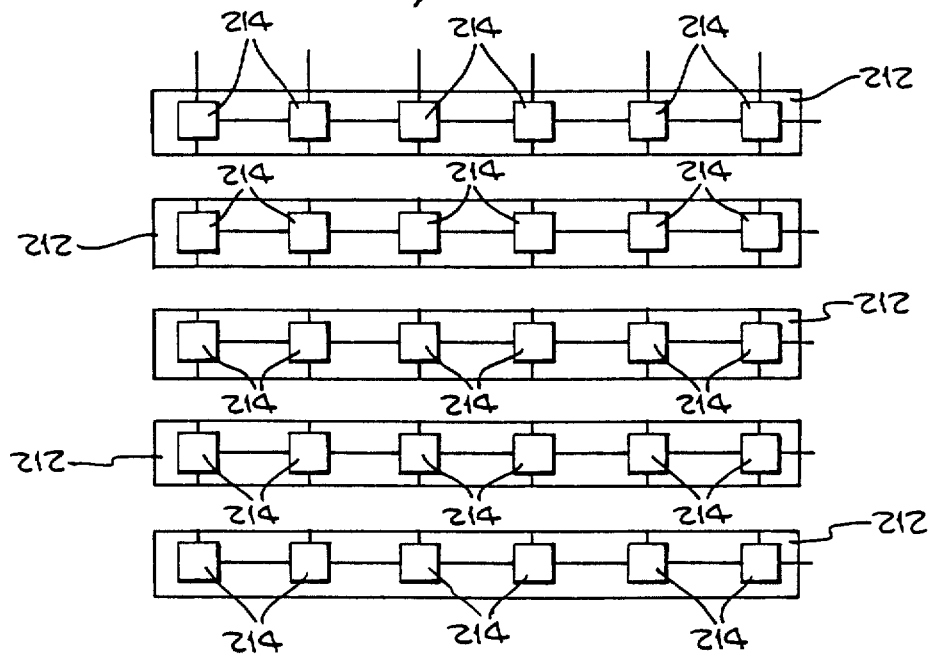
FIG. 14 is a simplified drawing showing how the horizontal rows of the interface network of FIG. 13 could be produced on individual horizontal bar circuits.

Turning now to FIG. 14, one can envision how the five rows of interface network 204 could be produced on five individual horizontal bar circuits 212 having control logic chips 214 thereon. Likewise, with reference to FIG. 15, one can envision how the interface network 204 could be divided into six vertical bar circuits 216 having control logic chips 218 thereon.

Figure 15:
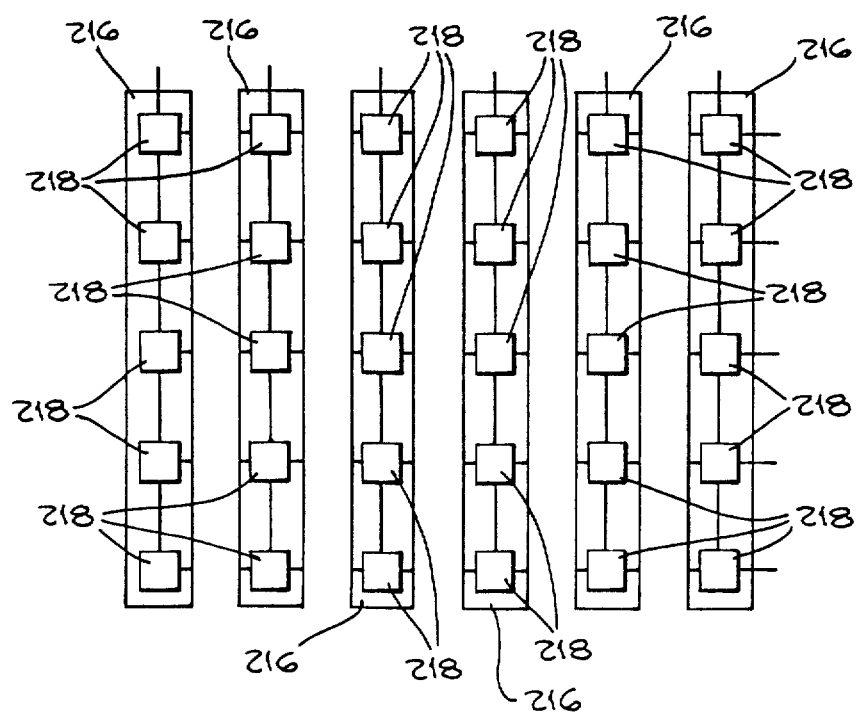
FIG. 15 is a simplified drawing showing how the vertical rows of the interface network of FIG. 13 could be produced as individual vertical bar circuits.
Figure 16:
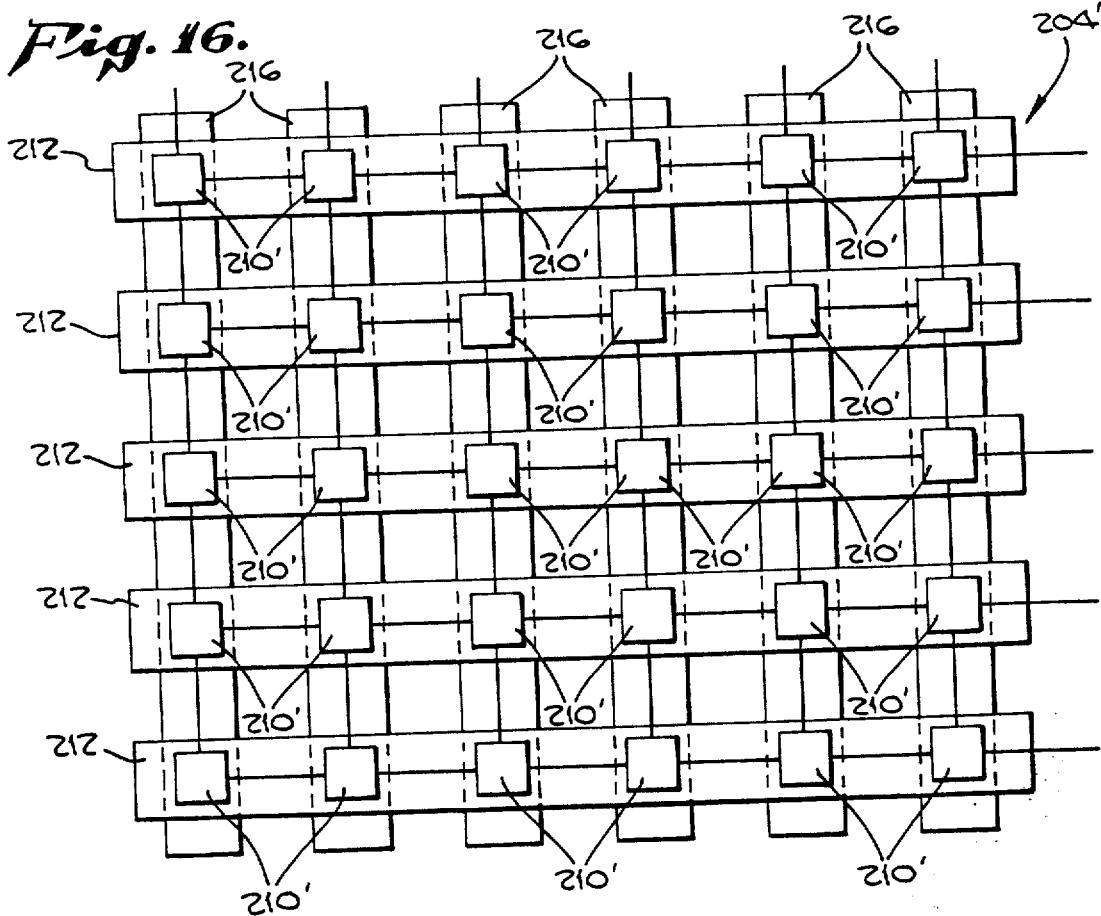
FIG. 16 is a simplified drawing showing how the horizontal and vertical bar circuits of FIGS. 14 and 15 could be combined to create the interface structure of FIG. 13.

If, then, the horizontal bar circuits 212 of FIG. 14 were interposed over the vertical bar circuits 216 of FIG. 15, a composite circuit 204' would be created if each control logic 214 and 218 contained complementary portions of the totally required control logic of control logic 210 and was connected to intercommunicate one with another. Such construction would make a highly flexible cross-bar circuit in that each horizontal bar circuit 212 would be identical to every other horizontal bar circuit 212 and likewise for the vertical bar circuits 216. If each horizontal bar circuit 212 contained X positions of control logic 214 and each vertical bar circuit 216 had Y positions of control logic 218, any combination up to X by Y could be created by merely adding more or less bar circuits 212, 216. Such is the intent and achieved objective of the cross bar circuit of the present invention.

Figure 17:
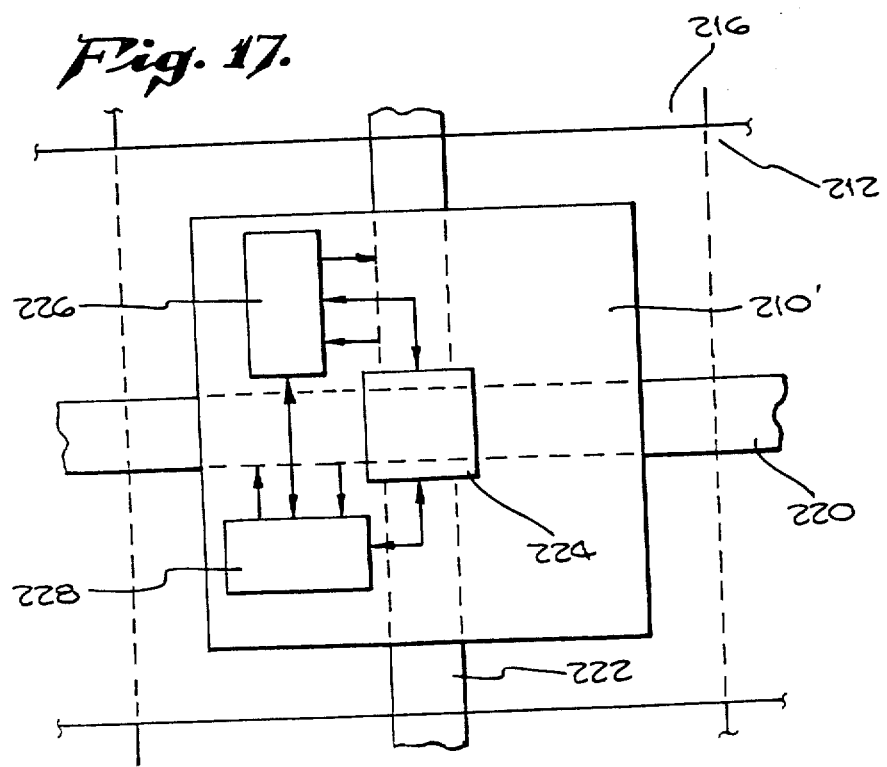
FIG. 17 is an enlarged block diagram of one intersection of the structure of FIG. 16 showing how logic would be incorporated therein to allow the horizontal and vertical bar components to communicate with one another.

The interconnection forming control logic 210' at the intersection between each vertical bar circuit 216 and horizontal bar circuit 212 is shown diagrammatically in detail in FIG. 17. Each horizontal bar circuit 212 contains a horizontal electrical bus 220. Correspondingly, each vertical bar circuit 216 contains a vertical electrical bus 222. At the intersection between each horizontal bar circuit 212 and vertical bar circuit 216 a bus interface 224 provides access to both buses 220, 222. Also provided are vertical logic 226 and horizontal logic 228. Vertical logic 226 and horizontal logic 228 can intercommunicate with one another and with the bus interface 224. Additionally, vertical logic 226 can sense signals travelling along vertical electrical bus 222 and inject signals into vertical bus 222. Likewise, horizontal logic 228 can both read signals from and inject signals into horizontal electrical bus 220. The signals read and injected by vertical and horizontal logic 226, 228 is, of course, described above with reference to FIG. 13.

Figure 18:
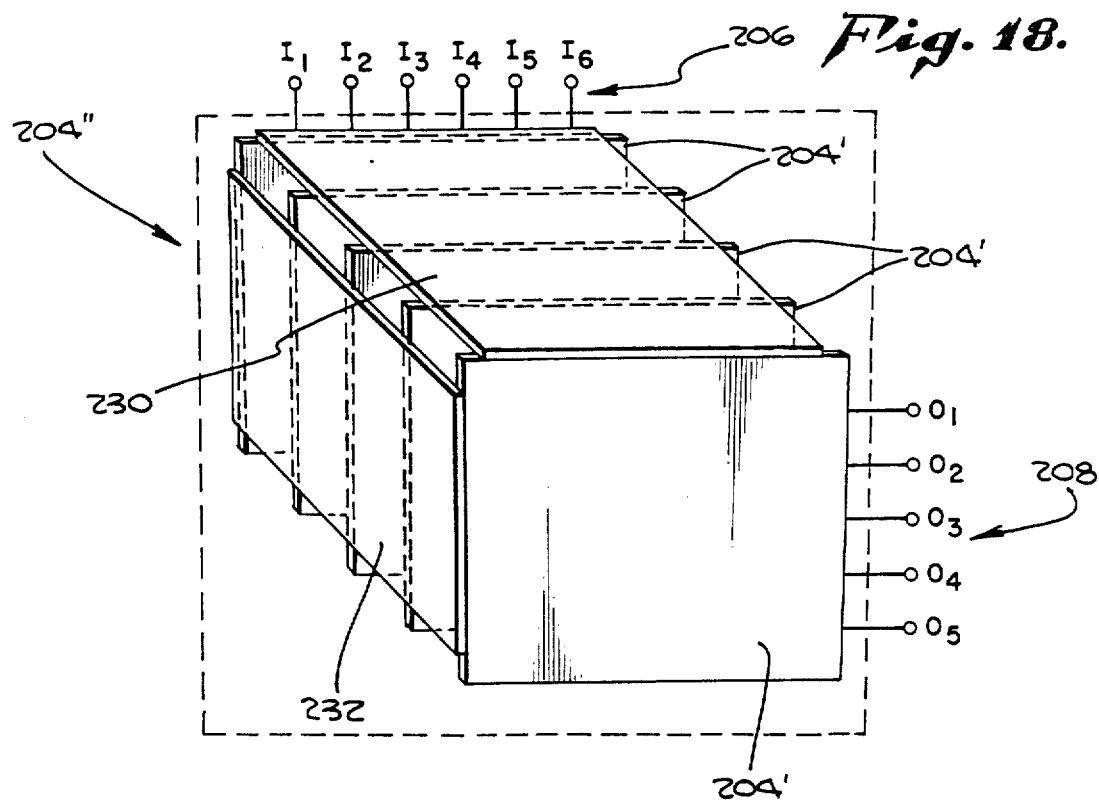
FIG. 18 is a simplified drawing showing how the basic crossbar structure as shown in FIG. 16 can be stacked with additional input and output interfaces to create an improved crossbar structure having the same number of inputs and outputs but with an improved probability of creating a successful path therethrough.

To provide the flexibility and the expandability necessary for a cross-bar operating in the architecture of the present invention, two additional features not possible by cross-bars of the prior art and accomplished by the cross-bar of the present invention are required. The first is shown diagrammatically in FIG. 18. To this point, the cross-bar circuit as described is one of flexibility in a single plane. As defined, the interfaced network 204 and 204' comprise six columns and five rows. While the numbers used for purposes of description are small, one can envision how with a large number (X) of columns and large number (Y) of rows interconnected along a single plane the achieving of a path between a single input $I_i$ and a single output $O_o$ run into problems of achievability within time constraints. That is, as the rows and columns became busy, the testing and retesting procedure along the columns and rows to achieve a through path could become time consuming. In such case, more paths between the same number (X,Y) of inputs and outputs could help alleviate the problem. FIG. 18 diagrammatically shows such a solution. That is, the cross-bar interfaced network 204" within the dashed box still has input lines $I_1$ through $I_6$ and output lines $O_1$ through $O_5$ so as to appear to the outside world identical to the cross-bar 204 and 204' previously described. Internally, however, one can see that a plurality of identical cross-bar boards 204' have been placed in parallel and interconnected along their inputs by input interconnecting logic 230 and along their outputs by output interconnecting logic 232.

Figure 19:
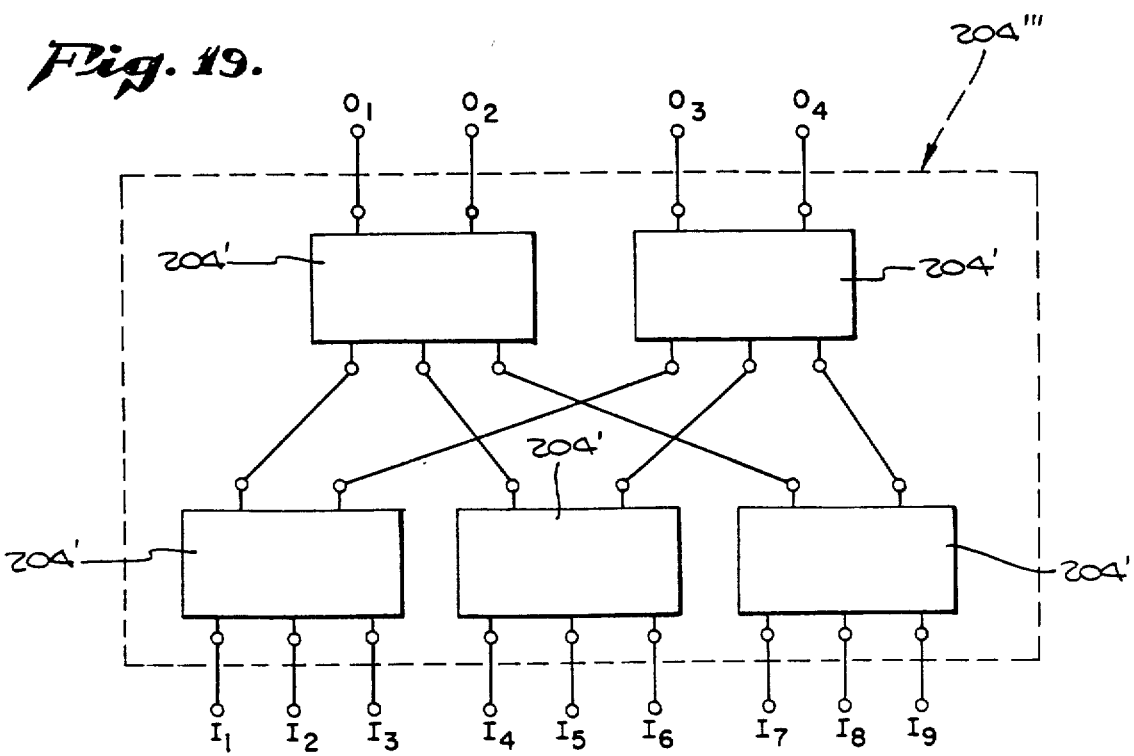
FIG. 19 is a simplified drawing showing how a number of basic crossbar circuits according to the present invention as shown in FIG. 16 can be interconnected to create a crossbar circuit with an increased number of input and output lines.

The other case of expandability is one of requiring more input and output lines 206, 208. This problem and its solution according to the present invention is shown in simplified form in FIG. 19. Due to size limitations in the drawings, the cross-bar elements 204' are shown with three inputs and two outputs. By interconnecting in the manner shown, an enlarged planar structure 204''' having nine inputs and four outputs is constructed. As should be understood, since, for example, the cubic crossbar 204" of FIG. 18 appears to the outside world as if it were any planar cross-bar 204, such a structure could be incorporated within the enlarged planar cross-bar 204''' of FIG. 19 to create a composite cross-bar with both increased numbers of inputs and outputs along with greater through paths for achieving rapid interconnections between the inputs and outputs when requested.

A specific example of such cross-bar circuits as could be implemented according to the present invention is described hereinafter.

Before turning to specifics, however, the problem of queue storage according to the novel techniques of the present invention will be shown and discussed in simplified form.

Figure 20:
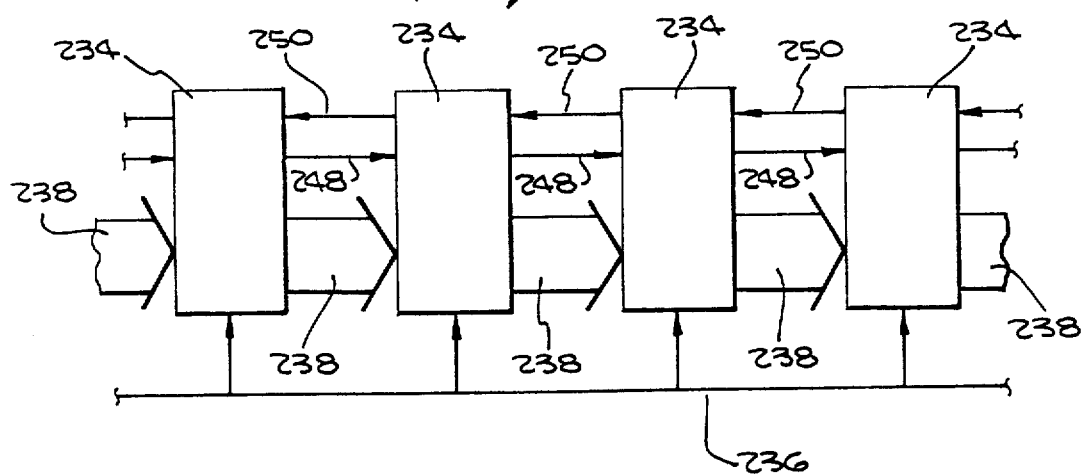
FIG. 20 is a simplified block diagram of several stages in a queue or FIFO according to the present invention.

Turning now to FIG. 20, a segment from a queue or FIFO is shown. Those skilled in the art will recognize that the principals being described are identical and merely depend on whether the final output is wrapped around to the input or not. That is, a queue as employed in the present invention and as described in detail hereinafter is circular in nature, to circulate its data pass various points of inquiry until such time as they are individually removed. By contrast, a FIFO propagates its data from the input towards the output such that that which is first in is first out. A FIFO has one sampling point (the output) while the queue structure described and used in the architecture of the present invention has many sampling points.

In the conventional queue or FIFO, a plurality of stages 234 are connected to a clock line 236. Upon each clock pulse on clock line 236, data, as represented by the large arrows 238, moves from one stage 234 to the next, if the next stage 234 is (or will be) empty, or does not shift forward if the next stage 234 is (and will remain) full. In a slowly operating system with one or two accessing entities, this does not pose a problem. By contrast, in a system such as the architecture of the present invention, data must be made rapidly available to any and all users. Because of the vast numbers of tokens and activities which will be swarming in the queues, a movement of data from stage to stage at single clock pulse intervals is intolerable. What is required is the heretofor non-existent concept of interconnected stages which rapidly skip or slide forward over unused positions at combinatorial logic speeds between clock pulses so to always have data available for sampling at each sampling station rather than empty positions offering only wasted time. In this regard, the queue or FIFO structure of the present invention is like the bellows of an accordian (and, therefore, is oftimes referred to thusly) in that empty stages will virtually fold to place actual data stages in virtual proximity to one another on a time scale basis. That is, because the data will skip over unused positions between clock pulses, to the user, the data will appear to have shifted in from the previous stage in one clock pulse time where, in fact, it may have shifted in from a stage many positions removed.

Figure 21:
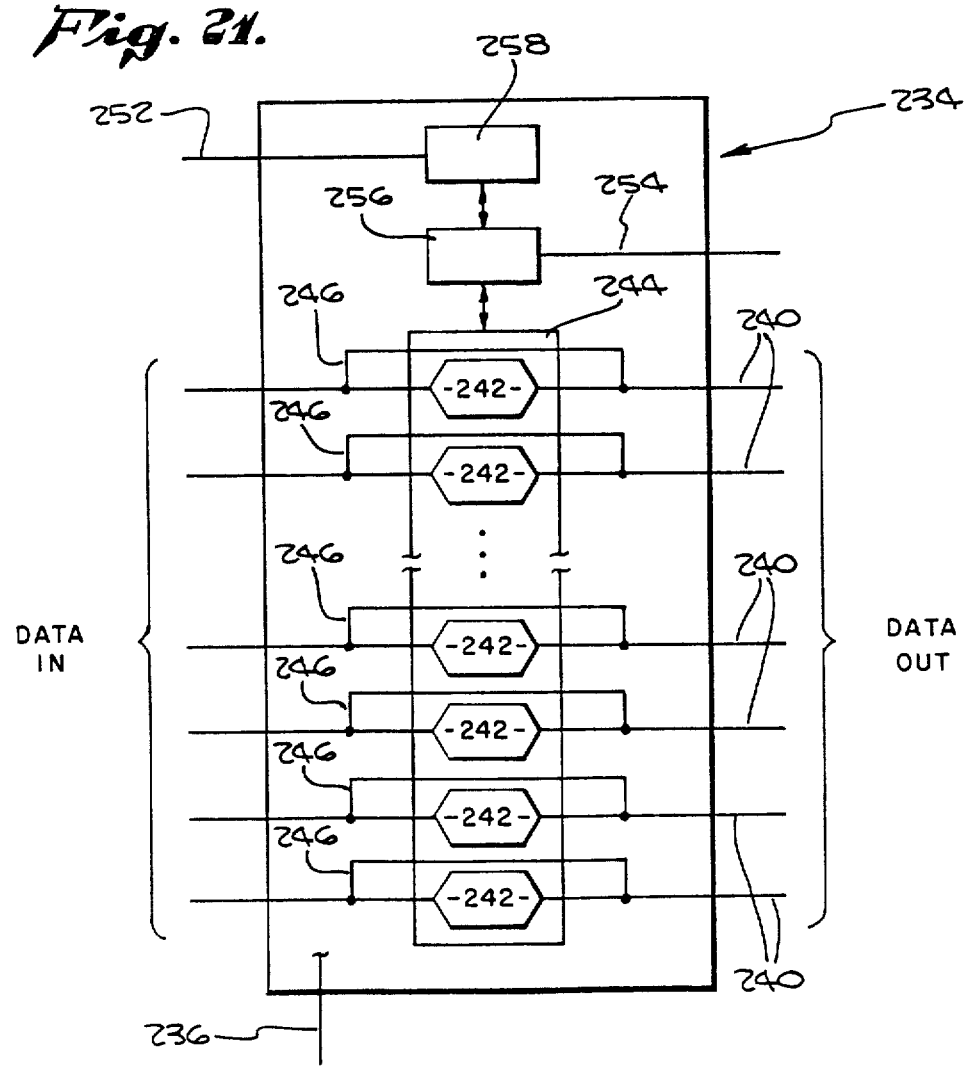
FIG. 21 is a detailed block diagram of one stage from FIG. 20.

With additional reference now to FIG. 21 with particularity, the mode of operation according to the present invention and an enlarged block diagram view of a single stage 234 thereof is shown. Each stage 234 of the queue or FIFO of the present invention contains a plurality of data lines 240, each carrying a unit of circulating data. In conventional structures, the data lines 40 pass into and out of latches 242. Each stage 234 according to the present invention also contains latches 242 on the data lines 240. Additionally, however, the latches 242 are contained within by-pass logic 244. Each latch 242 has a by-pass line 246 around the latch 242 controlled by by-pass logic 244. As symbolized by the arrows 248 and 250, the stages 234 communicate backward and forward, respectively. The stages 234 are interconnected by signal paths represented by the lines 252 and 254 in FIG. 21. Each stage 234 contains forward logic 256 and backward logic 258 capable of impressing signals on the line 252, 254 and reading signals therefrom in order to control the action of the stage 234. The bypass logic 244 and the two logics 256, 258 are combinatorial logic circuits whereby numerous signals can be sent and received and appropriate actions taken at the stages 234 between clock pulses on line 236 so as to effect the objectives of the present invention.

Each stage 234 can be in one of four states and will take appropriate action depending upon its state. These four states, the significance thereof, and the actions to be taken are described in the Table of FIG. 22. In state number 1, there is valid data present in the latches 242. If backwards logic 258 senses that the next stage in sequence will accept data, it means that data in the latches 242 of this stage can be shifted forward to the next stage and, therefore, the backwards logic 258 of this stage can signal the stage preceding it that it will accept data. As a result, the data in the latches 242 is shifted out, the clock coming in on line 236 is enabled, and the incoming data is sent to the latches 242 of this stage.

In state number 2, valid data is once again contained in the latches 242 of this stage. By contrast, the next stage is signaling that it will not accept data under those conditions. This stage 234 can do nothing except maintain the data presently in its circuits. The clock on line 236 is inhibited for this stage, any incoming data is not accepted, and nothing is shifted out.

In state number 3, this stage 234 has no valid data. The next stage, however, is signaling that it will accept data. Under such conditions, there is no need for the latches 242 of this stage to become involved. Consequently, the by-pass logic 244 connects the by-pass line 246 between the input and output on each line such that the incoming data is propagated directly to the output, thus bypassing the latches. This, of course, is the novel fast propagation forward feature of the present invention.

In state number 4, this stage 234 contains no data and the next stage is signaling that it will not accept data. This stage, therefore, can accommodate any available data and so signals. Nothing is shifted out but the clock is enabled and any incoming data is sent to the latches 242 of this stage.

Thus, not only has the computer architecture according to the present invention been described, but additionally, the functional design for novel and necessary cross-bar and queue structures as would be employed in such a computer architecture have been described. The construction of the cross-bar circuit and the queue circuits will now be described with reference to particular embodiments thereof so as to completely describe them sufficiently for those skilled in the art to build them as necessary. It is to be understood that the following design is only one possible approach to turning the principles of the present invention into a real machine. It is probably the most literal interpretation in the sense that one can identify a swarm of tokens and a swarm of activities, and can also see that the physical location of both is not only insignificant but, in fact, is continuously changing. Tokens are absorbed by activities when the two "happen" to meet. There is no concerted effort to bring tokens directly to the corresponding waiting activities (or vice versa). Instead, activities scan the swarm of tokens looking for those tokens which apply to them. When the activities find those, they remove those tokens from the swarm. The circuits insure that, eventually, activities will find their tokens. The probability of an activity never finding its tokens is virtually zero.

Other additional architecture could be provided to take more deliberate means to bring tokens together with their activities. Recall in this concept, it is possible for either the tokens or the corresponding activity to appear first in time. Associative circuits, then, must manage either contingency. Those skilled in the art should recognize an associative approach in the following design, although the associative function is not concentrated into a well-defined "associative functional block", "associative memory", "associative switching network", or whatever. Instead, the associative function is distributed throughout the entire machine.

The basic logical machine of FIG. 9 consists of four elements. These are (a) the token queue 76, (b) the activity queue 82, (c) the processors 70, and (d) the function store 90.

The token queue 76 is the novel shift register (FIFO) which moves the tokens 72 past the processors 70. The tokens 72 are in constant motion. Gating is provided to permit the processors 70 to "absorb" tokens 72 from the token queue 76 as they pass by. Tokens 72 that are not absorbed while passing over the processors 70 simply return over the closed-loop path and pass over the processors 70 again. In a properly designed machine where deadlocks are avoided, each token 72 will eventually be absorbed by the activity 78 that is expecting it. Note, this also assumes the machine is properly programmed as well.

The activity queue 82 is of the same novel construction and carries descriptors of activities 78. As is clear from the conceptual description above, the activity descriptors are a set of rules which must be "executed" to achieve execution ("firing") of an activity 78. One can think of an activity descriptor as a "program" which is to be executed by a processor 70. Therefore, the activity descriptors are brought into processors 70, which are capable of decoding the implied instructions in the descriptors and carrying them out. As activities 78 give birth to new activities 78, these new activities 78 are ejected onto the activity queue 82 where they follow the closed path, find their way into a processor 78, and ultimately fire. When an activity 78 has fired, its descriptor is simply erased, meaning that the processor 70, which was executing it will eventually simply declare itself free, i.e. the activity 78 which was executing in it has died. This free processor 70 is now available to accept a new activity descriptor from the activity queue 82 and begin its "execution". Remember of course, that the activity 78 may not be able to proceed until it has absorbed necessary tokens 72 from the token queue 76.

The function store 90 is a memory which can be read-accessed by all of the processors 70. At some initialization time, the user's replicators ("function library") are moved into the function store 90. Once this is done, together with causing some initial activity to appear on the activity queue 82, the machine can "bootstrap" itself and begin executing the program. Note, this program could actually be an "operating system"and not merely a user program.

The processors 70 themselves, then, are independent computers which interface to the overall system as shown. It should be recognized that a conventional computer, whether it be microprocessor or an enormous mainframe containing dozens of central processors, can be considered a single "processor" 70 in this machine. Exactly what the processor 70 looks like is not directly relevant to the present invention, which is more concerned with the interconnection of functionally-specified processors and the overall scheme used to co-ordinate them to work on a single specific user program. The processors 70 must be capable only of carrying out activities 78. Exactly how they do this is actually a "soft" specification, as almost any conventional computer can be programmed to perform that function, qualifying it for a position in this invention. More likely, however, a new design will emerge for these processors 70 for each new implementation of the present invention, disguising this "soft" specification as a "hardware" one. This is rhetorical, as the equivalence of one conventional computer to another is well understood in the art. The present invention encompasses any device which is capable of causing the effective functional "firing" of activities 78. It is sufficient here to note that a conventional computer can do this job.

Those skilled in the art will appreciate that such a logical structure assumes that there is sufficient capacity in each position of the token queue 76 to accommodate an entire token, both the label and the data (which could be very large structures such as matrices and higher-order arrays). This is not yet completely practical, so some "extension" of the token queue 76 will most likely be needed for implementation in the near future. It should be noted, though, that the machine will perform most effectively when any "extension" can be bypassed. That is, when, in fact, an entire logical token 72, can fit into a position in the token queue 76. Depending on the implementation, this is not an always/never proposition. Some tokens 72 will fit, and some tokens 72 won't. Individual tokens 72, then, may be provided with the ability to call on the "extension". Those that don't need it then, would not have to deal with it.

A similar argument applies to the activity descriptors. Of particular concern is the specification of "constants" in activity descriptors. Constants can be very large structures as well.

Finally, the replicator store 90, in a real machine, will have to deal with contention problems of one form or another from the continuous reproductive activity of the activities 78 in the processors 70.

Deadlocks can appear at several points. The two most obvious are running out of capacity in the token queue 76, and running out of capacity in the activity queue 82. For example, an activity 78 (in a processor 70) wanting to give birth to a new activity 78 may find that the "activity queue out" cannot accept the new "son", so the activity 78 will have to wait until the room appears. Until then, it occupies a processor 70. If enough processors 70 are tied up this way, the full activity queue 82 will have no processor 70 to shift into, insuring that the activity queue 82 will have no capacity and producing deadlock. The same thing can happen in the token queue 76.

Assuming that the queues 76, 82 can be built with enough capacity to accommodate new tokens 72 and activity descriptors, deadlocks can still occur. Processors may be filled with a subset of the activities which are waiting on tokens 72, and those tokens 72 will be produced only if some of the activities 78 which are not in the processors 70 are allowed to execute. Those occupying the processors 70 stay there waiting for tokens 72 which, simply because they are sitting there waiting, can never be generated by the activities 79 which are not yet in the processors 70. This can be monitored, with some difficulty, by noting when all the processors 70 have become full. Each processor 70 can be programmed to give a logic signal indication of a "wait for token" condition. If the logical AND of all of these signals from all the processors 70 ever emerges as TRUE, then all the processors 70 are waiting. At that moment, the token queue 76 can be monitored. When it is clear that the token queue 76 has rotated around enough times without a token absorption having taken place (again, the processors can provide the signals necessary to determine this) then a deadlock has occurred. Then the processors 70 have to be freed.

Toward eliminating some of the problems mentioned above, the improved machine of FIG. 10 consists of (a) a token queue 76 with a buffer 92, (b) an activity queue 82 with a buffer 94 and addressing circuits 96, (c) processors 70 as before, and (d) a memory subsystem, generally indicated as 98, which not only provides the function needed to implement the replicator store, but also the effective extensions of the token and activity descriptors.

The token queue 86 is improved by placing in it an expandable buffer 92, the above-described FIFO element which functionally swells and shrinks. The activity queue 82 also contains one of these accordion buffers 94.

The memory subsystem 98 consists of (a) many memory nodes 100 which will be defined below, (b) crossbar communications circuits 102 (to be discussed in detail hereinafter) which permit any processor 70 to communicate to any memory node 100, vice-versa, and permit any memory node to communicate with any other memory node, and (c) (not shown in the figure), a free-memory rotating queue which is connected to all memory nodes 100 and all processors 70, into which a memory node 100 places its own address when it considers itself "free" and from which either a processor 70 or a memory node 100 may remove such names in order to claim free memory for its own use.

Memory nodes 100 are processors themselves and, therefore, any conventional computer can serve this purpose. Unlike the activity processors 70, however, memory nodes 100 perform different functions. The only real difference between memory nodes 100 and activity processors 70 is that functional one. Activity processors 70 are expected to execute activities 78, while memory nodes 100 are expected to manage auxiliary memory functions required by actions initiated by the activity processors 70. Implementors will probably find that activity processors 70 and memory node computers 100 will be different from each other, but that (with a few exceptions) all activity processors 70 are alike, and all memory nodes 100 are alike. In this way, the benefits of massproduction can be gained in producing the thousands of processors of each type which are envisioned as being integrated as components of the present invention.

All processors 70 each have a unique "processor address" and all memory nodes 100 each have a unique "memory node address". These addresses are required in order for the processors 70 and memory node computers 100 to direct messages to each other.

The function library 90 can now be contained in one or more distinguishable memory nodes 100. Although each memory node 100 is able to write as well as read into its internal memory, the function library 90 is never to be altered once it is placed into the machine during execution of its functions. However, the writability of that memory permits the initial function library load.

Memory nodes 100 can be viewed as being intelligent storage areas, each providing some minimum amount of memory capacity which is available for allocation and use by the other processors 70 in the system. If one thinks in terms of the machine's logical quanta ("words," which are logical data units, not physical, so that they need not be fixed-length physically) there is an apparent capacity of NODE LENGTH words. Memory nodes 100 will require enough physical memory to provide this minimum capacity as seen by outside units, and additional storage as well, in order to contain the control program and scratch storage for internal operations.

Input-output is also achieved through the memory subsystem 98 by attaching peripheral devices to memory nodes 100 and modifying the control programs of those nodes. Activities 78 can be informed, via the supplied program, of the address of these memory nodes 100, so that the addresses of those nodes become I/O addresses. Input and output generic activities (which in this machine require one and two input tokens to "fire" respectively) are supplied this "format" information (containing the I/O address) on one of its input tokens. The second input token of the OUTPUT generic activity is the data to be output, which is passed to the memory node which manages all formatting as per predefined rules OUTPUT then, produces an "acknowledge" output token. INPUT does not permit the input data token to enter the system until it absorbs a "format" token which describes where the input is to come from. At that point, the activity 78 gathers a token from that memory (I/O node) whose address was specified in the format token, and outputs the data token into the token queue 76.

Some additional benefits can be gained for the configuration of FIG. 11. The problem of contention for the function library 90 can be taken care of by brute-force. As it is a read-only structure, it can be copied by all of the processors 70 out of the memory subsystem 98 and into their own internal storage, so that processors 70 about to require information from the function library 90 do not have to invoke the memory subsystem 98 to obtain it. The processors 70 can be instructed to make this copy during a reset sequence initiated after the function library 90 has been moved into the memory subsystem 98. Logically, as all copies are identical, it is still the same function store (i.e. a "virtual" function store).

Any processor 70 has to be prepared to execute any activity descriptor with any possible combination of variables. Therefore, every processor 70 will have pretty much the same internal control program which contains the detailed rules and definitions for each generic activity 78 defined in the system, as well as the rules for how to declare itself "idle", what to do when it is idle, what to do if system deadlock is declared, and so forth. This control program can be burned-in to ROM, for example, making the soft definitions much less easily altered. Alternatively, the same previous described technique can be used, during an initialization sequence, of loading the control program into the memory subsystem 98 and then instructing all activity processors 70, which are executing some minimal "bootstrap", to make a copy of it. In this way the very "instruction set" of the machine can be quickly modified, providing for rapid definition of new generic activities or other functions. This is a soft approach to "microcoding" in the sense that these control programs support the user's applications code described in terms of tokens 72, activities 78, and function libraries 90.

Most important, though, is that tokens 72 which do not "fit" into the token queue 76 can have part of themselves reside in the memory subsystem 98. The same is true for activities 78 and constants. Once this is done, it leads to tremendous advantages in the very important operations of duplicating, splitting, and concatenating structures simply by managing "use counts" in the memory subsystem 98 and replicating pointers into the memory. Memory nodes 100, within certain restrictions, should be permitted to re-organize the structures which they may contain so as to keep them as balanced as possible. This represents no overhead to activity executions unless the memory node 100 is unable to service requests while it is performing such an internal reorganization, and very often it will be able to service external requests during such operations as the requests might not always require access into the structure itself. The benefits of keeping structures as "balanced" as possible is clear in the context of "splits", which try to divide sequences roughly in the middle. If this is not achieved, logarithmic algorithms could deteriorate into linear ones (in terms of their execution time) or even worse. This is one reason for memory nodes 100 each having their own data processing capability, to manage such reorganizations automatically.

The processors 70 of the machine are arranged, logically, as a matrix of X rows with Y processors 70 in each row. The token queue 76 moves over the processors 70 parallel to this Y-axis, that is, from row to row. Processors 70 are assumed to have NIP physical input ports each, and NOP physical output ports. The number of input ports in one row is NIP.Y=NI, and the number of output ports per row is NOP.Y=NO. The token queue 76 actually moves L token positions over each row in parallel. The ratio (NO/L) is assumed integral, L is assumed even and X is assumed even. (NO/L)=K.

A physical token position is TW parallel bits. These break down into one "PA" bit, NCL "CL" bits, and NRD "RD" bits. "PA" indicates presence/absence, "CL" corresponds to the (present) token's call address, and "RD" accounts for the "remaining data".

A physical activity queue position is AW parallel bits. These break down into one "PA" bit, ADW "address" bits, and the remaining bits. AP=(AW−1), so these remaining bits are AP - ADW in number.

The activity queue 82 is, physically, J activity positions "wide" so that J activity positions move toward the processors 70 on each queue shift. J is assumed even. The activity queue 82 moves in the direction of the x-axis, that is, across the columns of the processor matrix. It is logically at right angles to the token queue 76.

The memory subsystem 98 consists of mu ($\mu$) memory nodes 100, each of which provides an apparent memory resource of NODE LENGTH words to the rest of the system. Therefore, the address of a memory node 100 (MNODE=X) can be described in roof (log $_2\mu$) bits. Processors 70 also have addresses (PROC=x) and can be described in roof (log (X.Y)) bits.

Using a massive crossbar circuit 100 of novel design (to be discussed shortly), the path between any two intercommunicating points is MTW bits in parallel, and sequential transfers at this parallel width are assumed. MTW does not correspond to any logical quantum (necessarily), such as a "word". Additional address lines and crossbar control lines are also included.

The memory subsystem 98 also includes the "free memory queue" (not shown) which has $\mu$+XY positions.

Processors 70 in the X-Y matrix are assumed to have one activity input port and one activity output port each. They also interface to the memory subsystem 98 and the free memory queue, and to the token queue 76 as indicated above.

All autonomous (physically) processors 70 may have their own internal clock, provided their operation is synchronous with the external circuits to the degree that adverse behavior is avoided. Beyond this, there are three system clocks, which drive the (synchronous) circuits of the token queue 76, activity queue 82, and memory subsystem arbitration networks respectively. These clocks may also be independent. The token queue clock is assumed to run as fast as possible. The activity queue clock should be also as fast as possible. The memory clock should be as fast as reasonable in view of achievable transfer rates into the activity processors 70 and the memory node processors 100.

Finally, an overseeing "monitor" processor is necessary as a sort of machine "front panel" which senses adverse condition signals generated by the subsystems, takes care of generating resets, alarming the machine operator, and otherwise managing the "watchdog" function over the machine proper.

The drawings of the figures which are described herein are logical schematics only. They do not delve into the details of gate delays and fanouts, as any designer skilled in the art knows how to modify the designs to handle these properly. The design is also committed to no particular technology. This is positive logic, 1=true, 0=false.

MEMORY AND INPUT-OUTPUT SUBSYSTEM DETAILED CIRCUITS

Figure 23:
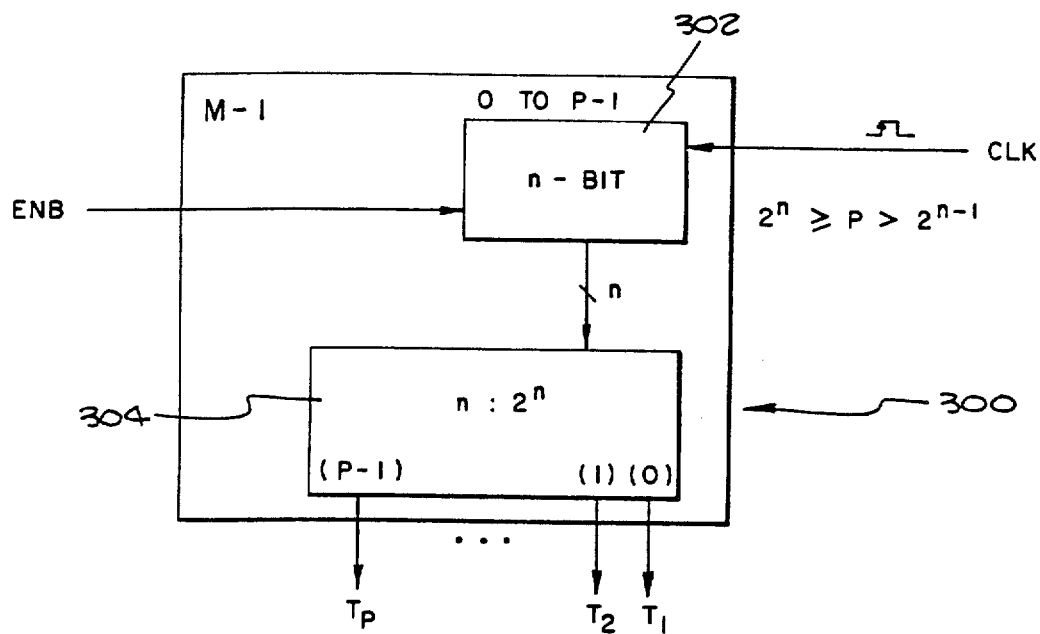

M-1 P-bit Rotating One-bit. Generally indicated as 300 in FIG. 23.

Given an integer "p" (p>0) there is some integer n such that $2^n \geq p > 2^{(n-1)}$. Then the circuit shows an n-bit binary up-counter 302 with these properties: (a) the output of the counter changes after an appropriate delay from the rising edge of the positive-duty clock, as shown; (b) the counter cycles through the values 0, 1, . . ., (p-1), then follows (p-1) with 0, 1, . . . ; (c) if ENB=0 on the rising edge of the clock pulse, the output of the counter will not change after the pulse has passed. Construction of such a counter is straightforward and should be obvious to those skilled in the art (consider for example, TTL 161 circuits).

The n-bits of the counter are input to an n-in, $2^n$-out decoder 304 which always has one output line true (1) and all other lines false. The line which is true corresponds to the binary value represented on the n lines from the counter; therefore the decoder will present $T_1=1$ (and all other $T_i=0$), then (on the next clock pulse which changes the counter) $T_2=1$ (and all other $T_i=0$) and so on. $T_1$ corresponds to counter output=0, $T_2$ corresponds to counter output=1, . . . , and $T_p=1$ corresponds to counter output=(p-1).

The result is a circuit 300 which (assume ENB=1) has a one-bit rotating around the p outputs, with all the other outputs zero.

Figure 24:
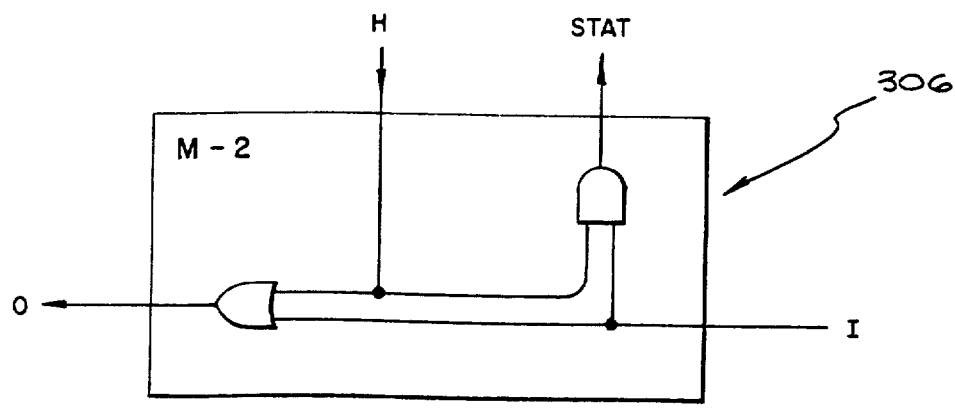
FIG. 24 shows circuit M-2 which is the break-in switch circuit.

M-2: Break-in Switch. Generally indicated as 306 in FIG. 24.

This circuit, if H=1, passes input I to STAT, and a logic 1 to output "O". If H=0, input I is copied to output "O" and STAT is a logic zero.

Figure 25:
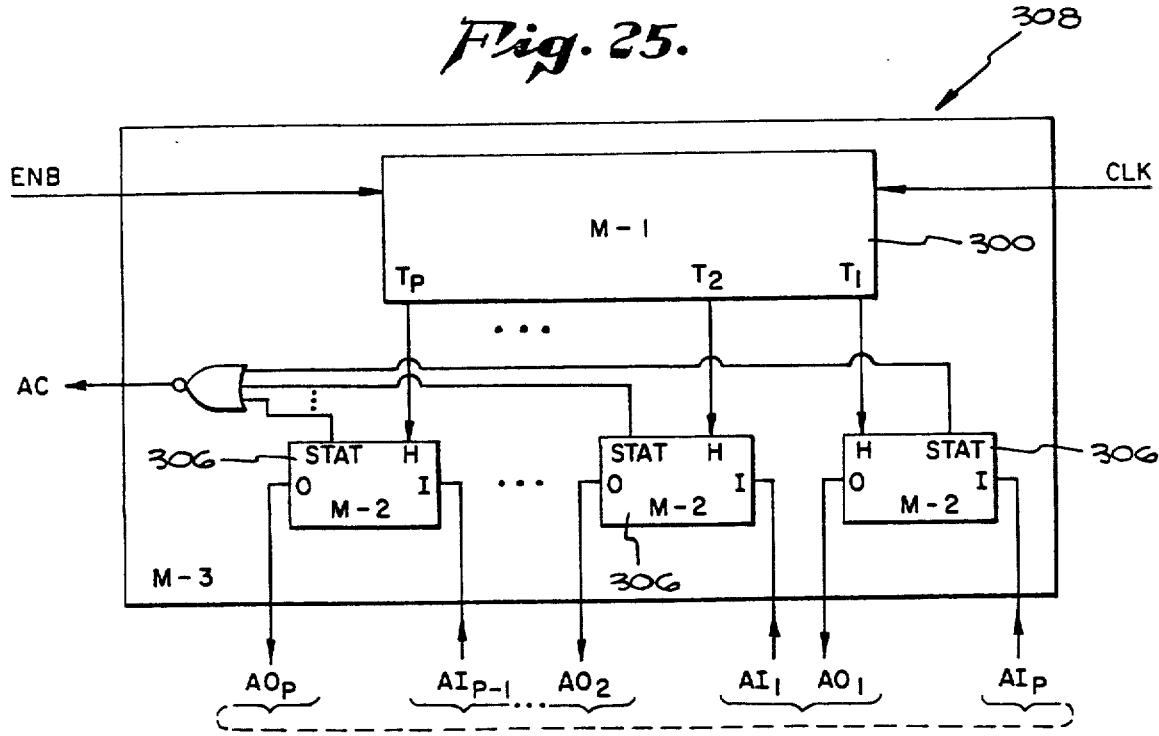
FIG. 25 shows circuit M-3 which is the arbitration signal generator circuit.
Figure 26:
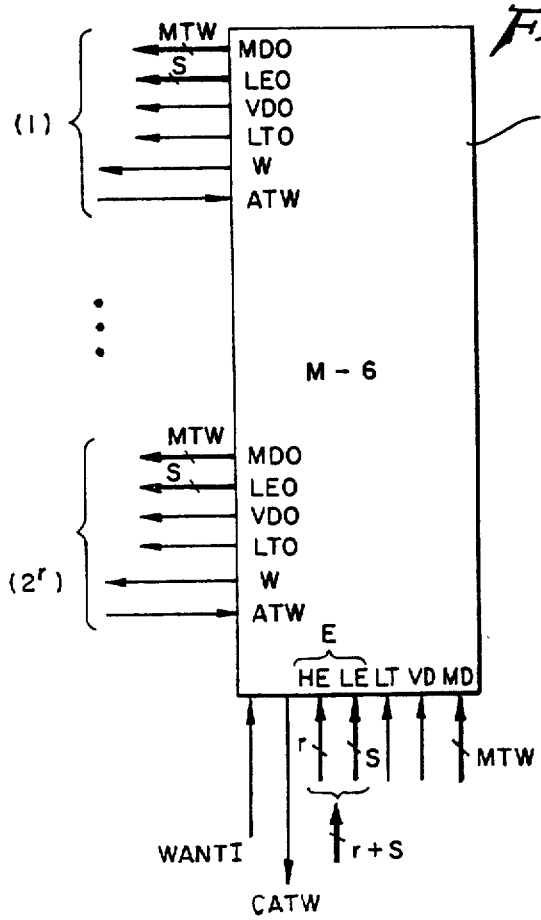

M-3: Arbitration Signal Generator. Generally indicated as 308 in FIG. 25.

This circuit is presented without further comment than to note that only one of the P M-2 circuits 306 will have its H-input=1, so that the AC output is simply equal to the inverse of the STAT of that M-2 306 having H=1. Note also that the "I" and "O" lines are grouped together such that the "O" output of any given M-2 306 is associated with the "I" input of the next M-2 306, except for the output of the $p^{th}$ M-2 306, which is associated with the input of the first M-2 306. It should be readily recognized that the designations of 1, 2, ..., p are somewhat irrelevant, as the circuit 308 defines a ring where no one M-2 306 is more important than another.

Figure 27:
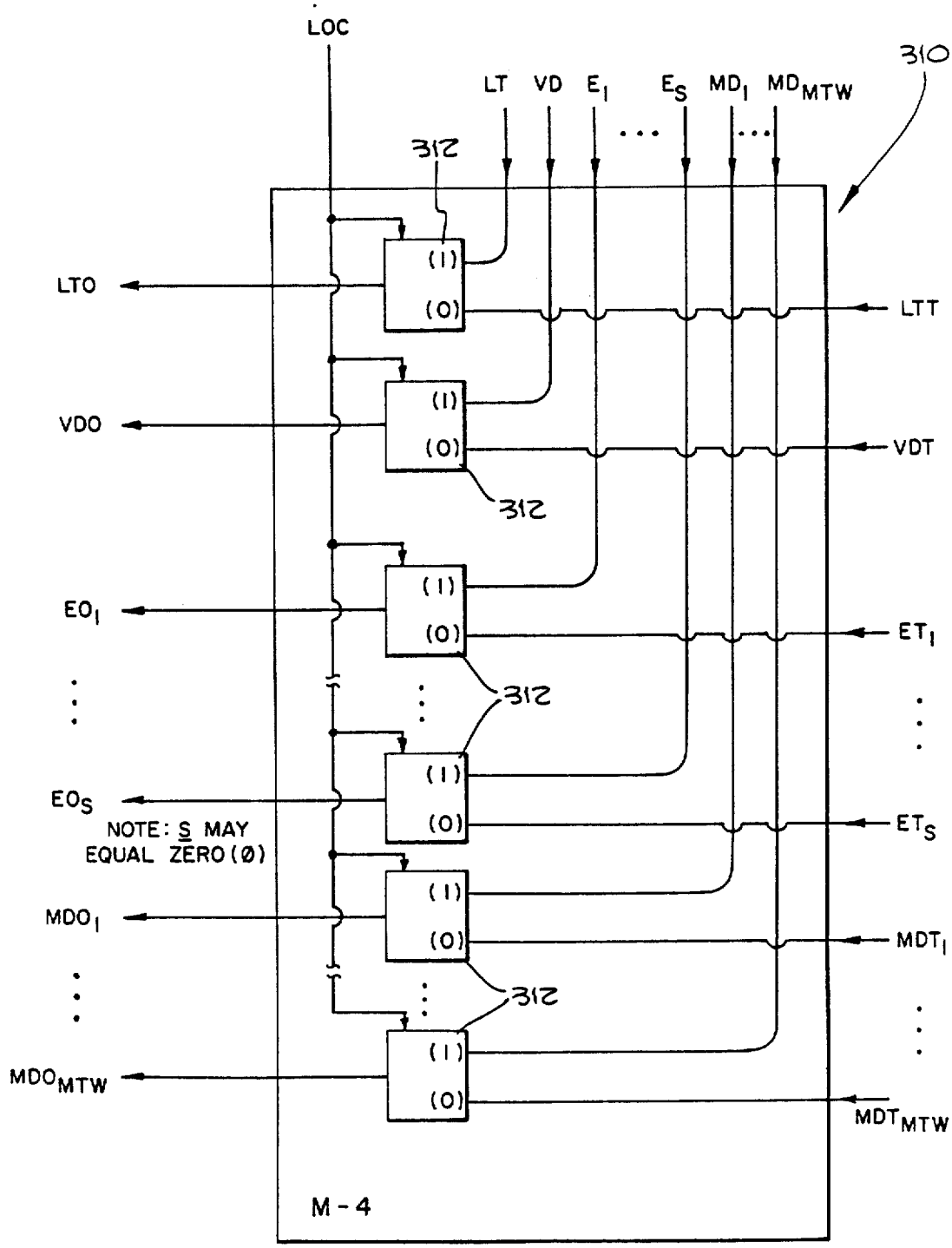
FIG. 27 shows circuit M-4 which is the innermost crossbar multiplexer circuit.

M-4: Innermost Crossbar Multiplexer. Generally indicated as 310 in FIG. 27.

Each box 312 is a 2:1 MUX. Output lines LTO, VDO, EO ("s" parallel lines) and MDO ("mtw" parallel lines) are copies of corresponding LT, VD, E, and MD if LOC=1, else (LOC=0) are copies of corresponding LTT, VDT, ET, and MDT. "s" may equal zero. That is, "E" lines are not always needed.

Figure 28:
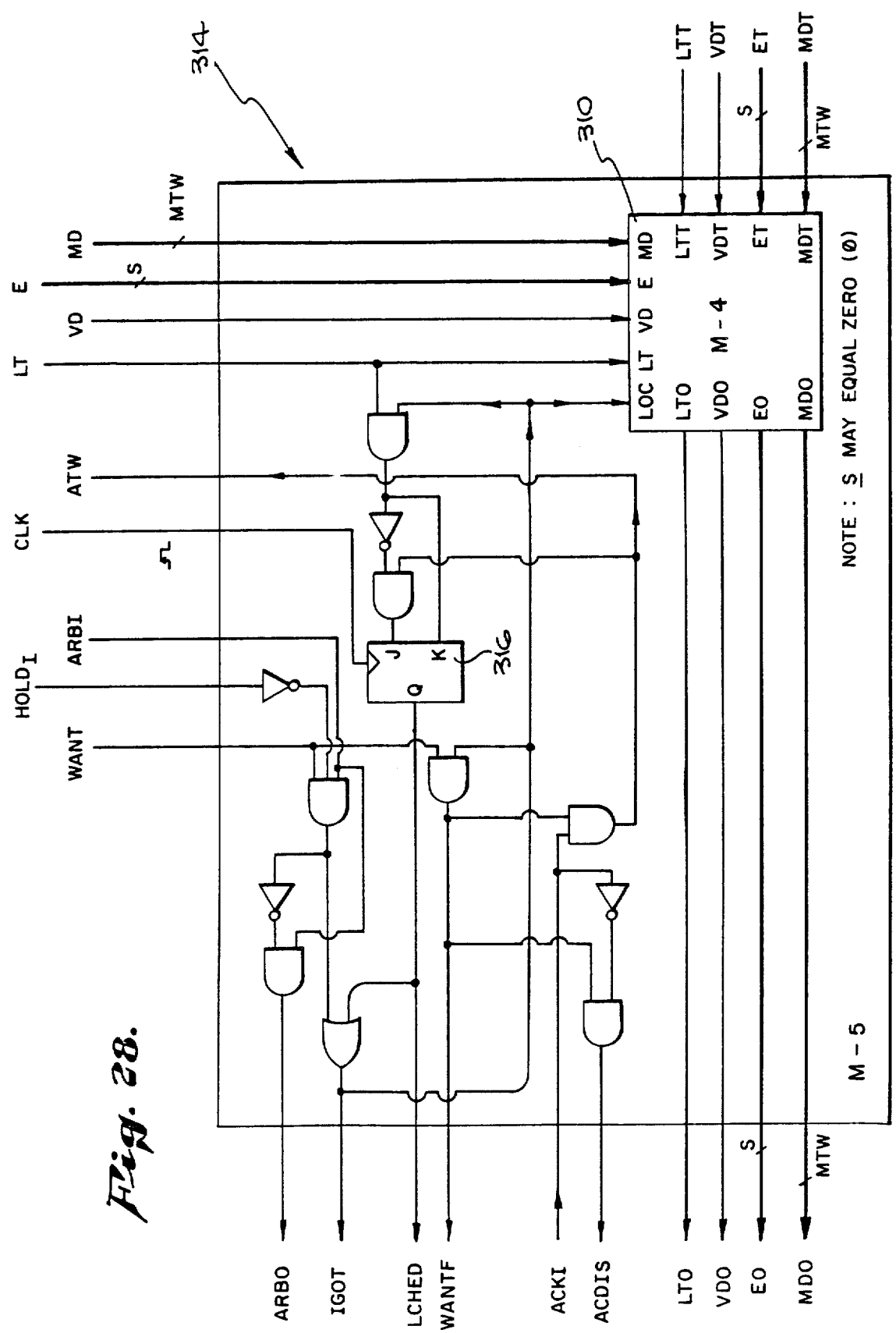
FIG. 28 shows circuit M-5 which is the innermost path latch circuit.

M-5: Innermost Path Latch. Generally indicated as 314 in FIG. 28.

This circuit is complex enough to be best described simply by Table 1 which is a truth table of five independent variables However, the circuit shows a J-K flipflop 316. As always herein, this is meant only to indicate any appropriate memory device having the properties in this circuit: (a) inputs J and K are sampled on the rising edge of the clock pulse, but output Q does not change until after an appropriate delay; (b) if J=1 and K=O on the rising edge, then Q will be 1 after the pulse has passed; (c) if J=0 and K=1 on the rising edge, then Q will be zero after the pulse has passed. (d) if J and K are both O, then Q will remain as it was before the clock pulse arrived. Note that, in this circuit, it is not possible for both J and K to equal 1 at the same time.

A systemwide reset pulse (not shown) causes these J-K flipflops in all M-5 circuits 314 in the system to output a zero (Q=0).

There are actually six independent variables (one of them being input signal ACKI) but Table 1 is in terms of five, with ACKI appearing in the table itself and meant to indicate 1 if ACKI=1, or 0 if ACKI=0, whenever ACKI appears in the truth table as a dependent variable output.

TABLE 1

| WANT | ARBI | HOLDI | LCHED prior to clock pulse | LT | IGOT | WANTF | ATW | LCHED after clock pulse |
|---|---|---|---|---|---|---|---|---|
| 1 | 1 | 1 | 1 | 1 | 1 | 1 | ACKI | 0 |
| 1 | 1 | 1 | 1 | 0 | 1 | 1 | ACKI | ACKI |
| 1 | 1 | 1 | 0 | 1 | 0 | 0 | 0 | 0 |
| 1 | 1 | 1 | 0 | 0 | 0 | 0 | 0 | 0 |
| 1 | 1 | 0 | 1 | 1 | 1 | 1 | ACKI | 0 |
| 1 | 1 | 0 | 1 | 0 | 1 | 1 | ACKI | ACKI |
| 1 | 1 | 0 | 0 | 1 | 1 | 1 | ACKI | 0 |
| 1 | 1 | 0 | 0 | 0 | 1 | 1 | ACKI | ACKI |
| 1 | 0 | 1 | 1 | 1 | 1 | 1 | ACKI | 0 |
| 1 | 0 | 1 | 1 | 0 | 1 | 1 | ACKI | ACKI |
| 1 | 0 | 1 | 0 | 1 | 0 | 0 | 0 | 0 |
| 1 | 0 | 1 | 0 | 0 | 0 | 0 | 0 | 0 |
| 1 | 0 | 0 | 1 | 1 | 1 | 1 | ACKI | 0 |
| 1 | 0 | 0 | 1 | 0 | 1 | 1 | ACKI | ACKI |
| 1 | 0 | 0 | 0 | 1 | 0 | 0 | 0 | 0 |
| 1 | 0 | 0 | 0 | 0 | 0 | 0 | 0 | 0 |
| 0 | 1 | 1 | 1 | 1 | 1 | 0 | 0 | 0 |
| 0 | 1 | 1 | 1 | 0 | 1 | 0 | 0 | 1 |
| 0 | 1 | 1 | 0 | 1 | 0 | 0 | 0 | 0 |
| 0 | 1 | 1 | 0 | 0 | 0 | 0 | 0 | 0 |
| 0 | 1 | 0 | 1 | 1 | 1 | 0 | 0 | 0 |
| 0 | 1 | 0 | 1 | 0 | 1 | 0 | 0 | 1 |
| 0 | 1 | 0 | 0 | 1 | 0 | 0 | 0 | 0 |
| 0 | 1 | 0 | 0 | 0 | 0 | 0 | 0 | 0 |
| 0 | 0 | 1 | 1 | 1 | 1 | 0 | 0 | 0 |
| 0 | 0 | 1 | 1 | 0 | 1 | 0 | 0 | 1 |
| 0 | 0 | 1 | 0 | 1 | 0 | 0 | 0 | 0 |
| 0 | 0 | 1 | 0 | 0 | 0 | 0 | 0 | 0 |
| 0 | 0 | 0 | 1 | 1 | 1 | 0 | 0 | 0 |
| 0 | 0 | 0 | 1 | 0 | 1 | 0 | 0 | 1 |
| 0 | 0 | 0 | 0 | 1 | 0 | 0 | 0 | 0 |
| 0 | 0 | 0 | 0 | 0 | 0 | 0 | 0 | 0 |

It would be difficult to discuss each of the 32 cases in depth at this point, so no such attempt at an explanation will be made. But, in capsule form, what is going on here is:

Bus (LTT→LTO, VDT→VTO, ET→EO, MDT→MDO) is a "horizontal" bus onto which several of these M-5 circuits 314 will be hung. All of these M-5 circuits 314 serve to try to gain control of this bus. If one gains control of the bus, it will route its own incoming data to achieve (LT →LTO, VD→VDO, E→EO, MD→MDO) and prevent any other M-5 314 from claiming this same bus. Therefore only one M-5 314 may claim the bus at a time (it is possible for the bus to be unclaimed, also). An M-5 314 tries to claim the bus by asserting WANT=1. At that moment, an involved arbitration series begins.

First, it is possible that this M-5 314 has already claimed this bus. This is indicated by the state of the flipflop 316. If LCHED=1, this M-5 314 already owns the bus. But, if LCHED=0, this M-5 314 must compete with the other M-5s 314 to try to stake a claim to it. This requires that (a) the bus be currently unclaimed in the sense that no other M-5's 314 flipflop 316 is set (indicated by HOLDI=0), and this M-5 314 must beat the competition on the arbitration line (ARBI→ARBO). This latter means that ARBI must be true. This M-5 314 will then output ARBO=0 to cause all subsequent M-5s 314 to see ARBI=0. One way or the other, that is, whether it already owns it (LCHED=1) or whether it wins a competition, it will cause IGOT=1, which controls the gating of the M-4 310 multiplexer.

If IGOT=1 and WANT is still true, the result is a WANTF=1 (want forward). That is, WANTF will not occur unless the current WANT was successful. WANTF (want forward), as will be seen, will cause competitions in other M-5s 314 in the overall crossbar network; and if all of these forward probes succeed, signal ACKI will be true. ACKI means, in effect, that the entire path from start to finish was claimed. Having established a complete path (ACKI=1) permits path-latching to occur Path-latching means that, once an entire path has been claimed, all flipflops 316 in all M-5s 314 in that path will be thrown to LCHED=1. Therefore, once the path is completed, it is claimed until such time as the flipflops 316 are reset (back to LCHED=0). If ACK-I=1, latching of the path will occur automatically on the next clock pulse unless line LT=1 (LT="last transfer").

If WANT=1 and ACKI=1, then signal ATW ("all the way") will become true. However, if a want forward (WANTF) is posted but ACKI=0 (forward claims failed) line ACDIS will go true. ACDIS, as will be seen, prevents the ARBI ARBO chain from changing its logical beginning and end (one should review circuit M-3, 308 in FIG. 25, and understand its purpose now) by preventing the counter 302 of an associated M-3 308 from advancing. Although this does not guarantee that this circuit will win the arbitration during the next clock period, it at least increases the probability of this.

For proper understanding, one must study, at some length, the overall behavior of M-5s 314 in the context of a complete M-8 circuit to be described shortly.

Figure 29:
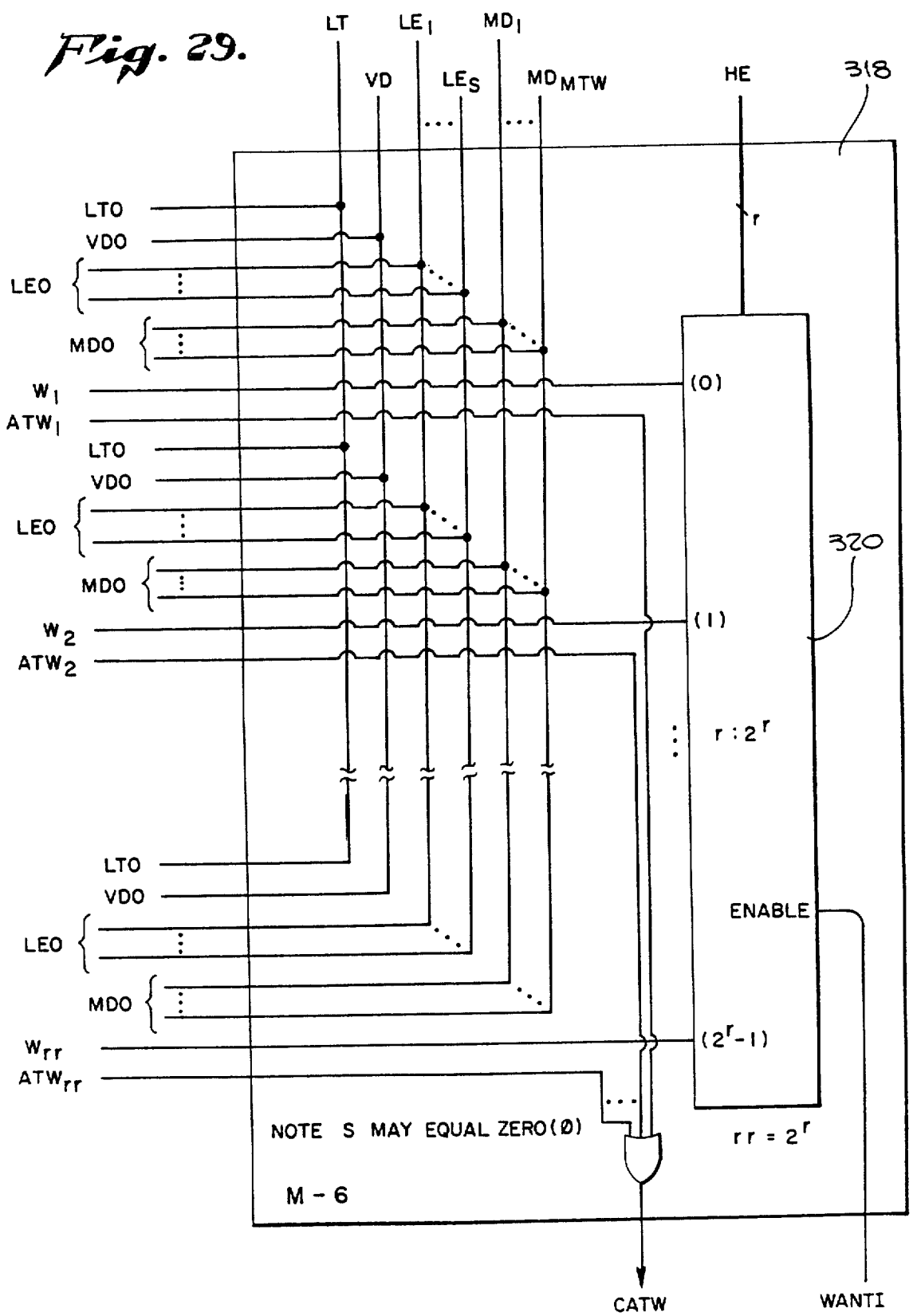
FIG. 29 shows circuit M-6 which is the want decoder circuit.

M-6: Want Decoder. Generally indicated as 318 in FIG. 29.

The source of lines (LT, VD, E, MD) in the M-5 circuit 314 is from one of the "legs" of this (M-6) circuit. They are simply direct fanouts of the (LT, VD, LE, MD) signals of M-6 318, respectively. A new set of R lines HE is introduced here which operates on an r:2$^r$ decoder 320 having the following properties. If its ENABLE is zero, all output lines of the decoder 320 will be zero. If ENABLE=1, then one and only one of the outputs will be true (the rest being false). The binary value represented in r determines which output (0, 1, . . ., 2$^r$-1) will be true. These control outputs $W_1$, $W_2$, . . . , $W_{rr}$ as shown (rr=2$^r$). There are also rr ATW$_i$ lines all ORed together to create a single unified signal CATW.

It is important to note here the grouping of the HE and LE lines in M-6 318. Think of HE meaning "high-order E" and LE meaning "low-order E." They are treated as a single bus M-6 318 "E" which is r+s bits wide. This is not the same as an M-5 314 "E" necessarily.

Figure 30:
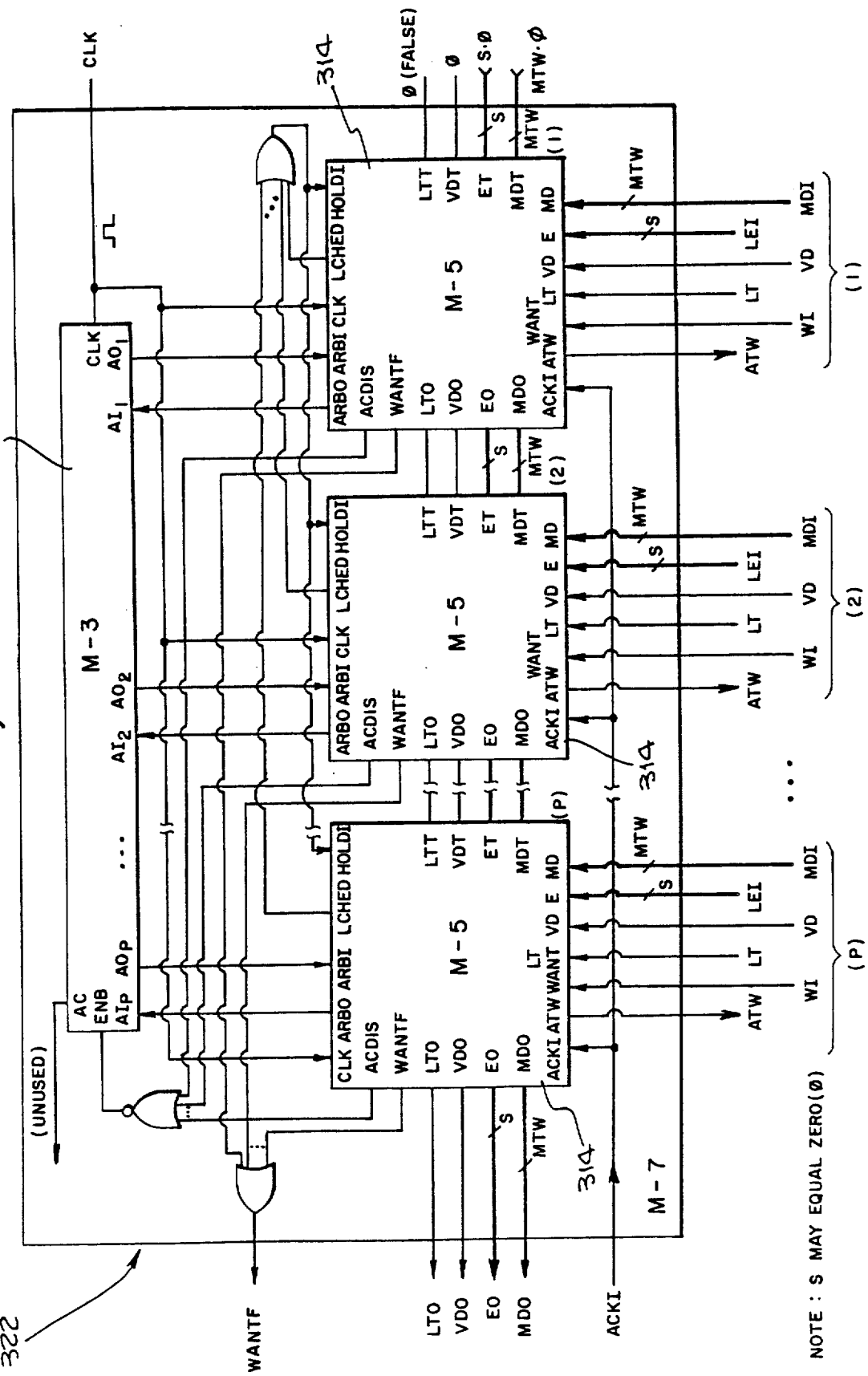
FIG. 30 shows circuit M-7 which is the P-Y compete four row circuit.
Figure 3L:
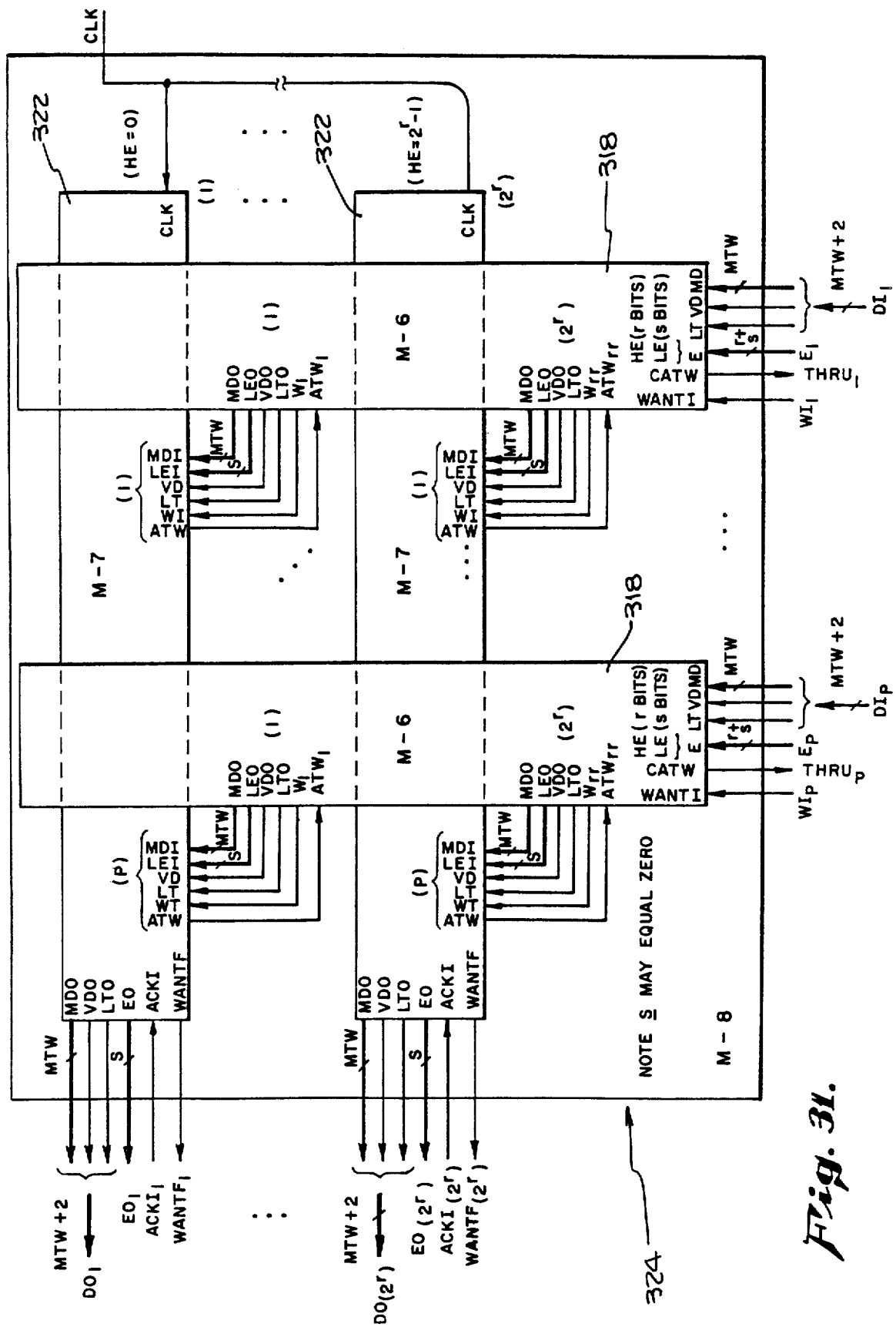

M-7: P-wide Compete for Row. Generally indicated as 322 in FIG. 30.

As stated earlier, many M-5's 314 will compete for this single "horizontal" bus. In general, there will be p M-5's 314. A single M-3 308 generates the ARBI - ARBO chain for the M-5s 314. Note that the M-3 308 will rotate the chain head/tail around as long as all ACDIS outputs of the M-5s 314 are all zero; but, if any one posts ACDIS=1 (arbitration counter disable) then the M-3 308 will freeze. The HOLDI of all the M-5s 314 is the OR of all the LCHED outputs of those same M-5s 314. The WANTF outputs of all M-5s 314 are ORed to form a single unified want-forward (recall that only one M-5 314 will be able to generate a WANTF at a time, as, at most, one M-5 314 will have control of this horizontal bus). The ACKI inputs to all M-5s 314 is also from a single source, as (for the same reason) this ACKI will have meaning only to one of the M-5s 314. The "right hand" end of the horizontal bus is tied to logic false. Everything is tied to the same clock.

M-8: P-compete, 2$^r$s Path-Latching Broadcast Crossbar. Generally indicated as 324 in FIG. 31.

This circuit is vitally important in the overall design. Consider some entity which would be able to generate signals into the inputs of one of M-6s 318 (say M-6 # "p", having inputs $E_p$ which is r+s bits wide, LT, VD, and MD all grouped together as $DI_p$, with return line $THRU_p$ and overall "boss" line $WI_p$.

DI represents data to be gated through the crossbar. It consists of line LT ("last transfer"), VD ("valid data") and the data lines themselves, MD ("memory data") which is mtw-bits wide ("memory transfer width"). Note that mtw has nothing to do (necessarily) with the width of a "word" or any such logical grouping of bits. In general, the bigger mtw is, the more information can go through the crossbar at any one time.

$E_p$ represents the address of the destination of the data, that is, where the data is supposed to go. It is represented as a binary integer which can be contained in r+s bits. With the data and address on the $DI_p$ and $E_p$ lines, that entity can then assert $WI_p=1$. As the path-finding circuits are purely combinatorial, this entity will be informed, within the same clock period as when it asserted WI, whether it has achieved the path or not. It is told this via $THRU_p$, with a successful path indicated by $THRU_p=1$. This is a very important aspect of the present invention.

Recall that, when the clock pulse arrives, this entity apparently will gain permanent possession of this path (assuming LT=0). Suppose that the entity does so, and permits the clock pulse to arrive having set WI=1, LT=0, and observing THRU=1. Then, after the clock pulse has passed, the path will have been locked-in by the J-K flipflops 316 in the M-7s 322. At this point, the entity could send a sequence of transfers to the destination (one transfer for each clock pulse) without having to assert WI anymore. The first such transfer could have accompanied the WI=1 assertion, as that data would be gated through to the destination even though the path was not locked by the flipflops 316 (it was at least locked by the arbitration mechanisms). The entity would indicate VD (valid data)=1 had it meant the receiver to pay attention to the data lines at that time. In general, if VD=1, the input data on MD lines is to be taken as valid.

The reason for permitting VD=0 is seen in the following scenario. Assume this entity has just locked up one path. It then decides that it wants to claim a second path without releasing the first one. If one studies the drawings carefully, it will be found that if this entity succeeds, it will be able to send the same data to both destinations at once, achieving a selective "broadcast" capability which could be very important in the performance of the computer system, assuming the memory nodes operate under a suitable algorithm. VD is 0 while the entity is staking the first claim, as it does not yet want to send any data until it has established all claims that it can. Then, it will begin sending data.

To release all of the paths it has locked up, it need only send one final data transfer having line LT=1. If one again studies the circuits in detail, it will be seen that all locked paths, no matter how numerous, will all be released as soon as the falling edge of the clock pulse arrives.

Obviously, this "crossbar" means that the entity may or may not succeed in staking a claim to the path it needs on the first try. If it sees THRU=0 when a clock pulse passes by, then it may be persistent and simply "hang" onto the input lines as long as it wants to. It is important to note that it is guaranteed that eventually the entity will "get through" provided that all such entities in the system follow some basic rules:

(1) no entity may wait indefinitely for a second, third, etc. path after having claimed a first one. That is, it may "hang" indefinitely for the first path but cannot do so for subsequent paths; and, (2) once all paths are established that can be established, the entity will make use of the paths and release them as soon as the transfers are complete. In other words, once a path has been established, it is required that (eventually) the path will be released.

As shall be seen, it may be reasonable for an entity to "hang" onto the inputs for several clock cycles in an attempt to establish a claim, but the longer it does so, the worse overall contention problems in the crossbar become (assuming all such entities behave the same way).

The crossbar switch strips r of the r+s bits from the incoming $E_p$ lines to determine which of the $2^r$ "horizontal busses" to contend for. What emerges on the output of the horizontal bus are the remaining s bits which were not yet used in the addressing effort. However, each of the horizontal busses corresponds to a single value for the r lines. In FIG. 31, the top M-7 322 corresponds to HE=0; the second (not shown) would be HE=1; and so on, until the bottom M-7 322 which corresponds to HE=$2^r$-1. All entities whose HE lines are the same bit configuration will compete for the same bus.

A shorthand (informal) designation for the M-8 324 circuit sometimes used herein is shown in FIG. 56 and has IN: (number of input ports, width of address supplied by input ports), OUT: (number of output paths, width of address passed through on output paths).

For example, as shown, the informal designator may have epsilon competing input ports (room for epsilon entities) and each such entity will supply an address ("E") which is alpha bits wide. The M-8 324, will use the first beta of these alpha bits resulting in $2^{beta}$ output paths. The address lines on these output paths will be the remaining (alpha - beta) bits.

The bit fields of the address are shown in FIG. 57. Field A, which is alpha bits wide, is broken up into fields B and C by the action of the M-8 circuit. Field B is beta bits wide; and it is field B which is effectively decoded and used to direct the data. Field B, being beta bits wide, can take on the values B=0, B=1, . . . , B=($2^{beta}$- 2), and B=($2^{beta}$- 1). There is a unique output from the M-8 324 circuit for every such value of B. Note that not all such output paths have to lead anywhere necessarily, as paths with nothing important "out there" can simply be considered an "undefined destination address."

Synthesis of Larger Crossbars. Shown with reference to FIG. 58.

This important recursive design step permits the construction of crossbars of conceptually unlimited size, with constraints being those of implementation details, and also of the increasingly hostile probabilities for achieving a complete path from input to output. These probabilities are actually a consequence of the increasing number of input entities, with the exact design of the crossbar having a lesser effect than one might at first assume.

The formula given here is for the sake of simplicity, as it is obvious that it is not necessary that all M-8s 324 used in the synthesis of the larger M-8 324 be identical, as long as there are no errors in terms of misdirected addresses. However, the process is most easily understood that way.

Begin with an IN: (epsilon, alpha), OUT: ($2^{beta}$, alpha-beta) crossbar 324'. The total number of inputs such a circuit provides for is epsilon.

Figure 58:
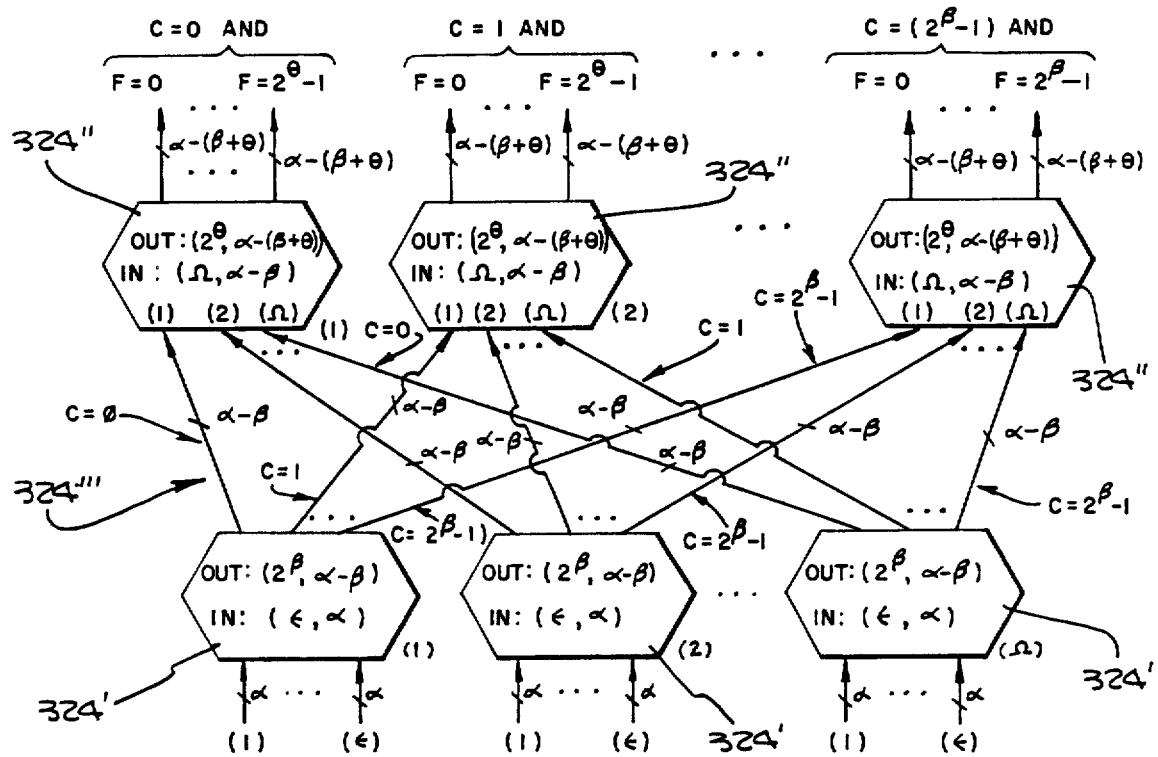
FIG. 58 is a block diagram showing the synthesis of larger crossbars.

Now, place omega of these same circuits 324' side-by-side, as shown on the bottom of FIG. 58. Each of these epsilon-in circuits 324' has $2^{beta}$ outputs, each output corresponding to one possible configuration of address bit-field "C" as shown in the drawing of FIG. 60.

Next, place $2^{beta}$ M-8s 324" which are IN: (omega, alpha-beta), OUT: ($2^{theta}$ alpha-(beta+theta). The first of these $2^{beta}$ will correspond to field C=0, the next for field C=1, and so on until the last is for field C=$2^{beta}$-1.

Now connect the lower row of M-8s 324' to the upper row of M-8s 324" as shown. The lower row's first M-8 324' has its C=0 output directed to input one of the C=0 M-8 324" in the upper row. The lower row's second M-8 324' has its C=0 output directed to input one of the C=0 M-8 324" in the upper row, etc. The lower row's omegath M-8 324' has its C=0 output directed to input omega of the C=0 M-8 324" in the upper row. Now, the lower row's first M-8 324' has its C=1 output directed to the first input of the C=1 M-8 324" in the upper row. The lower row's second M-8 324' has its C=1 output directed to the second input of the C=1 M-8 324" in the upper row and so forth.

The upper M-8s 324" strip off an additional theta bits to achieve address decoding, so the emerging address lines from the top of these M-8s 324" is (beta+theta) bits narrower than the address lines coming into the lower M-8s 324'.

Figure 59:
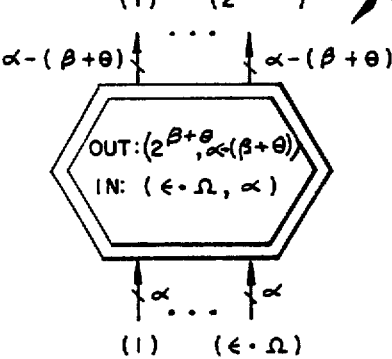
FIG. 59 is a shorthand notation for an expanded M-8 circuit.

The result, though, is something that looks exactly like another M-8 324, although its internal complexity is greater. This is not visible to outside entities, however, so is functionally transparent. The result is an IN: (epsilon×omega, alpha), OUT: ($2^{beta-theta}$, alpha-(beta+theta)) M-8 324'''. The shorthand symbol therefor is shown in FIG. 59.

Fully decoding Path-Latching Broadcast Crossbar. Shown with reference to FIGS. 61 and 62.

Figure 62:
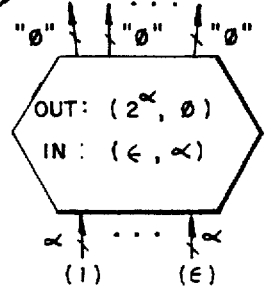
FIG. 62 is an informal designation for the circuit of FIG. 61.
Figure 61:
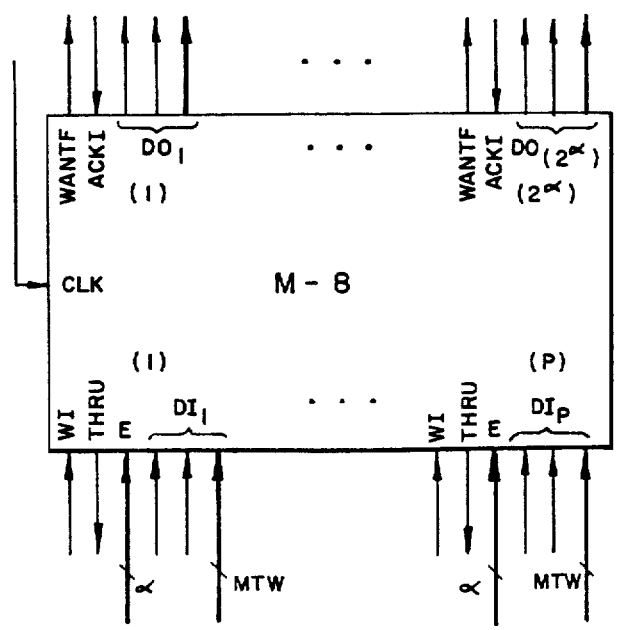
FIG. 61 shows the special case of an M-8 circuit which results when there are alpha address bits on the inputs and $2^{alpha}$ outputs.

The drawings of FIGS. 61 and 62 deal with this special case of an M-8 circuit 324, which results when there are alpha address bits on the inputs, and $2^{alpha}$ outputs. In that case, there are no more address bits available for passing through as outputs EO, so these outputs do not appear. The informal designation of FIG. 62 indicates this situation by showing outcoming address paths of width zero; and in general the informal designation for such a circuit would be IN: (epsilon, alpha), OUT: ($2^{alpha}$,zero).

Memory System Crossbar Facilities. See FIG. 32.

This is the overall picture of the memory subsystem minus a few features and details which will be described later.

The top row (squares 326) represent all the processors in the machine. Assuming this is a matrix of X by Y, the number of processors 316 here is X.Y processors 326. In the discussions that follow, if $\log_2(XY)$ is not integral, then round it up to the next largest integer.

Then, there are mu memory "nodes" 328. A memory node 328 is, in lay terms, a computer unto itself. It is intelligent, can be programmed by the machine designers, and manages a large block of "memory" (storage locations) which provide the basis of the overall machine's memory function. Except for possibly a few, all memory nodes 328 are alike.

Again, in the discussion which follows, if the value $\log_2(mu)$ is not integral, round it up to the next largest integer.

Then: there are three crossbars (324) in the machine.

(1) All processors 326 are inputs to an IN: (XY,$\log_2$mu), OUT: (mu, zero) crossbar 330, whose outputs are directed to every memory node 328 in the machine. In this way, processors can "speak" to memory.

(2) All memory nodes 328 are inputs to an IN: (mu, $\log_2(XY)$), OUT: (XY,zero) crossbar 332, whose outputs are directed to every processor 326 in the system. In this way, memory can "speak" to the processors 326.

(3) All memory nodes 328 are inputs to an IN: (mu,$\log_2$mu),OUT: (mu,zero) crossbar 334, whose outputs are directed to every memory node 328 in the machine. In this way, memory nodes 328 can "speak" to each other.

This is the simplest approach. The design could be modified to place several crossbars 324 in parallel where just one appears right now, and could be made use of like this. Assume that instead of just one crossbar 324, there are, say, gamma such crossbars 324 with all paths leading from the same places to the same places. This means that any one "entity" rather than seeing just one input port to the crossbar 324, would see an effective gamma input ports. So this entity could assert WI and place other information on the other lines on all gamma input ports at once. The result will be gamma THRu signals to deal with. The OR of these would tell the entity that it succeeded in getting through on at least one of the crossbars 324. It only needs one of these, and circuits would "choose" one of the successful paths so as not to tie up the others needlessly. This will be described in later drawings.

It should now be clear that all physical processors 326 have a unique address. With X.Y processors 326, these addresses could be assigned as PROC=0; PROC=1; ...; PROC=(X . Y - 1).

Just as clear, all memory nodes 328 have a unique address. With mu memory nodes 328, these could be assigned as MNODE=0; MNODE=1; ... ; MNODE=(mu - 1).

All such addresses may be "hard-wired" into the processors 326 and memory nodes 328. It is certainly possible to assign addresses to processors 326 and memory cells 328 arbitrarily. All that is important is that once assigned, the crossbars 324 are wired to them correctly. This means that, for example in the case of processors 326, the processor address need not be a simple function of its matrix coordinates (row,column). All that is necessary is for all processors to have unique addresses.

These processor and memory cell addresses have nothing to do with the activity address field of activities. Activities' addresses are fundamental to the concept of the machine and are supplied to activities by circuits in the activity queue. Processor and memory cell activities are part of this particular example of the concept.

Clever assignments of the processor and memory node addresses, when taken into consideration along with the overall architecture and dynamics of the machine, could probably make a considerable difference in the machine's performance.

Figure 33:
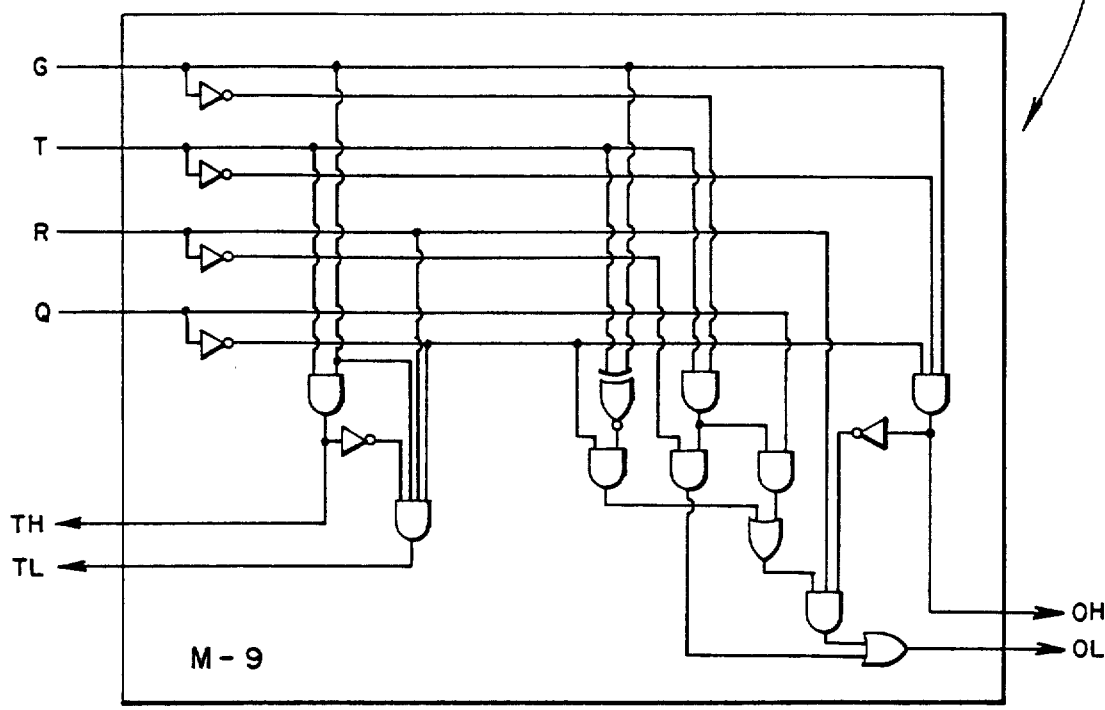
FIG. 33 shows circuit M-9 which is a free-memory queue master bit internal signal circuit.
Figure 34:
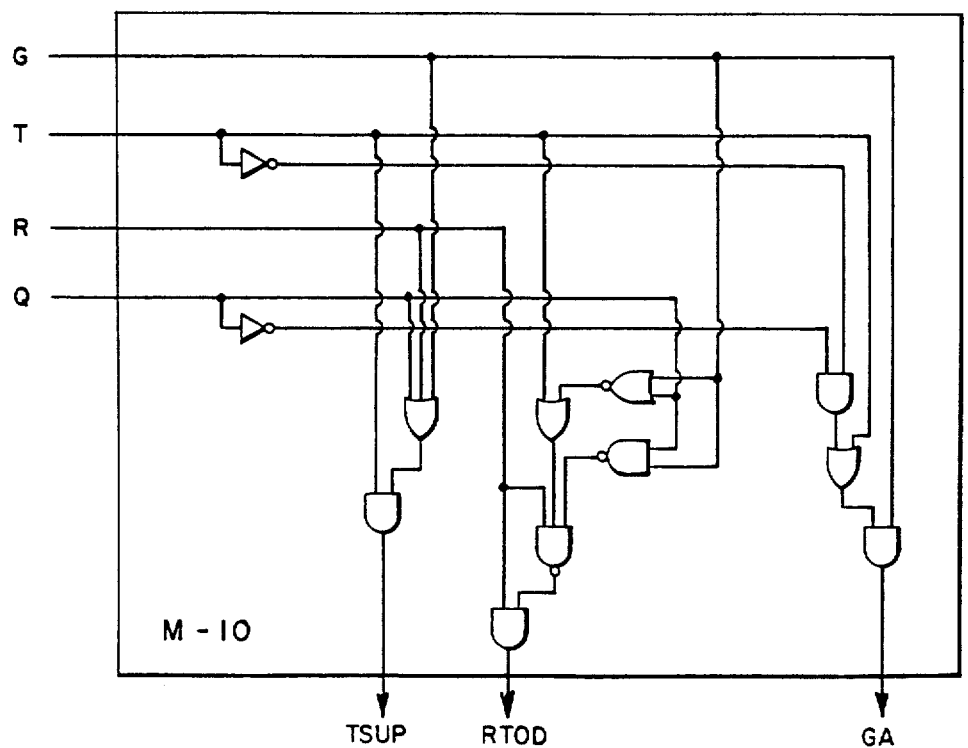
FIG. 34 shows circuit M-10 which is also a free-memory queue master bit internal signal circuit.

M-9, M-10 Free-Memory Queue Master B it Internal Signals. Generally indicated as 336 and 338 in FIGS. 33 and 34, respectively.

These combinatorial circuits will be understood best in the context of circuit M-11.

M-11 Free-Memory Queue Master Bit. Generally indicated as 340 in FIG. 35.

The function of this circuit will again be best described by the truth table of Table 2, but the overall intent and meaning of this circuit is described here. Again, the "D"-flipflop 342 is meant to indicate any appropriate memory device, whose D-input is latched on the rising edge of the clock pulse, but whose output does not change until after an appropriate delay. A system-wide reset pulse (not shown) would clear all of these flipflops 342 (in all M-11 circuits 340 in the system) to Q=0.

This bit manages a present/absent bit. Presence (=1) indicates that the memory address of an uncommitted (free) memory node 328 is present in associated parallel bits (see M-13 hereinafter). If absent (=0) it indicates that there is no meaningful information here. A free memory address arrives from the right-hand side into input "R", and leaves by output "FQ". The free memory bit, then, is actually part of another "rotating queue". This one bit is part of another big shift register, closed onto itself. Each "stage" of the shift register, then, may either hold a valid free-memory address, or else holds a "bubble", an unused place in the queue.

Now, in addition to the input R and output FQ, the situation is complicated by two needs: (1) an entity wanting to claim free memory must be able to remove a valid address from this queue; and (2) a memory node which has just declared itself "free" must be able to place its address onto the queue. Any combination of these demands may occur at the same time.

As in other parts of the machine (e.g., the "accordion stores" of the token and activity queues) a favorable set of demands will permit input R to propogate directly to output FQ without getting the latch involved. This is very important toward moving free-queue information quickly to those entities which need it. Otherwise, an entity would have to wait much longer for a free memory address to come moving toward it, stage by stage, even if there are no intervening demands for it.

An entity needing free memory will assert input T=1. His claim is satisfied when the circuit returns TSUP=1. A memory node wanting to place its address into the queue would assert G=1, and acceptance of its address into the queue is acknowledged when GA=1. The current stage of the queue contains a valid address if the flipflop 342 output Q=1, and a preceding stage is presenting a valid address to this stage if R=1. These are the four independent variables which the circuit must deal with. There are five things it must determine, based on these: (1) what information is to be routed to the "taker" (the entity trying to claim free memory); (2) what information is to be routed to output FQ; (3) what signal to present on output TSUP; (4) what signal to present on output GA; and (5) what information to present to the input of the D-latch (which determines what information will be present at its Q-output when the next clock pulse has passed). "dc"=don't care.

TABLE 2

| R | Q | G | T | TSUP | source of TSUP | source of FQ | give to D | GA |
|---|---|---|---|------|----------------|--------------|-----------|-----|
| 1 | 1 | 1 | 1 | 1    | G              | Q            | R         | 1   |
| 1 | 1 | 1 | 0 | 0    | dc             | Q            | R         | 0   |
| 1 | 1 | 0 | 1 | 1    | Q              | R            | 0         | 0   |
| 1 | 1 | 0 | 0 | 0    | dc             | Q            | R         | 0   |
| 1 | 0 | 1 | 1 | 1    | G              | R            | 0         | 1   |
| 1 | 0 | 1 | 0 | 0    | dc             | G            | R         | 1   |
| 1 | 0 | 0 | 1 | 1    | R              | Q(=0)        | 0         | 0   |
| 1 | 0 | 0 | 0 | 0    | dc             | R            | 0         | 0   |
| 0 | 1 | 1 | 1 | 1    | G              | Q            | R(−0)     | 1   |
| 0 | 1 | 1 | 0 | 0    | dc             | Q            | R         | 0   |
| 0 | 1 | 0 | 1 | 1    | Q              | R(−0)        | R         | 0   |
| 0 | 1 | 1 | 1 | 0    | dc             | Q            | R         | 0   |
| 0 | 0 | 1 | 1 | 1    | G              | Q(−0)        | R(−0)     | 1   |
| 0 | 0 | 1 | 0 | 0    | dc             | G            | R         | 1   |
| 0 | 0 | 0 | 1 | 0    | dc             | R(−0)        | R         | 0   |
| 0 | 0 | 0 | 0 | 0    | dc             | Q(−0)        | R         | 0   |

The circuit contains one 4:1 multiplexer 344 to control what comes out of FQ; but the table entry "source of TSUP" makes less sense in the context of the master bit than it does for a slave bit, in which case this determines what data will be presented to the "taker" if in fact TSUP = 1. This information is provided over the two lines TH and TL generated by the M-9 circuit 336 in the master bit.

The truth table of Table 2 is for the case of input line TRICK=0. However, one must study the drawing to understand the effect of TRICK=1. It effectively forces incoming data to be latched rather than propogated directly through. It is used only for a few of the M-11s 340 in the system to "break up" the overall queue to control gate delays. What is important is that TRICK never =1 on an M-11 340 whose G input could also equal 1. To do so would prevent GA from ever arising so that the memory node asserting G would never be able to get its address onto the queue.

Outputs OH,OL and TH,TL control multiplexers in the address-bearing slave bits as seen directly hereinafter.

M-12: Free-Memory Queue Slave Bit. Generally indicated as 346 in FIG. 36.

Straightforward, this circuit contains the same kind of memory device as M-11 340 except that it need not be RESET by the system-wide reset pulse.

Figure 40:
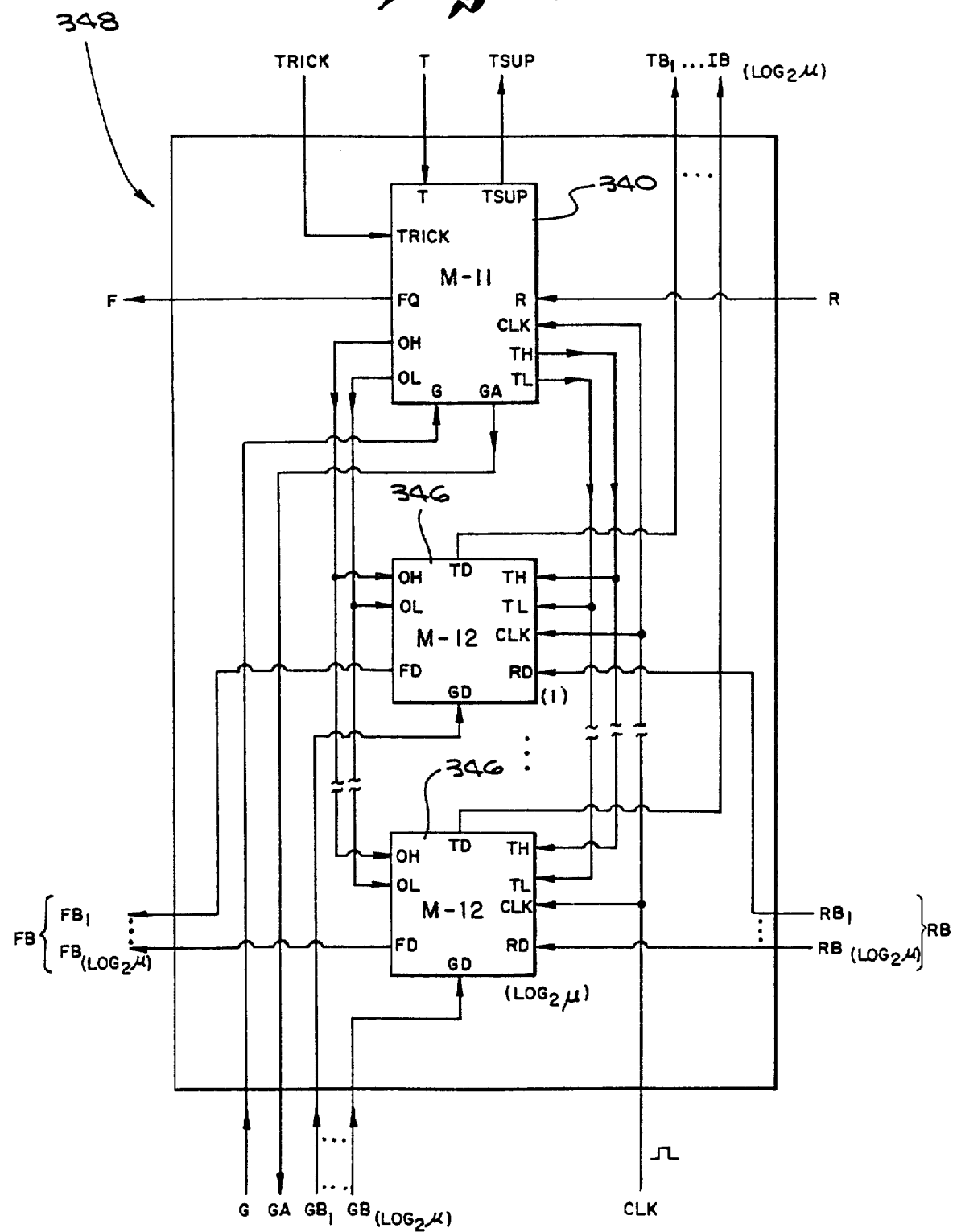

M-13: Free-Memory Queue Stage. Generally indicated as 348 in FIG. 40.

By connecting log$_2$mu (round up if not integral) slave bits as shown to a single master bit, one builds a stage having an input bus RB, output bus FB, input port FG and output port TB all of width log$_2$mu. In addition, here are control lines G, GA, T, TSUP, and TRICK which were explained for M-11 340. All circuits operate off of the same clock.

M-14: Free Memory Queue. Generally indicated as 350 in FIG. 41.

Since the overall machine has been defined as having X Y processors and mu memory nodes, there will be (X.Y)+mu M-13s 348 in the system arranged as shown. "TRICK" inputs are not drawn here but are discussed below.

Now, the memory nodes 328 will each have their own M-13 348 to provide input for. Therefore, mu of the M-13s 48 will have their G/GA inputs committed.

Next, there are (X.Y) processors 326 which might each require free memory at any time. Therefore, connect the T/TB outputs of(X.Y)M-13s 348 to the processors 326. When doing so, use as many of those M-13s 348 which have their inputs committed as possible. The result now is that mu of the mu+(X.Y) inputs are committed, and (X.Y) of the mu+(X. Y) outputs are committed.

Figure 63:
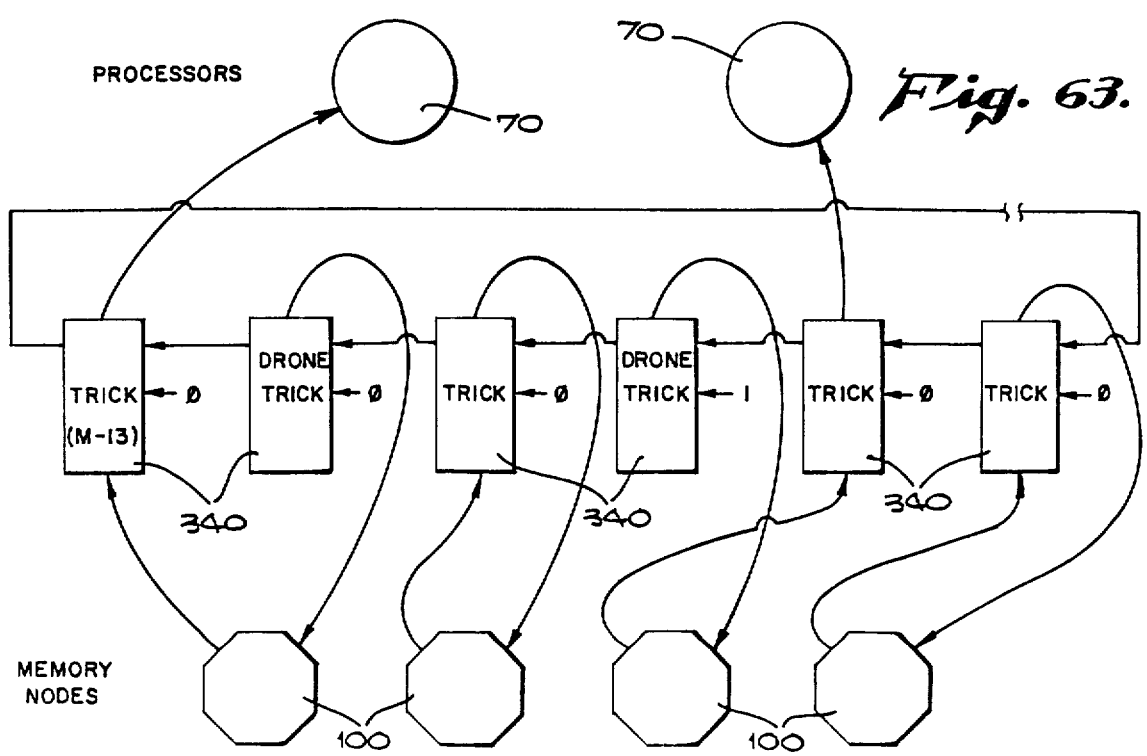
FIG. 63 is a block diagram of the inner connection between the M-13 circuits output routing to the memory nodes.

The remaining M-13s 348 with uncommitted outputs are each assigned to a memory cell 328, so that all remaining such M-13s 348 will have their outputs routed to a memory cell input. This is best seen in FIG. 63. It is clear that not only is memory able to free itself by placing its address onto the queue, but also is able to claim free memory by removing an entry from the queue. Processors can only claim free memory.

What is left after following the above steps is a queue with (X.Y) uncommitted inputs. These can be dubbed "drones". Tie all G-inputs of the drones to logic false.

Now, assuming that drones are positioned physically in the queue with forethought to the step about to be described here, tie the "TRICK" input of a few select drones to logic true (1), strategically selected to control gate delays in the queue. Then, tie all other "TRICK" inputs of all other M-13's 348 to false. It should be noted here that M-14 is a special closed-loop application of the fast-forward FIFO described elsewhere herein.

Figure 42:
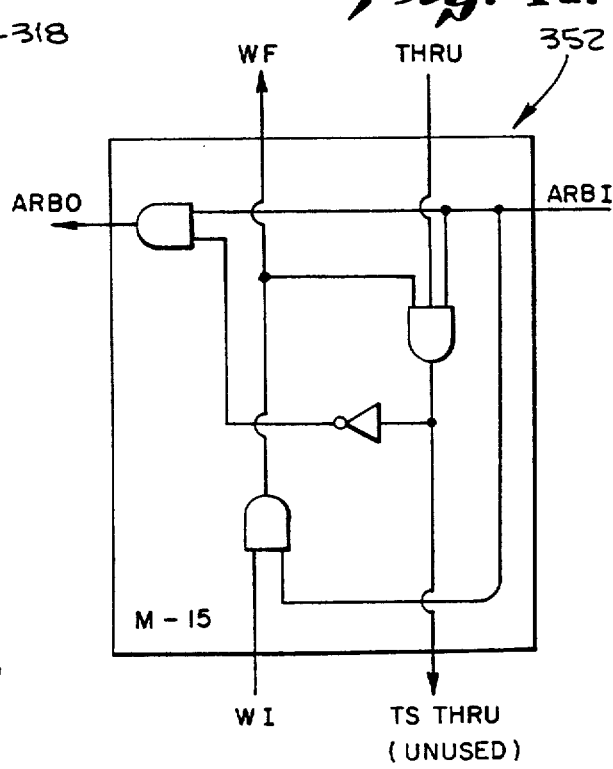

M-15: Base-of-Crossbar Inner Arbitrator. Generally indicated as 352 in FIG. 42.

As discussed with respect to FIG. 32 above, a method will be developed for connecting M-8 circuits 324 in parallel to improve the probabilities of achieving a complete path by giving the opportunity to choose among several parallel paths. It will be seen that the resulting circuit (M-21 hereinafter) will appear to the outside world exactly as an M-8 324. Its performance, however, should be superior.

As a start toward this circuit, part of the job of getting input into the crossbar is managed with M-15 352. This is best understood while looking at M-16 below.

Figure 43:
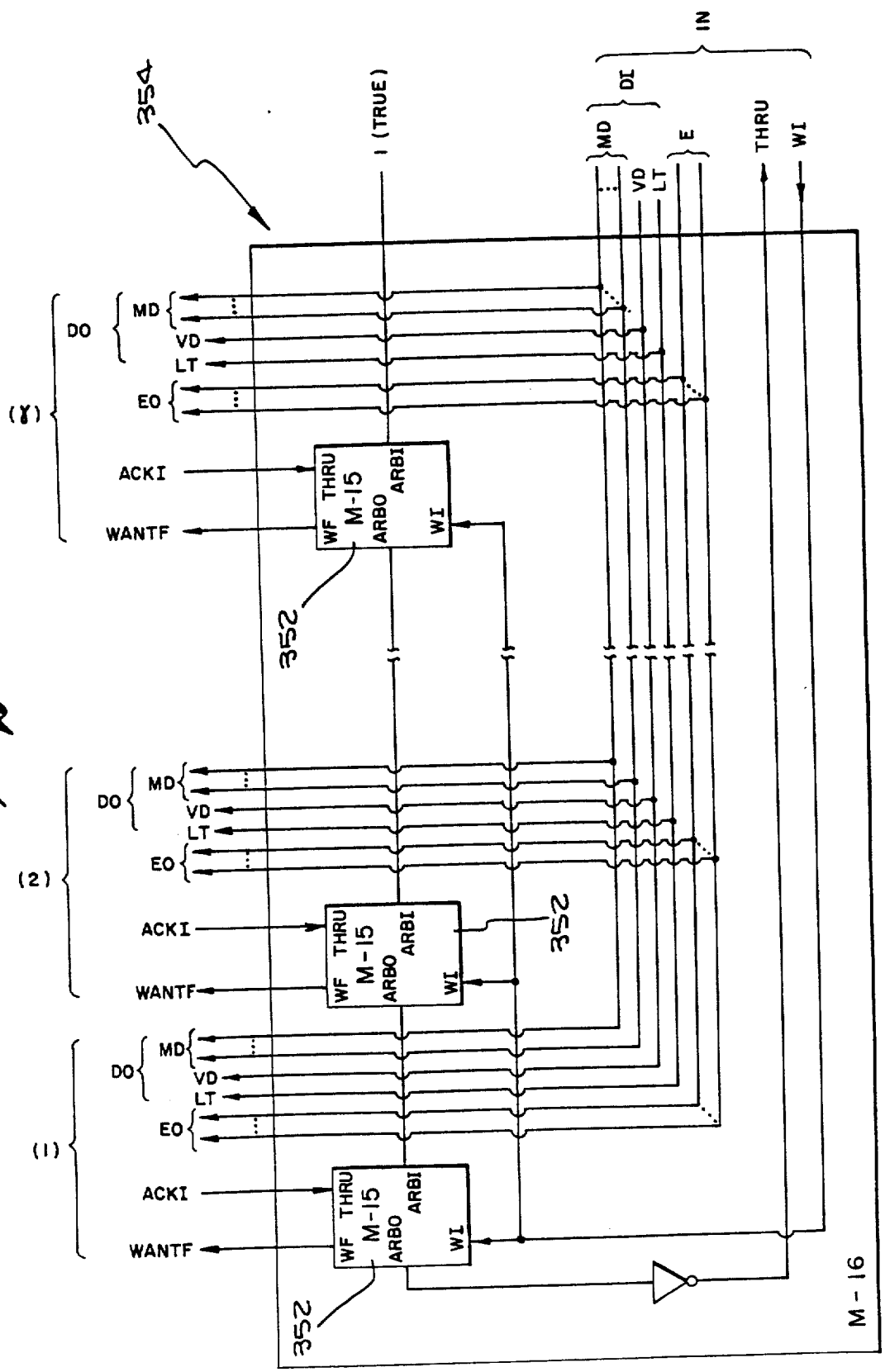
Figure 44:
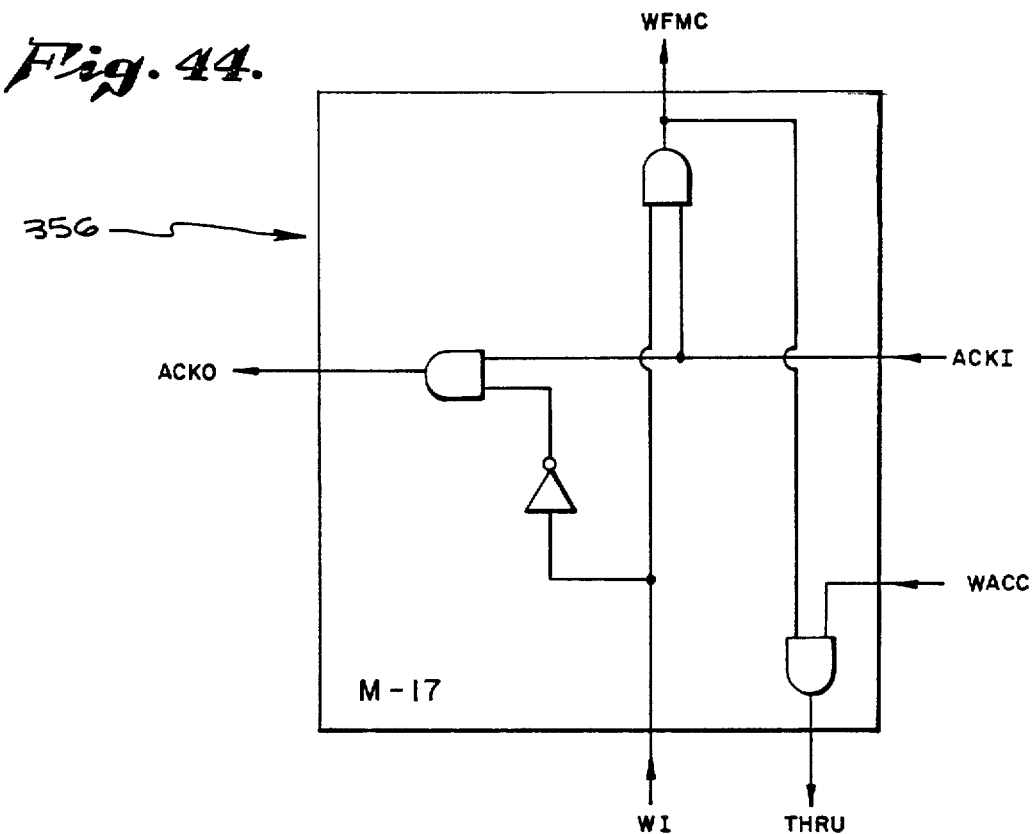

M-16: Parallel Crossbar Input Fanout. Generally indicated as 354 in FIG. 43.

Ultimately, we will hook gamma M-8s 324 in parallel, so that any one input entity will in effect be attempting to achieve the same path on gamma M-8s 324 all at once. It is possible, then, for more than one of the M-8s 324 to reply affirmative to the request, but only one path is needed (the other should be freed at once, leaving them available to other contentions). This circuit manages not only the one-in gamma-out fanout of the data lines and address lines (DI and E resp.), but manipulates WI and THRU so that either no M-15 352 will received an input THRU, or else only one M-15 352 will receive an input THRU. This means that only one of the M-8s 324 will be allowed to retain a claim on a complete path (assuming, of course, that one or more of them in fact achieved one).

As will be seen, later circuits to be discussed prevent more than one M-8 324 from declaring a complete path. The arbitration at this end causes no trouble and acts as a safety feature.

Figure 44:
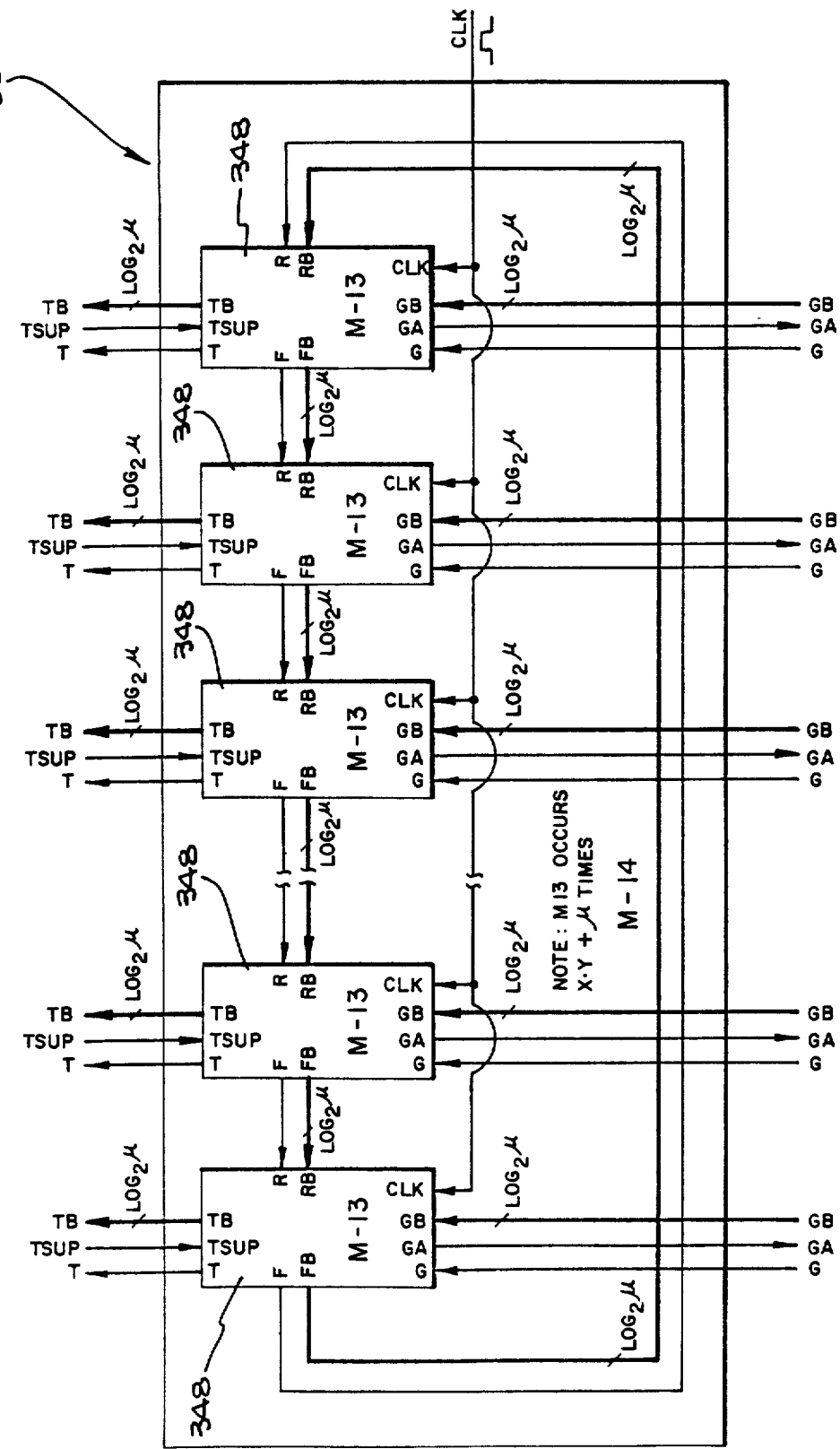

M-17: Top-of-Crossbar Inner Arbitrator. Generally indicated as 356 in FIG. 44.

Although a complete understanding of this may have to wait until the discussion of M-21 hereinafter, the most important feature is that signal THRU cannot be one unless signal WFMC is also one. And, as shall be seen, among all the M-17s 356 which lead to the same destination, only one of them will have its WFMC true.

Circuits M-17 through M-21 manage the job of taking all of the gamma incoming requests-for-complete-path and choosing to reply to only one of them (leaving the remaining M-8s 324 free for other work). It turns out that, just as the M-8s 324 provide for internal path latching, it is therefore necessary, once the choice among the gamma contenders is made, to latch this choice as well (as it determines part of the overall path). This should be clear after studying circuit M-21.

Figure 45:
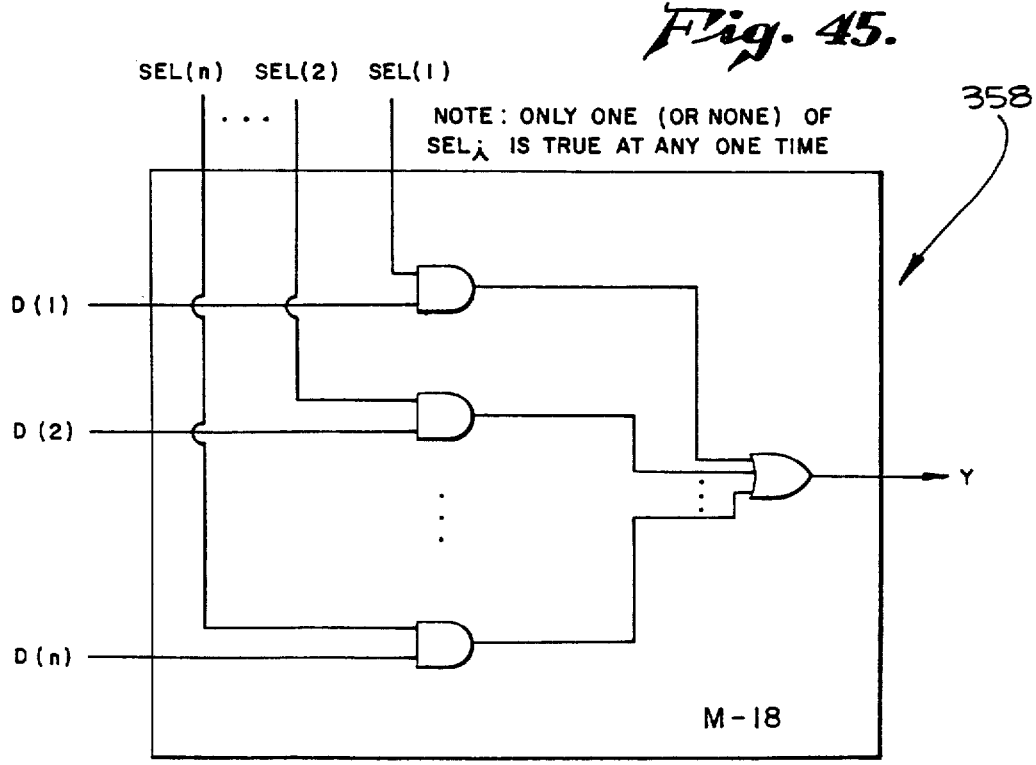

M-18, M-19: Brute-Force Multiplexer. See FIGS. 45 and 46.

Figure 46:
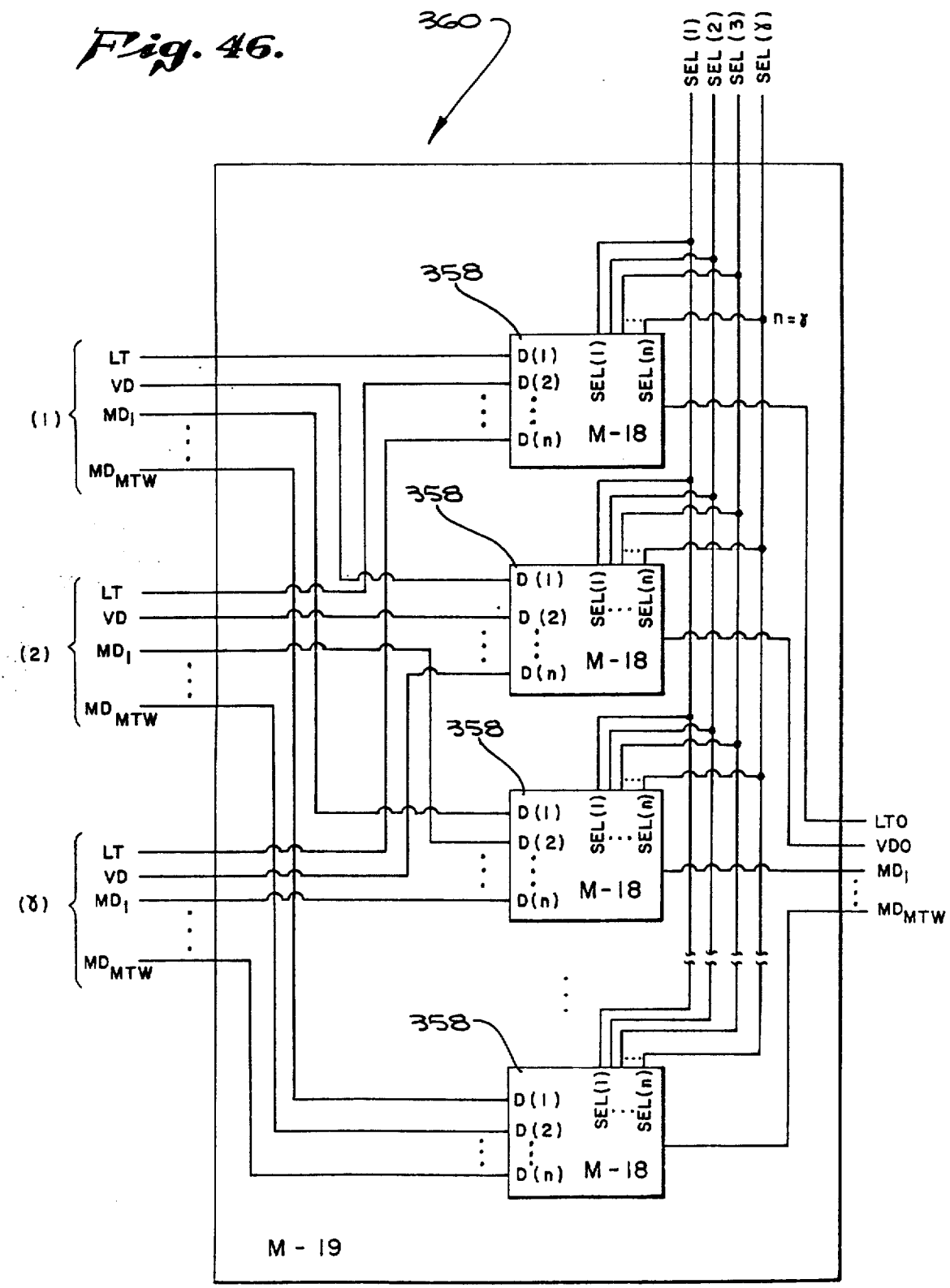

This multiplexer design, generally indicated as 360 in FIG. 46, guarantees that all output data lines are at defined logic levels. M-19 360 clearly chooses one of the sets of DO lines (there will be gamma sets emerging from the gamma M-8s 324 headed for this single destination) by selecting one (and only one) of the SEL inputs. Setting $SEL_i=1$ selects DO set $DO_i$. If no SEL input is high, then the outputs will be all zeroes.

Figure 47:
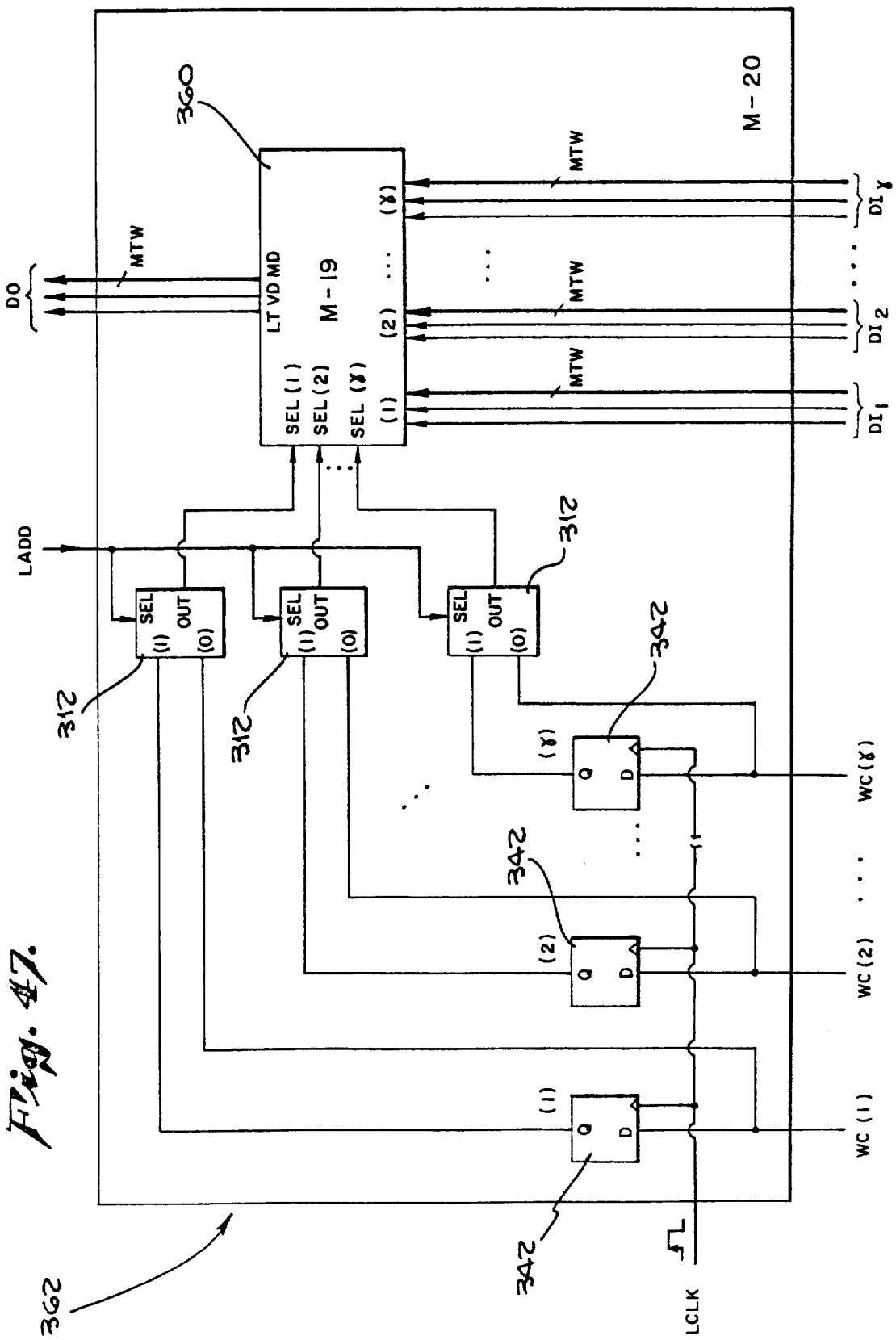

M-20: Choice-of-Address Multiplexer. Generally indicated as 362 in FIG. 47.

An M-19 multiplexer 360 has its $SEL_i$ inputs delivered from the outputs of 2-in 1-out multiplexers 312 controlled by input LADD. If LADD=1, the M-19 $SEL_i$ inputs will come from the Q (outputs) of the D-flipflops 342 shown. Otherwise, (LADD=0) the $SEL_i$ inputs will come from the D (inputs) of the flipflops 342. The usual statement about the D-flipflops applies. These are meant to indicate any appropriate memory device whose input is latched on the rising edge of the clock pulse (LCLK) but not copied through to the output until after an appropriate delay. The inputs to these flipflops 342 come from inputs $WC_i$ as shown. The system reset pulse (not shown) clears all these flipflops to Q=0.

Figure 48:
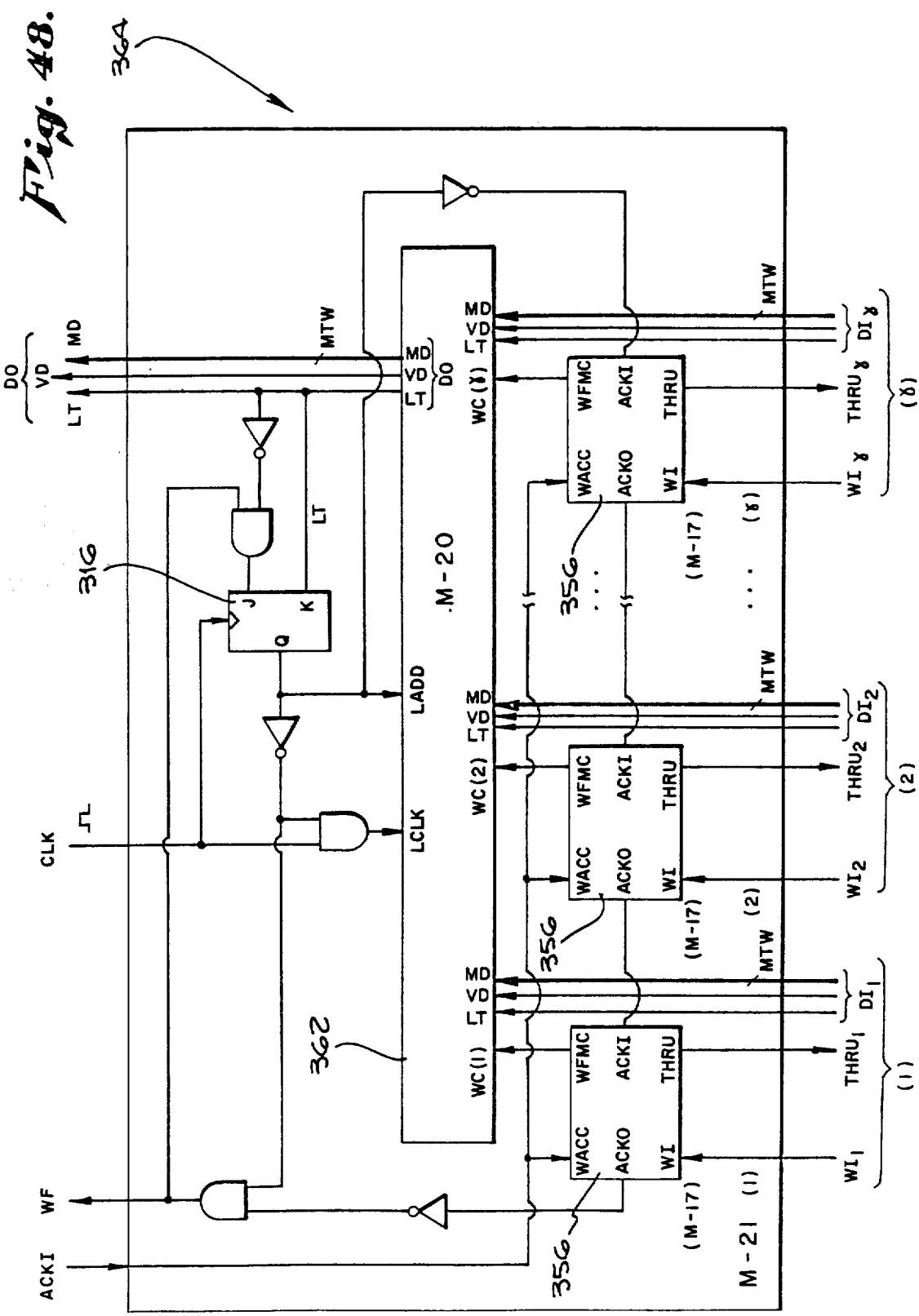

M-21: Parallel Crossbar Output Multiplexer. Generally indicated as 364 in FIG. 48.

Recall that the starting point here is that it is possible for more than one of the $WI_i$ to be true at the same time, representing more than one successful path, tying up more than one of the gamma parallel M-8s 324. Assume J-K flipflop 316 output Q=0 (more about this flipflop later). Then, the M-17 circuits 356 will permit only one of the $WC_i$ inputs to M-20 362 be true at once. In addition, the signal WF will be allowed to go true, indicating a complete path "want forward" to the ultimate receiving entity. Since input LADD to M-20 362 is zero, these $WC_i$ inputs control the M-19 360 internal multiplexer directly, so that the inputs corresponding to that M-17 356 whose WFMC output was allowed to be true will be copied through to the DO outputs. One of those bits is bit LT (last transfer).

Assume now that LT=0. That is, the sender at the other end of the crossbar wants to latch this path. Then, clearly, this circuit must latch this choice of which of the gamma M-8s 324 it is currently paying attention to (as the sender will probably not reassert its "want" signal, nor could it expect to win the arbitration on the next clock pulse even if it did). So with LT false and WF currently true, input J to the J-K flipflop 316 will be true (input K false) so that after the clock pulse has passed, the J-K flipflop 316 will output Q=1. The action of this same clock on M-20 362 must also be noted. Before the clock pulse, Q=0, so that the input LCLK will be enabled to receive the clock pulse. When it arrives, then, the internal latches of M-20 362 will latch the $WC_i$ inputs. After the pulse has passed, the $WE_i$ inputs before the pulse will be secure in the latches.

Also, the J-K flipflop 316 will output a 1 (true) which does two things: (a) it prevents any more clock pulses from entering LCLK until some other action causes the J-K flipflop 316 to become a zero again, and (b) LADD will get a true input, meaning that on this new clock cycle, it will gate the data in from the same M-8 324 that it did the last time. Once the J-K flipflop 316 outputs a 1, it is no longer possible for WF to output a 1 until some action causes the latch to release (cause the J-K fliptop 316 to output zero). Exactly what this action is clear, and is what is expected. As soon as the sender sends one more transfer with its bit LT=1, the clock pulse will see J=0 and K=1 on the flipflop 316, and reset it. The circuit then becomes available for arbitration again.

The receiving circuits (forward circuits) which deal with WF and generate ACKI are expected, just as for an M-8 324, not to assert ACKI unless WF is true AND the circuit is indeed ready to accept the transfer (possibly a burst transfer) at once. The M-17s 356 will insure that the ACKI is routed through that M-8 324 which has the path of interest.

The J-K flipflop 316, again, is meant to indicate any appropriate memory device just as for circuit M-5 314. The reset pulse also applies to this device (will cause it to output zero).

Figure 49:
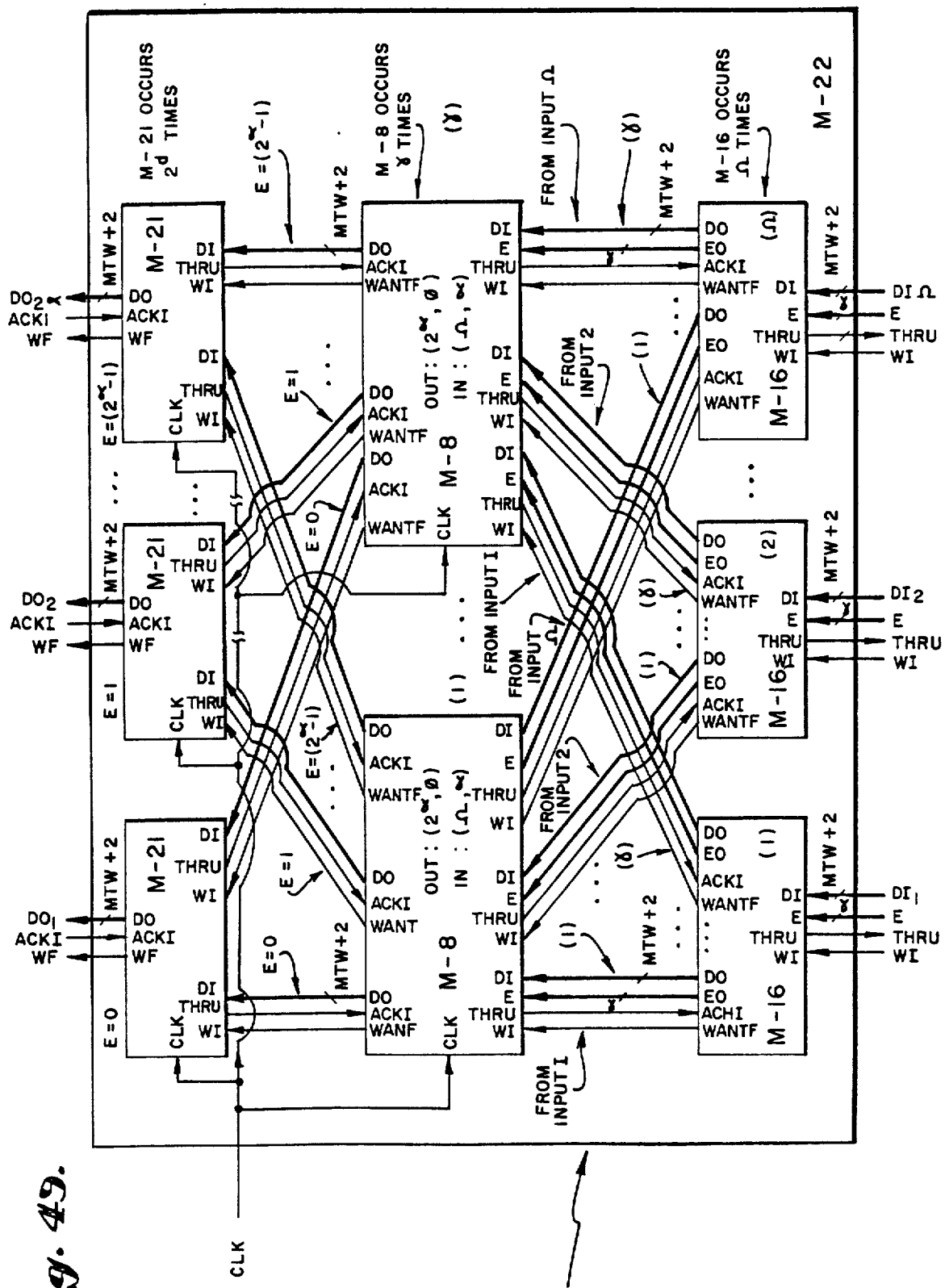

M-22: Parallel Fully-Decoding Path-Latching Broadcast Crossbar. See FIG. 49.

Instead of using just one M-8 circuit 324, one can interconnect gamma M-8s 324 as shown to yield the gamma-parallel crossbar generally indicated as 368. This circuit is fully-decoding. That is, there are no EO busses emerging from the top of the circuit. This is a consequence of the particular designs of M-16 354 and M-21 364 circuits which did not provide for the throughput of E busses.

But, their addition follows logically. M-19 360 is readily modified to handle incoming E lines by the addition of as many more M-18s 358 as are needed (equal to the number of lines in the E-bus) and interconnecting them in the obvious way. The result affects M-20 362 in that now each $DI_i$ also have an accompanying $E_i$ input, and there will be a single set EO emerging from it. This affects M-21 364 in the obvious way.

With this E-bus handling capability added to the M-21 circuits 364, it is not necessary to use fully-decoding M-8s 324, but instead one can use M-8s 324 which pass through a nonzero number of bits for $EO_i$. These are then connected to the M-21s 364 in an apparent way, with the result that we have synthesized a not-fully-decoding, parallel path-latching broadcast crossbar. Such a crossbar is also an M-22 circuit 368.

The implications of this should be clear. M-22s 368 may be used wherever M-8s 324 are used, and vice-versa. Larger M-8s used 324 and larger M-22s 368 may be synthesized from lesser M-8s 324 and M-22s 368 in any conceivable combination. Which "mix" of circuits does the best job can be found by queueing theory analyses, trial and-error, simulation, or other known techniques.

In the four figures to be described next, as shall be seen, the circuits describe the interface of the memory system developed so far to individual memory nodes 328 and to the processors 326. Memory nodes 328 and processors 326, simply put, may be conventional computers. Consequently, there is some danger of these conventional computers being not properly synchronized with the circuits described so far. This danger is simply assumed avoided by proper implementation according to techniques well known to those skilled in the art.

Memory nodes 328 and processors 326, then, may interface to these other circuits through a conventional I/O mechanism. The next four figures described show what sorts of interfaces might be devised to accommodate such interfaces to demonstrate that the overall circuits can, in fact, be integrated. Exactly what sort of conventional computer (or computers, for that matter) will be "inside" of a memory node 328 or activity processor 326 will be discussed after the interfaces are demonstrated.

Figure 50:
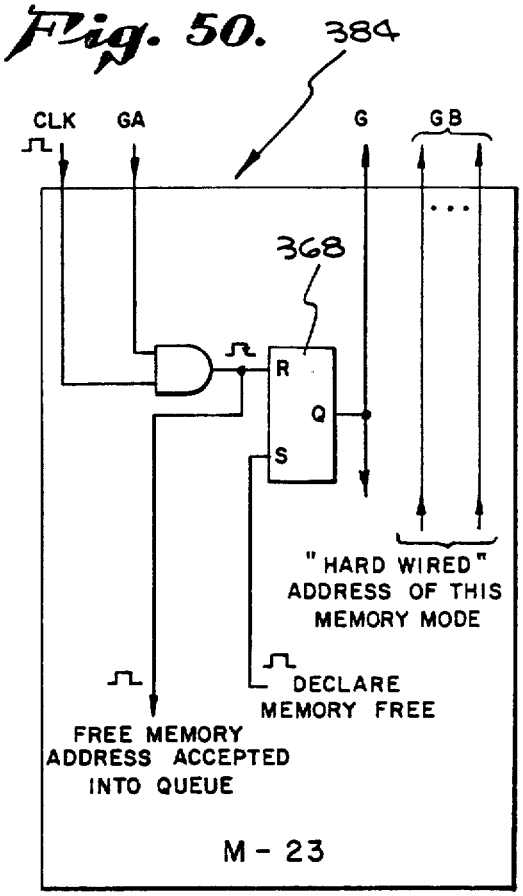

M-23: Example: Interface to M-13 Give-Free-Memory See FIG. 50.

M-23 shows how a memory node might "give" its "hardwired" memory node address to the memory free queue. Its connection to an M-13 circuit 348 should be obvious. The "S-R flipflop" 368 is assumed not to reset its output until the falling edge of the pulse shown. The memory node 328 would generate a pulse "declare memory free" and would simply wait until a "free memory address accepted into queue" pulse emerged before assuming that it has in fact been properly declared as free memory.

Figure 51:
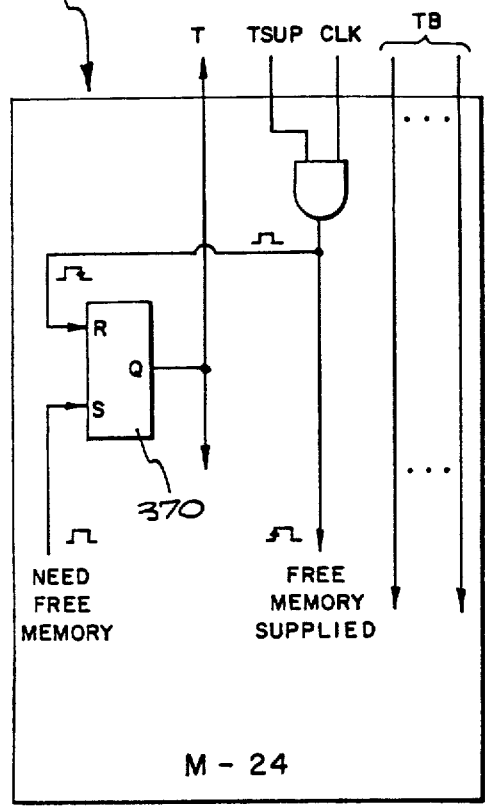

M-24: Example Interface to M-13 Take-Free-Memory. See FIG. 51.

This circuit is common both to memory nodes 328, and to activity processors 326. Therefore, this example could well apply to both. Its interconnection to an M-13 circuit 348 again should be obvious. A memory node 328 or processor 326 needing free memory would generate a pulse "need free memory" and would use the leading edge of the returning pulse "free memory supplied" to latch the data present on lines TB. The falling edge of that same pulse would also clear the request S-R flipflop 370.

Figure 52:
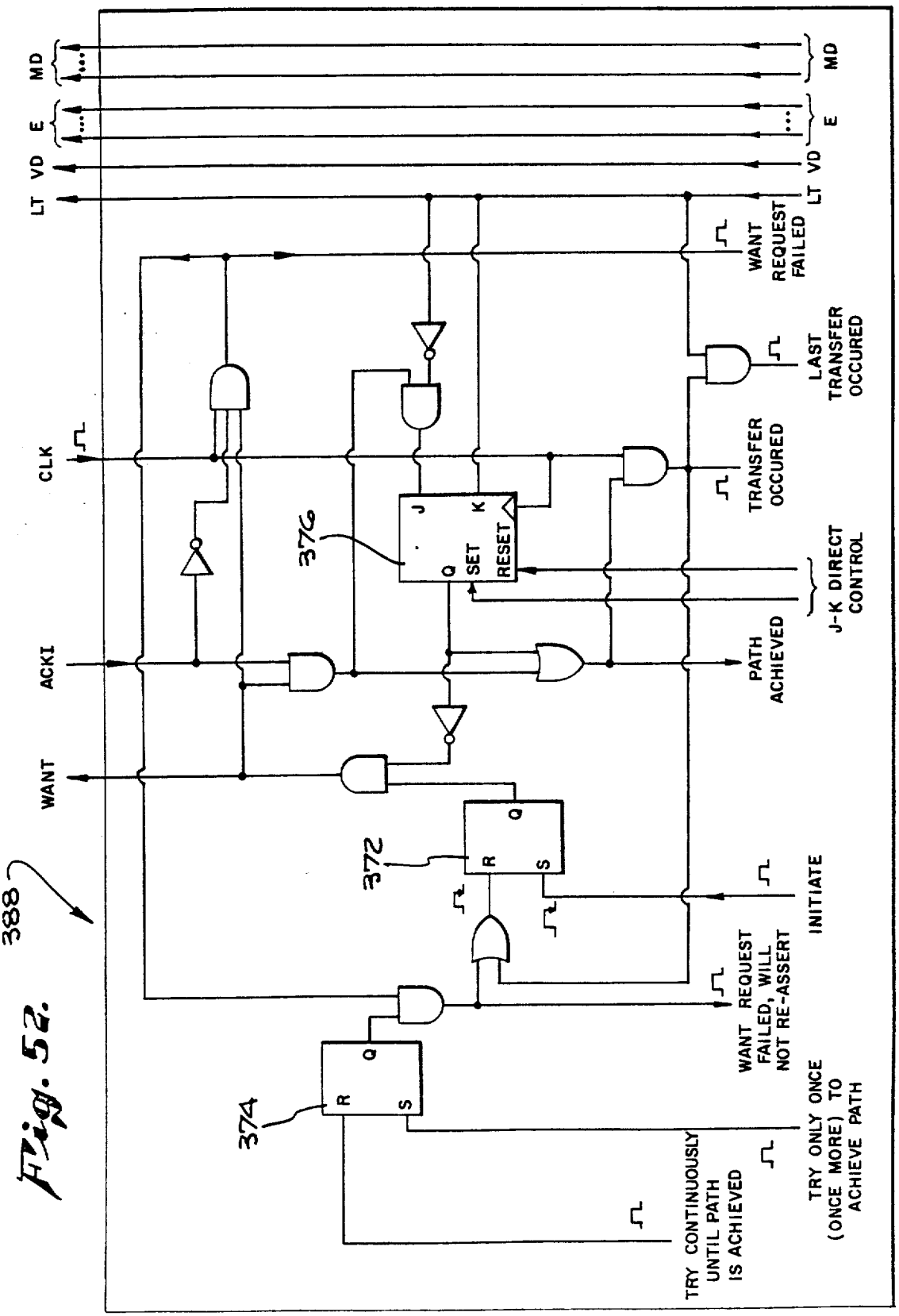
FIG. 52 shows circuit M-25 which is incorporated into, for example, the interface to M-8/M-22 : sender.

M-25: Example: Interface to M-8/M-22 Sender. See FIG. 52.

This circuit is also common to both memory nodes 328 and to activity processors 326, as both will need to move data from themselves over a crossbar. This example was designed with a direct-memory-access type of transmission method in mind. The sending processor 326, when it has prepared in advance the sequence of information to be sent (which will be sequenced onto lines LT,VD,E, and MD properly), then throws a pulse "initiate" which sets request flipflop 372. Assuming there was not a latched path already at that time, interface line WANT will go high. Then, on the arrival of the clock pulse, either ACKI will be true (path established) or false (path not yet established). If ACKI is true, the logic level "path achieved" will go high, which will permit the generation of a "transfer occurred" pulse which can be used to sequence the information present on the LT,VD,E, and MD lines. If this was in fact the last transfer, a "last transfer occurred" pulse is generated to indicate to the processor 326 the completion of the requested service. "Transfer occurred" also clears the request flipflop 372 (the falling edge thereof).

However, if ACKI was not true on the request out, a pulse "want request failed" will be generated. If this pulse is generated, another flipflop 374 (managed by the processor signals "try continuously" and "try only once more") will control whether the circuit will simply continue to assert itself, or give up. If it gives up, signal "want request failed, will not reassert" is generated.

If the processor 326 is trying to achieve a "broadcast", that is, trying to send the same information to more than one place at once, additional control would be necessary and the specific circuits for that are not shown. But, for purposes of this example, a processor 326 trying to achieve multiple paths would generally keep the VD output low, keep the LT line low, and on its first path claim, would proceed as above. But, as soon as the "transfer occurred" pulse arrived, the circuit would then reset the J-K flipflop 326, be sure the new address is present on the E lines, and generate "initiate" again. The additional circuits (not shown here) must remember that there is already a complete path achieved. The new request will result in success or failure, as before. If a failure, the processor 326 must not permit the circuit to assert itself without end on this subsequent-path request, as this could hang up the crossbar. It can manage this with the "try" flipflop 374 as before. When all paths have been established that can be established out of the processor's attempts, then (with proper synchronization) the J-K flipflop 376 can be set again and the transfer will occur normally. In such broadcast sequences, the establishment of paths must be very carefully managed and all control pulses and data lines properly sequenced.

Figure 53:
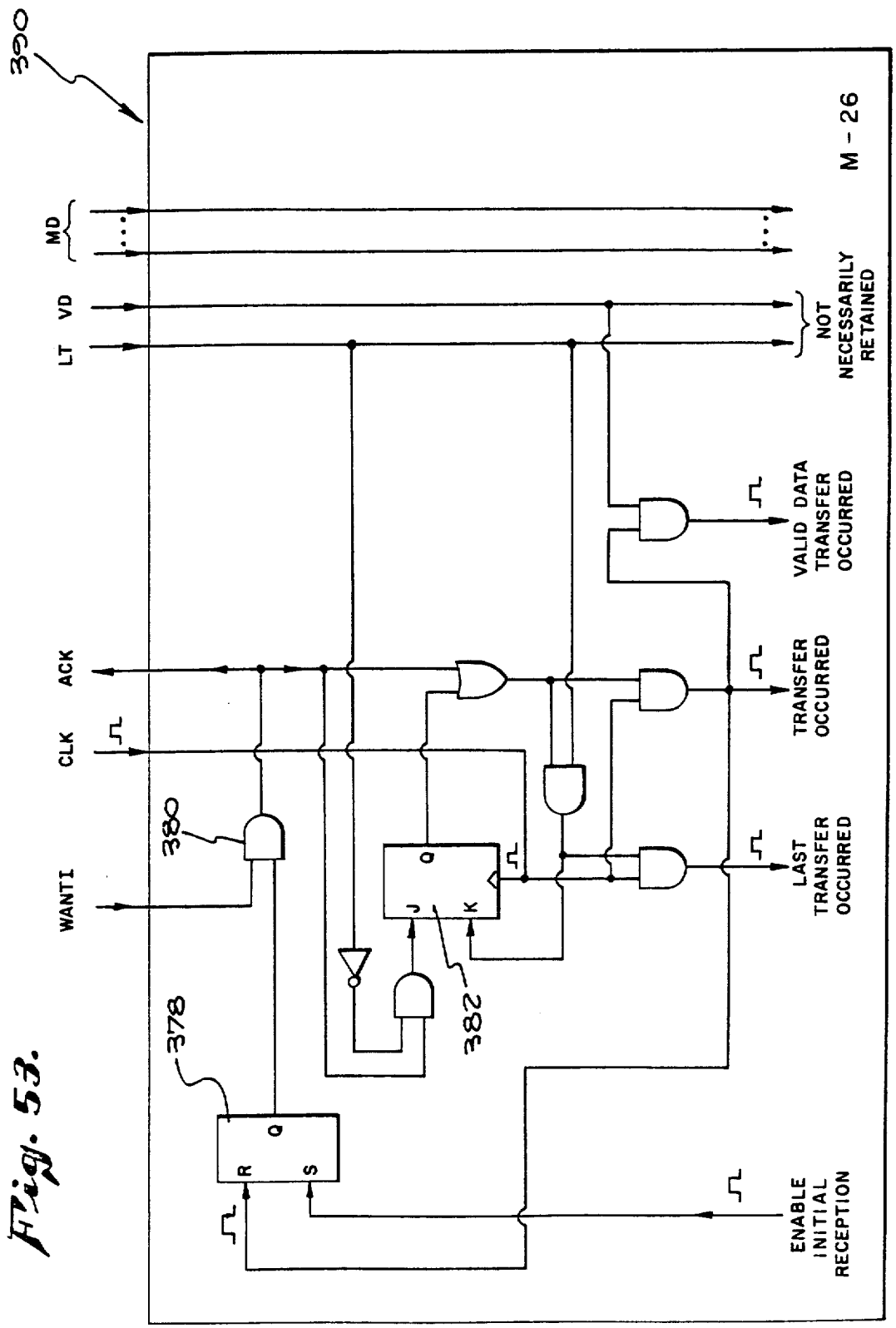
FIG. 53 shows circuit M-26 which is incorporated into, for example, the interface to M-8/M-22: receiver.

M-26: Example: Interface to M-8/M-22: Receiver. See FIG. 53.

Again with direct-memory-access in mind, this example shows how a processor 326 or memory node 328 might set itself up to receive over the crossbar. Having set up its internal transfer buffers and so forth, the processor 326 generates the "enable initial reception" pulse. This sets a "permission" flipflop 378 which is gated to the incoming "want" from the crossbar.

A true output from this gate 380 is the ACK (acknowledge) signal returned to the crossbar. If ACK is true and this is not the sender's last transfer (LT line is false) then the J-K flipflop 382 will see J=1 and K=0, so will set output true after the pulse has passed (this J-K flipflop 382 and that in M-25 are as all others in the system: inputs sampled on clock rising edge, output changes after an appropriate delay).

When the clock pulse arrives, and either this circuit is asserting ACK or if it has latched the J-K flipflop 382 true, the clock pulse will generate "transfer occurred". Additionally, if the data was valid (VD line true), this pulse will generate "valid data transfer occurred" which can be used to enable the transfer of the data lines into the processor's memory or what-have-you. When LT is true before a clock pulse, the clock will generate "last transfer occurred", which can be used to alert the processor 326 that a complete transfer from the processor 326 has taken place. This LT=1 also clears the J-K flipflop 382. Any transfer will clear the "permission" flipflop 378 ("transfer occurred" falling edge) so that ACK is only asserted for the first clock period.

Figure 54:
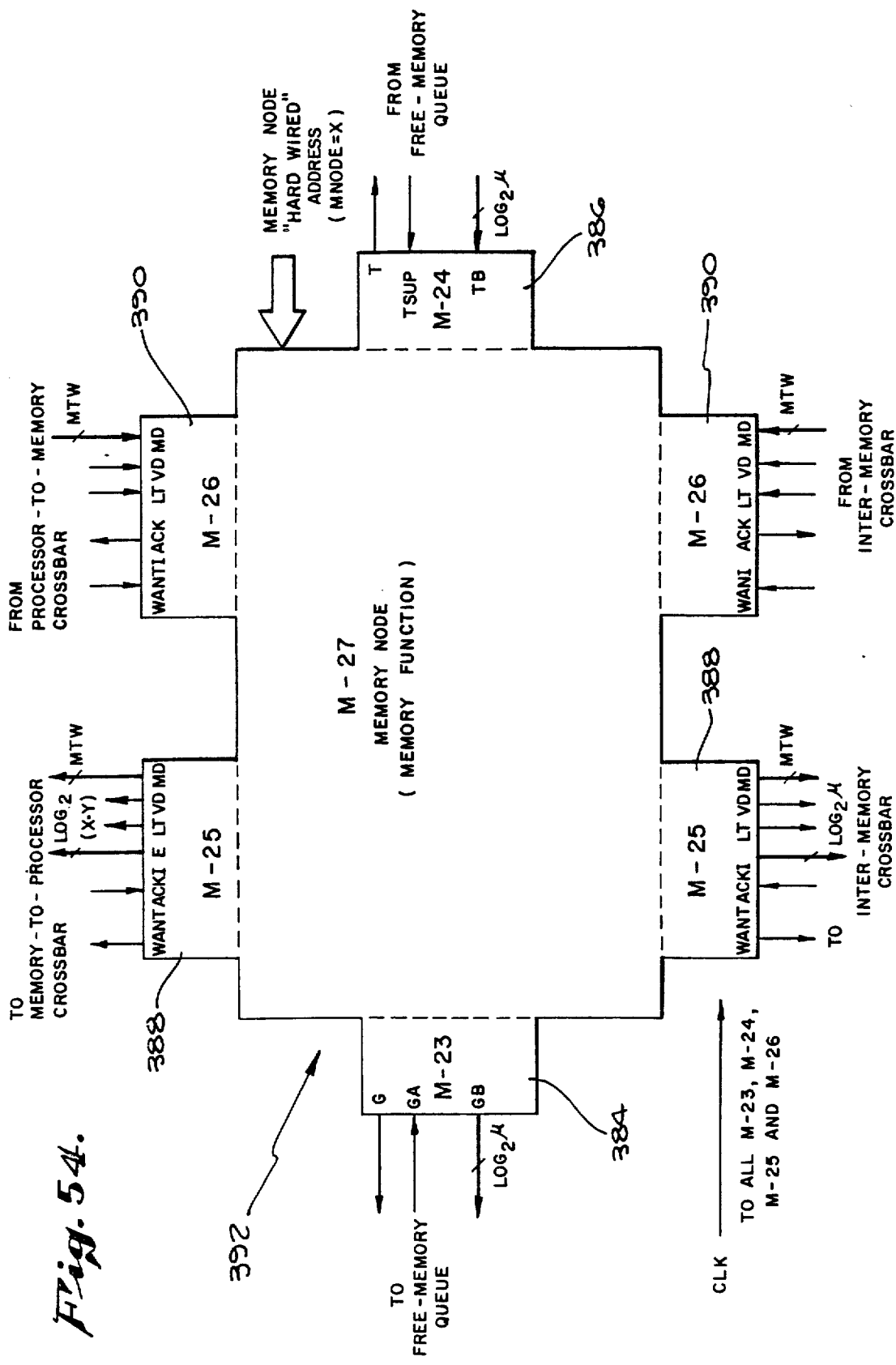
FIG. 54 shows circuit M-27 which is the memory code circuit.

M-27: Memory Node. Generally indicated as 392 in FIG. 54.

Given that M-27 392 can be a conventional processor, this drawing is sufficient to specify it. The parameters of this conventional processor are not especially important, as long as it effectively provides for all of the functions expected of it. It is enough to consider this now as a "black box" which operates under its own internal control "program", and whether this black box contain one or many processors, whether it contain a conventional processor at all for that matter, is not consequential here. It should be obvious to any computer scientist that a conventional processor here will do the job, that it can be provided an endless variety of control programs, whether these be in ROM, or other devices is again not important. This "soft" control program, microcode if you like, will generally be the same for all M-27s 328 in the overall computer, except for a special few which get involved in machine initialization, and function-library lookup tables for improved implementation of function name and constant name lookups.

Each M-27 392, then, must contain enough internal storage (whether this is RAM, bubbles, magnetic media, etc. is again of no consequence here) to permit it to appear to the remainder of the system as if it has capacity for some minimum number of the overall computer's "tagged words", the basic quantum of information in the machine. This minimum number (call it NODE LENGTH) is another design parameter at the discretion of the implementor. The overall machine could address information in a memory node 328 by a memory pointer word (this is "tagged" as being a memory pointer) containing several fields, one field of which is the address of the memory node 328 itself, and the other field or fields specifying divisions of this memory node's address space, that is, exactly where or what in the memory node is being addressed.

In addition to the storage required to implement the NODE LENGTH, the memory node 328 will probably contain a great deal of additional storage to manage its own internal bookkeeping, manage communications with the overall system as fast as possible, implement decisions as to whether to "broadcast" or manage requests sequentially, and so forth.

The CLK shown is NOT this memory node's internal clock, but it is the clock provided by the external circuits (the crossbars and memory free queue). Proper synchronization between this clock and actions of the memory node 328 itself is assumed. Each memory node 328, as mentioned before, has its own unique address, and this is indicated by the application of this address from the outside. This could be switches, bus lines in the circuits, or assigned dynamically at system initialization into memory circuits. Again, this is not consequential here. This "hard-wired" memory node address is available to the memory node 328 itself (it can "see" its own address) and the processor 326 would use that address when declaring itself free (module M-23 of FIG. 50), in addition to using it to identify itself to modules it is communicating with.

M-28: Memory Node for Input-Output. Generally indicated as 394 in FIG. 55.

One method of providing input-output is to set aside some of the unique addresses which would otherwise be given to memory nodes, and assign them to modified memory node processors as shown. These interface to the system exactly as M-27s 392, except that they generally will not declare themselves "free" (they do not serve a memory function) so will not need an M-23 384 interface. Instead, they will interface to real peripheral devices, such as printers, bubble memory stores, real-time devices, or etc. These M-28s 394 are, therefore, I/O processors. The activity processors executing input, output, and I/O control activities can communicate with these exactly as they would communicate with an M-27 392.

As M-28s 394 are conventional processors just as M-27s 392 are, they can be very sophisticated and manage all of the output formatting, specific device control, conversions to character or from character formats, and any other conceivable management of input-output functions which the overall machine should not have to take care of at the activity level. The simple generic activity "output", given a data token to output and a "format" token to give it any other needed details, can initiate the output of many pages of information, especially if the data token is a matrix or other structured datum. Once in a processor, the activity would cause the processor to communicate that token to the M-28 394, which could then eject it from the system through the I/O device and ultimately declare the token as "absorbed". Input operations would be similar. An input activity would initiate an input operation by an M-28 394. When the M-28 394 has assembled all input, created a machine-compatible token out of it, balanced it properly, and so forth, the M-28 394 reports completion to the processor containing the waiting activity, which then ejects the token (or its descriptor) into the token queue.

M-28s 394 will probably not all be alike, as they will be managing different peripherals and be performing different functions. Otherwise, their integration into the overall computer is obvious, and also obvious that input-output can be achieved with them.

Review, Memory Subsystem Complete.

The memory subsystem, then, consists of three M-8/M-22 crossbars (processor-to-memory, memory-to-processor, and intermemory), mu memory nodes (M-27s and M-28s, which contain, for example, interfaces M-23 through M-26), a free memory queue (M-13s as necessary), and M-24, M-25, and M-26 interfaces to the activity processors (X Y of each). All of these circuits require a clock input: they are all driven from the same clock (call it MCLK, memory clock). This clock is not necessarily the same clock as the token queue clock, or the activity queue clock.

TOKEN QUEUE DETAILED CIRCUITS

Figure 64:
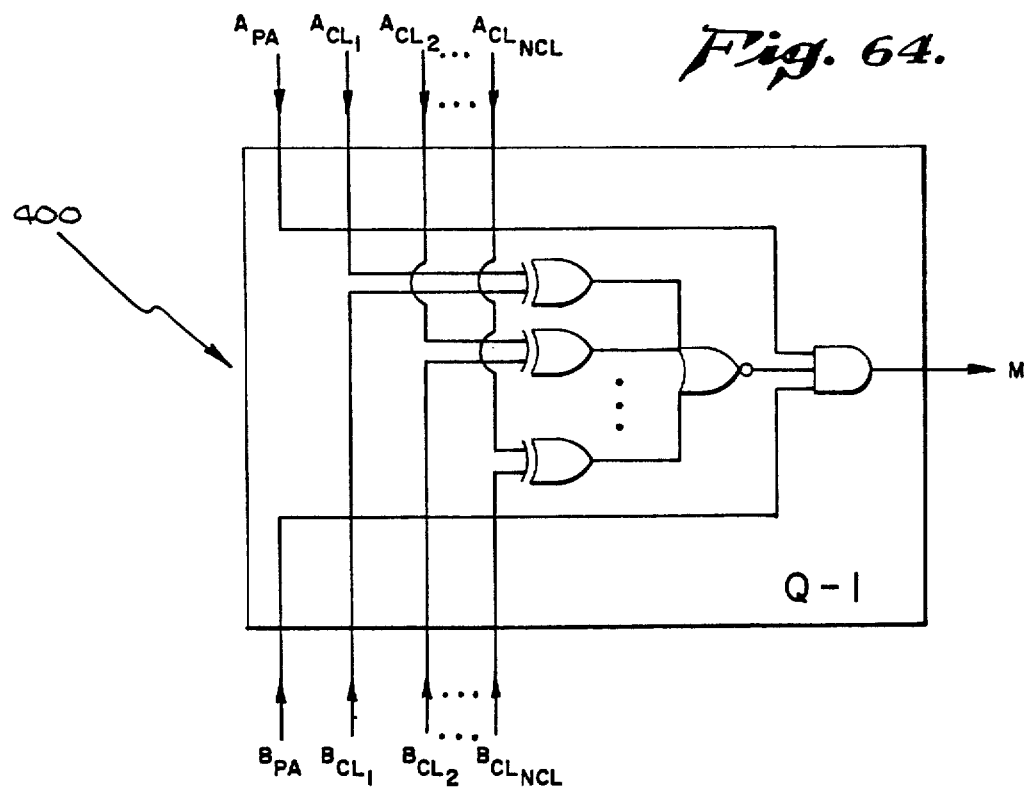
FIG. 64 shows circuit Q-1 which is a parallel preparator circuit.

Q-1: Parallel Comparator. Generally indicated as 400 in FIG. 64.

This circuit is used to decide whether or not there is a match between a token's call address and an input port's call label. A call address and a call label both are defined as being of length NCL bits. A logic true is produced at output M if:

(a) a token is present $A_{PA}$=true), AND (b) the input port to which this comparator belongs is in CALLING state ($B_{PA}$=true), AND (c) Each bit of the token's call address (supplied on the A-bits $A_1$ through $A_{NCL}$) matches each corresponding bit of the input port's call label (supplied on the B-bits $B_1$ through $B_{NCL}$).

The quantity NCL+1 is defined to be=NCX. Circuit Q-1 400, then, can be thought of as requiring two inputs, each consisting of NCX parallel bits, and producing a single output bit.

Figure 65:
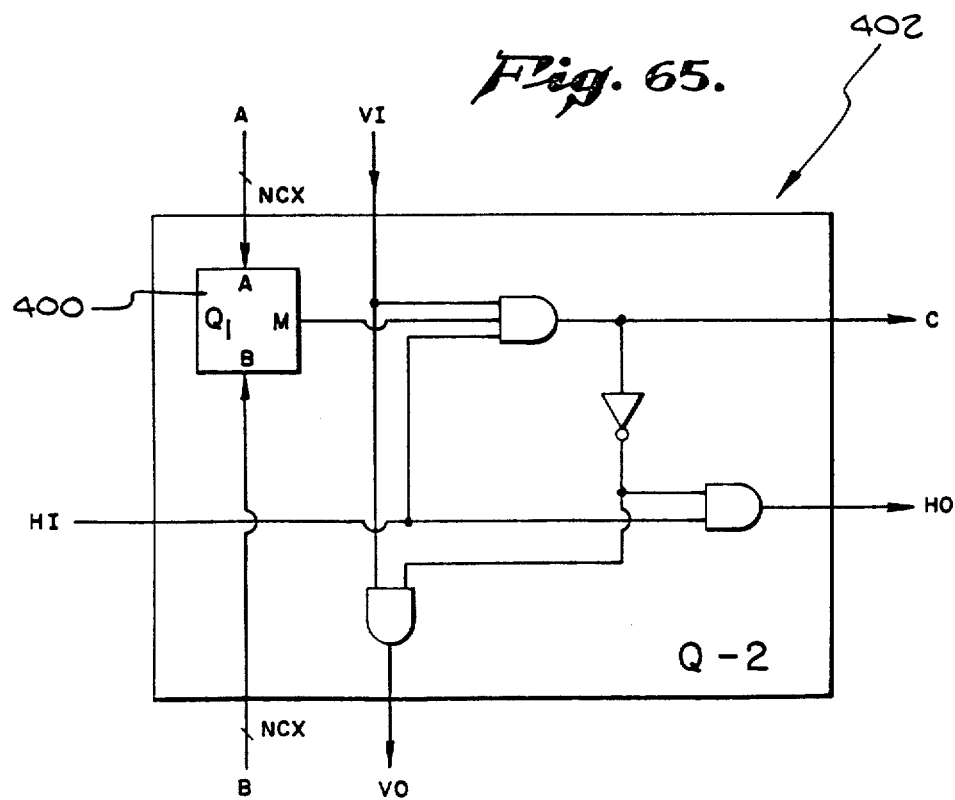
FIG. 65 shows circuit Q-2 which is a claimant circuit.

Q-2: Claimant Circuit. Generally indicated as 402 in FIG. 65.

This circuit provides the means of arbitration among input ports which might otherwise make a claim to the same token. If the contained circuit Q-1 402 declares a match, Q-2 400 will declare a "claim" (C true) provided two other conditions are satisfied:

(a) incoming HI is also true, and (b) incoming VI is also true.

If Q-2 402 declares a claim (C=true), then both HO and VO will be false regardless of the incoming VI and HI. If C=false, however, then VO=VI, and HO=HI. Q-2 402 does not provide either input to Q-1 400 from internal sources.

Figure 66:
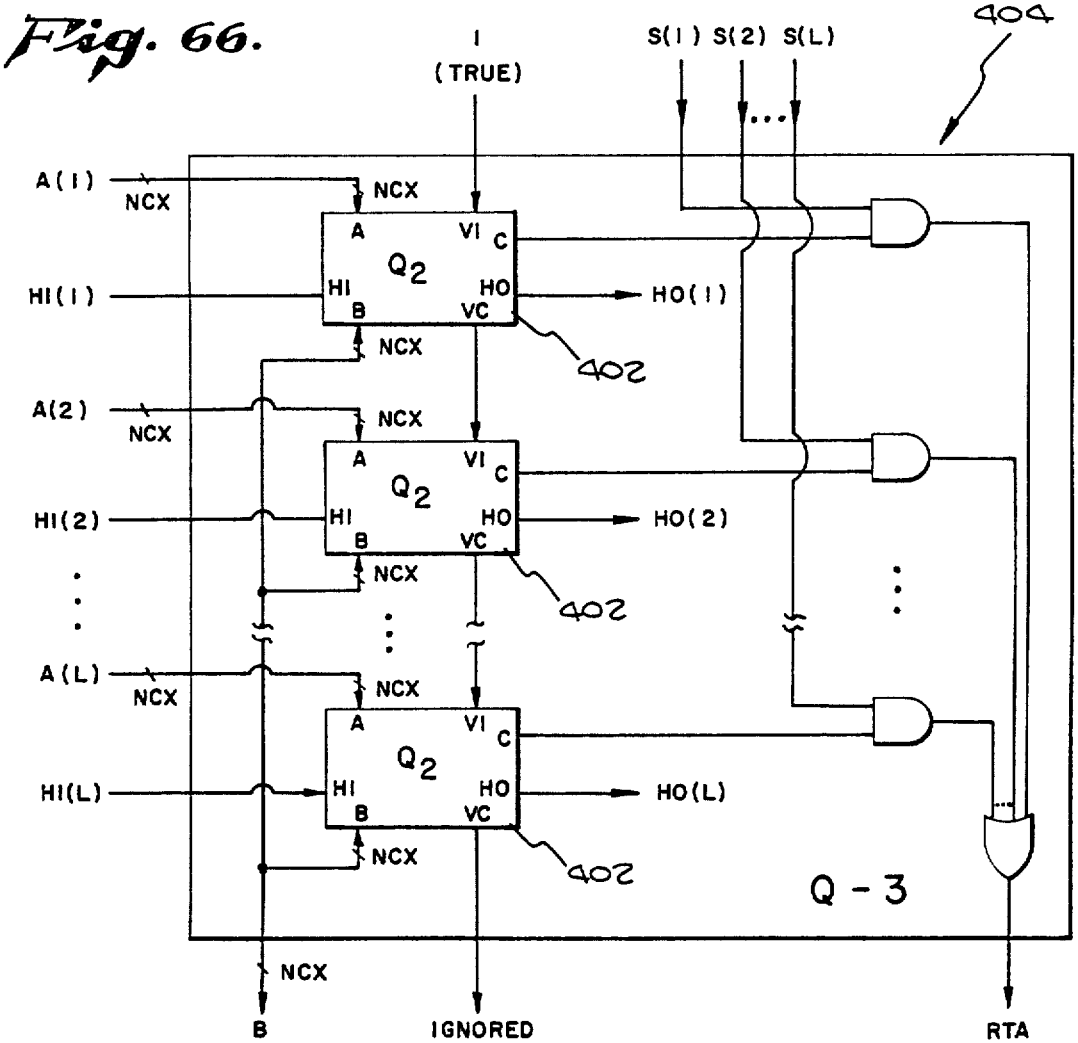
FIG. 66 shows circuit Q-3 which is an input port claimant circuit.

Q-3: Input Port Parallel Claimants. Generally indicated as 404 in FIG. 66.

Any given input port compares its own call label against all L call addresses of the L tokens presently "over" that input port's processor's row. The L comparisons occur simultaneously using L Q-2 circuits 402 whose B-inputs are all provided by a single set of NCX lines (the input port's PA bit and call label lines) and connected in parallel. The L call addresses and token PA bits are each presented to one of the L Q-2 circuits 402 as shown. Token 1's PA bit and call address (total NCX bits) become the A-input of the top Q-2 circuit 402. Token 2's PA bit and call address to the next Q-2 circuit 402, and so on until the last (Lth) token PA bit and call address are brought to the undermost Q-2 circuit's 402 A-input. The VO output of Q-2 circuit 402 "i" becomes the VI input of Q-2 circuit 402 "i+1". The VO output of Q-2 circuit 402 L is ignored, and the VI input of the first Q-2 circuit 402 is tied to logic TRUE. Each Q-2 circuit 402 still has an HI input and HO output which are not yet committed, and become the HI(i) inputs and HO(i) outputs of this circuit ($i=1,2,\ldots,L$). The other inputs include the single B-input (NCX lines) and the L A-inputs (A(1), A(2),..., A(L), NCX lines each). One last set of input lines are the S(i) lines ($i=1,2,\ldots,L$) which are row-wise select acknowledge lines used for time-multiplexing in later circuits. Only one of these lines will be true at a time (if at all). If one of the Q-2 circuits 402 has made a claim (C=1) AND the corresponding S line is also true, a TRUE output will appear at output RTA (ready-to-absorb).

Vertical arbitration occurs in the following manner. If any Q-2 circuit 402 i posts a claim (C=1) then all Q-2 circuits 402 $i+1, i+2, \ldots, L$ cannot post a claim, so that at most one of the L Q-2 circuits 402 can have C=1. And, for any claimant Q-2(i), if that Q-2's VI is true but its HI is false, then although that Q-2's C cannot be true, this does not prevent the following Q-2 (i+1) from setting its C=true. The utility of this will be apparent in Q-5 discussed hereinafter.

Figure 67:
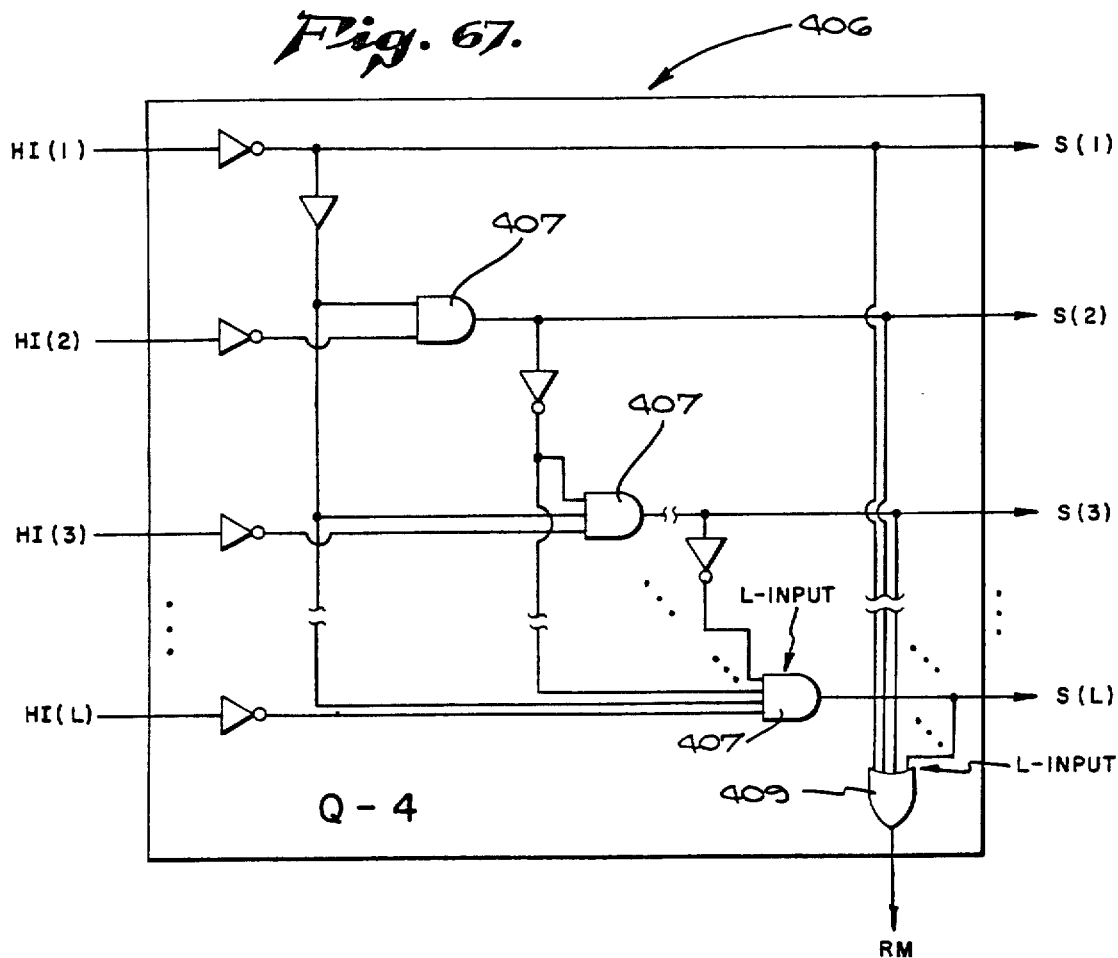
FIG. 67 shows circuit Q-4 which is a priority select circuit.

Q-4: Priority Select. Generally indicated as 406 in FIG. 67.

This circuit is straightforward and is included only for the sake of completeness. Each output S(i) is inverted and becomes an input to a multi-input AND gate 407 for all subsequent lines $i+1, i+2, \ldots, L$, so that if any given S(i) is true, all subsequent S-lines (S(i+1), S(i+2), ..., S(L)) are forced to be false. As is clear from the drawing, output S(i) is true if and only if (a) input HI(i) is false AND (b) all outputs S(1), S(2), ..., S(i-1) are also false. This circuit, then, is a first-false priority selector.

All S-lines are ORed together at gate 409 to produce a single output RM. RM will be true if any of the HI inputs are false, but will be false if all of the HI inputs are true (which causes all of the S outputs to be false).

Figure 68:
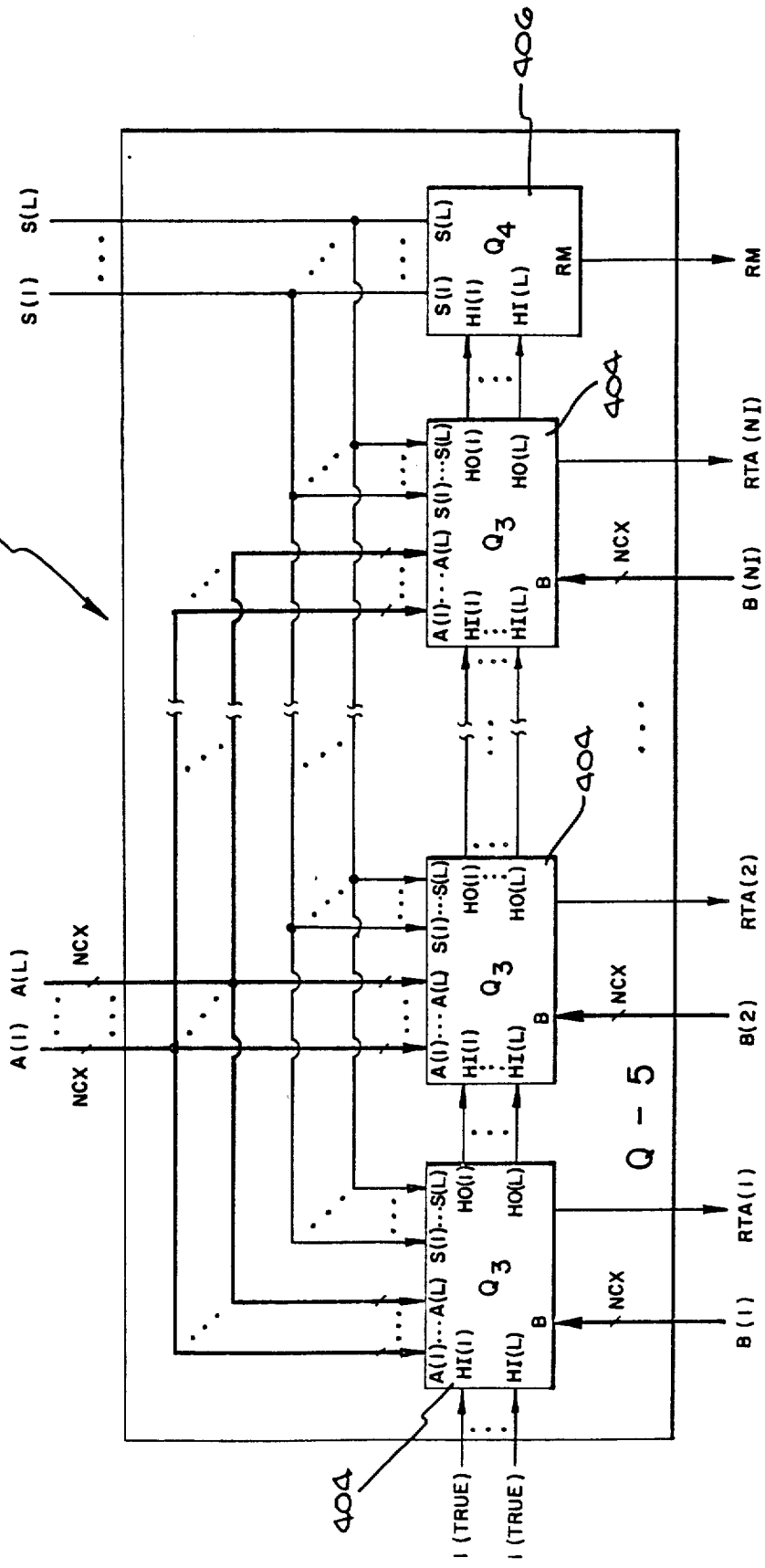
FIG. 68 shows circuit Q-5 which is a row-wise comparison network circuit.

Q-5: Row-Wise Comparison Network. Generally indicated as 408 in FIG. 68.

Given NIP input ports per processor and Y processors per row, NIP $xY=NI$ input ports per row. The input ports can be thought of as arranged in this order: (1,1), (1,2), ..., (1,NIP), (2,1), (2,2), ..., (2,NIP), ... ,(Y-1,1), (Y-1,2), ..., (Y-1,NIP), (Y,1), (Y,2), ..., (Y,NIP). The first integer of each pair is "processor number", or states the COLUMN to which the processor belongs in the processor matrix (1,2,..., Y), while the second integer in each pair states the number of the physical input port for the processor indicated by the first integer.

For the remainder of this discussion of the token queue, the input port order is equivalent to 1, 2, ..., NI as per the obvious transformation $f(a,b)=((a-1)\times NIP)+b$.

For each processor row, then, the NI input ports are arranged in a sequence as indicated here. Each input port has a Q-3 circuit 404 into which that input port's calling (PA) bit and call label bits (NCX lines) are fed as the B-input and from which a single-bit RTA output is derived. As each Q-3 404 has L inputs A(1), A(2), ..., A(L) (MCX lines each), however, all Q-3 circuits' A(1) inputs are tied in parallel, their A(2) inputs are in parallel, and so on through A(L). In this way, all NI input ports can "see" the same L tokens which are supplied from a single set of L external sources. Each source bears the present/absent bit (PA) of a token position and the (potential) call address of the token (NCA bits).

It should be clear that for any one Q-3 404 with its given input B, that Q-3 404 will compare B against all token call addresses 1, 2, ..., L and will attempt to claim that token of lowest index for which a match exists with call label B. Looking at all NI Q-3 circuits 404 as shown, it is possible that more than one Q-3 circuit 404 will attempt to claim the same token. This is prevented by the chaining of the HI and HO lines as shown. HO(j) of Q-3(i) becomes HI(j) of Q-3(i+1) for $j=1, 2, \ldots, L$, all HI(j) of Q-3(1) are tied to logic true, and the outputs HO(j) of Q-3(NI) are passed to the HI(j) inputs of a single Q-4 circuit as shown. The overall interconnection of claimant circuits insures:

(a) any of the L tokens whose call addresses are supplied by A(1), A(2), ..., A(L) will be claimed by at most one Q-3 circuit 404 (at most one input port), and (b) any one input port will claim at most one token and will do so in such a way so as not to prevent the following input ports from claiming the remaining tokens. The overall scheme, then, permits duplicate data to appear among the A inputs (that is, more than one token in the system may bear the same call address) and permits duplicate data to appear among the B inputs (that is, more than one input port in the system may present the same call label). Indeterminacy of token flow with this mechanism is a consequence of the underlying concept and must be provided for by the hardware (and, using these circuits, is provided for), with the responsibility for proper token flow on the programmer. It is only necessary that these circuits insure that a token is absorbed by one activity only.

At any given point in time, then, and assuming NI greater than or equal to L (which is not necessary), there may be L simultaneous claims (all tokens claimed). For each claimed token, the corresponding input to Q-4 406 will be low.

Q-4 406, then, will select only one of those low inputs by setting only one of its S-outputs high. The S-outputs are fed back to the NI Q-3 circuits 404 as shown so that whichever Q-3 404 claimed the token of lowest index will be the only Q-3 404 to have its RTA output high. However, if any token has been claimed, the RM line will be high. If RM is low (false), then so will be all RTA lines.

Figure 69:
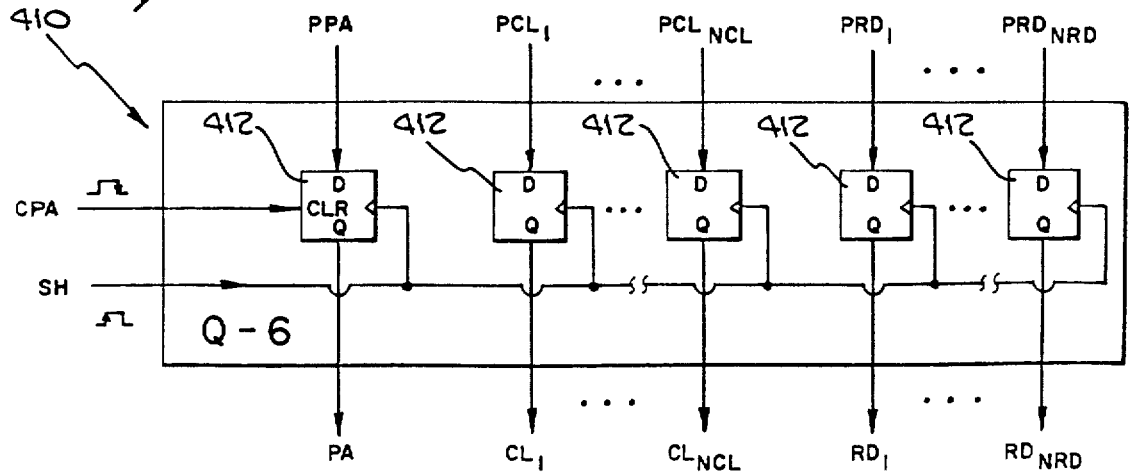
FIG. 69 shows circuit Q-6 which is a token position proper circuit.

Q-6: Token Position Proper. Generally indicated as in FIG. 69.

In general, tokens are represented by some form of memory element Here they are represented by D-flip-flops 412 although any suitable memory element can be employed. Recall the definitions of quantities TW=1+NCL+NRD, NCX=1+NCL, and NTP=NCL+NRD, a token position can be composed of TW ordered D-flipflops 412. (a) a single position, the PA bit, indicates that the token position bears a token (if true) or a vacant slot (if false); (b) a series of NCL positions form the CL-field, which represent the call address of the token; and (c) a series of NRD positions form the RD-field, which represent those parts of non-call-address token data borne along with the call address on the token queue (recall that a complete token may involve "extensions" residing in "memory"). This arrangement was motivated by the (unnecessary) assumption that NRD would be considerably greater than NCL.

The token position's data appears at the collective Q-outputs of the D-flipflops 412. D-inputs to these flip-flops 412 provide the means of setting the contents of the token position from externally-supplied sources.

Functionally, assume the following: (a) All TW D-flipflops 412 "clock" from the same incoming signal (SH) such that incoming data is latched on the rising edge of the clock pulse, but the Q-outputs do not change until after an appropriate delay; and (b) the PA position is cleared (set to false) by the falling edge of the CPA input (shown) or by the falling edge of a system-wide reset pulse (not shown).

The reset pulse is not explicitly indicated, as although most token positions will have their PA positions cleared (set to false) by the reset, one or more token positions may actually be "loaded" to a preset configuration (with PA true), artificially creating a token on system reset, instrumental in initializing the system. The overall system depends on a "progenitor" activity or activities at system initialization, and these may require such artificially generated tokens to "fire". The details will certainly vary for each implementation.

Figure 70:
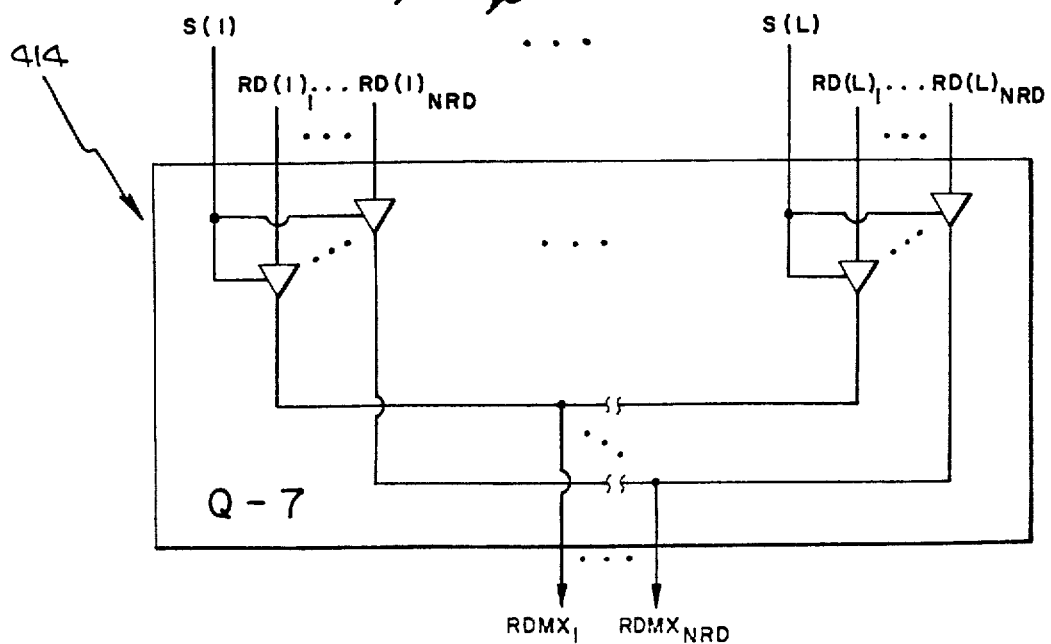
FIG. 70 shows circuit Q-7 which is an RD field multiplexer circuit.

Q-7: RD-field Multiplexer. Generally indicated as 414 in FIG. 70.

Again, provided only for the sake of completeness, this circuit has L inputs, each of NRD parallel lines, and one of these inputs is selected and copied through to the output (one set of NRD lines) depending on which of the S-inputs is true. Only one of the L S-inputs may be true (or none of them). This particular example of such a multiplexer is outlined functionally using three-state buffers as shown.

Figure 71:
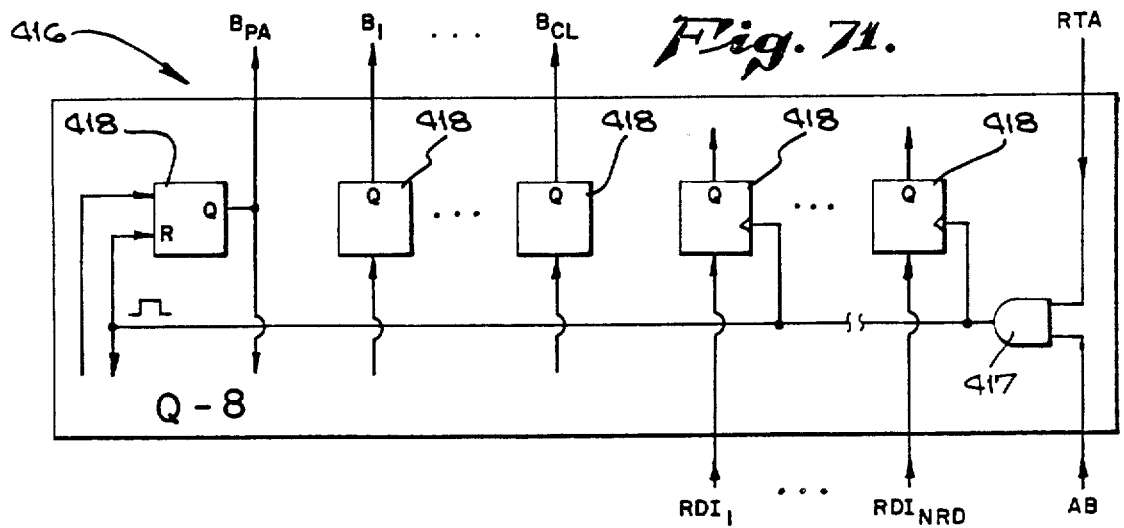
FIG. 71 shows circuit Q-8 which is a processor input port latches circuit.

Q-8: Processor Input Port Latches. Generally indicated as 416 in FIG. 71.

This set of circuits is, actually, part of the specification for a processor, and not the token queue. It is provided to clarify the interconnection of input ports to token queue. Therefore, only minimal functional descriptions of these elements are provided here.

Assume a one-bit element whose output is $B_{PA}$ having these properties and interpretations: if this element is outputting a true, then the input port to which it belongs is in CALLING state; and, if a pulse is generated by the token queue circuitry (shown as input "R" to this element) this element will produce a false output after an appropriate delay from the rising edge of the pulse.

Assume, also, a series (NCL in number) of elements which provide the input port's CALL LABEL when the first element (PA) is true.

Assume, additionally, a series (NRD in number) of latches 418 whose Q-outputs are undefined when the input port is in calling state. When a pulse is generated by the token queue circuits (the output of the AND gate 417 with inputs AB and RTA), the rising edge will cause these to latch the data present on the RDI input lines.

Synchronization between token queue timing and input port timing is assumed at this point, so that behavior is as expected.

The overall purpose here is for an input port to post a call address, and, at some time thereafter (the length of time dictated by the token queue's efficiency), the RD-field of the token being sought will be latched into the NRD latches 418 of the input port and the CALLING state cancelled, so that the input port becomes aware that it has absorbed a token from the token queue.

Figure 72:
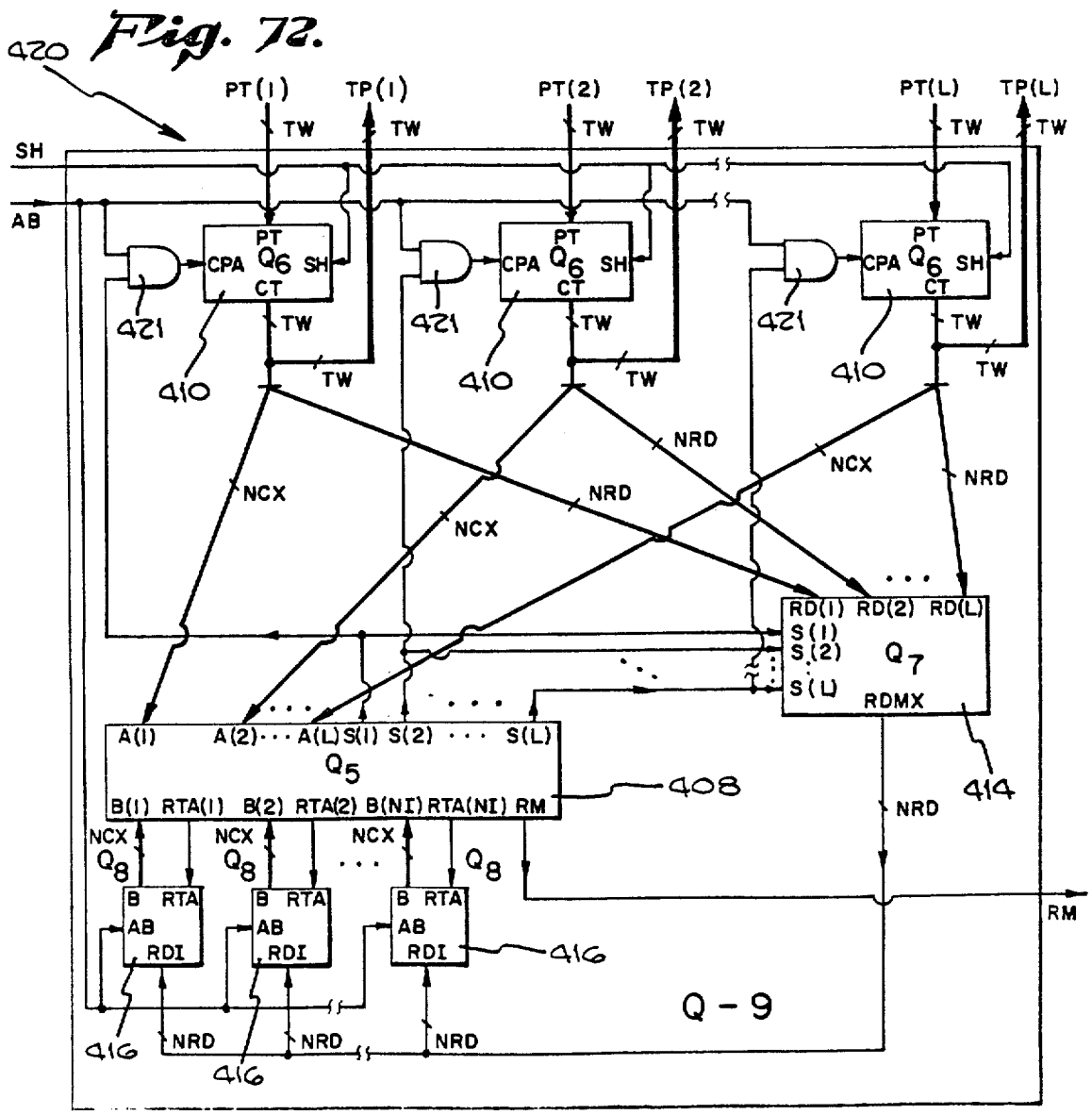
FIG. 72 shows circuit Q-9 which is a row absorption network circuit.

Q-9: Row Absorbtion Network. Generally indicated as 420 in FIG. 72.

As the token queue is L positions wide, then L Q-6 circuits 410 are arranged, as shown, for each row of processors. In this way, L tokens are brought face-to-face against NI input ports simultaneously. The outputs of each token position Q-6(i) 410 is brought out unchanged as TP(i) (each TP(i) is TW bits wide), but is also split internal to this circuit. The PA and CL bits of Q-6(i) 410 are directed toward input A(i) of the single Q-5 circuit 408, and the RD bits of Q-6(i) are directed toward the RD(i) input of the single Q-7 multiplexer 414. In this way, Q-5 408 has all inputs A(i) defined, and Q-7 414 has all RD(i) inputs defined, for i=1, 2, ..., L.

Q-5 408 is connected to all NI input ports as shown (Q-8 circuit 416 appears NI times). The CALLING (PA) bit and CALL LABEL bits (collectively referred to as the B-output of the Q-8 circuit 416) for input port Q-8(j) 416 is directed toward input B(j) of the Q-5 circuit 408, and the corresponding RTA(j) from Q-5 408 is returned to input RTA of Q-8(j) 416; this is for j=1, 2, ..., NI.

The select lines S(i) generated by Q-5 408 are routed to the corresponding input S(i) of Q-7 414, and to the corresponding Q-6(i) 410 input to the AND gate 421 whose output is that Q-6(i)'s 410 CPA input. Recall that none or at most one of the S(i) will be high. If any S(i) is high, so will be the RM line. As S(i) indicates that token Q-6(i) 410 has been both claimed and selected by the arbitration circuits, the RD field of that token will appear at the output of multiplexer Q-7 414 and is bussed to all RDI inputs of all NI Q-8 circuits 416. However, reviewing Q-5 408 shows that whichever Q-8(j) 416 has the call label corresponding to this S(i) will be the only Q-8 416 to have its RTA input high.

Consider now the situation where token Q-6(i) 410 has been claimed by input port Q-8(j). Only Q-8(j)'s 416 RTA line will be high, and only token Q-6(i)'s AND 410 gate 421 will have its lower input set to true. At this moment, assume a positive-duty clock pulse arrives at line AB. The rising edge will cause the RD bits of token Q-6(i) 410 (being passed through the Q-7 multiplexer 414) to be latched into Q-8(j) 416 and only Q-8(j) 416. After an appropriate delay, we will see:

(a) input port Q-8(j) 416 will no longer be calling, and (b) token position Q-6(i) 410 will have its PA bit set false. The result of this pulse will be that the comparators and arbitration circuits will settle into a new configuration, but with one less actual token (one of the Q-6s 410 has just been absorbed) and one less competing input port (one of the Q-8s 416 is no longer calling).

Once settled, if there is still a match, line RM will be high as before. But, if there are no more matches, RM and all the S(i) will be false and an AB clock pulse will have no effect. It is important to note that an AB pulse may be safely applied in this situation. It represents only a waste of time.

SH is also a clock signal and, as will be seen, A8 and SH are mutually exclusive. Arrival of SH causes the token positions Q-6 410 to all latch the incoming PT(i) inputs. As will also be seen later, SH will not occur when RM is high. That is, as long as a valid claim to a token by an input port has been posted, only AB pulses will appear. This will persist until all claimed tokens have been absorbed.

It can probably already be seen that the SH pulse makes Q-9 420 into one stage of a massive shift register, which, in the end and despite its novel features, is all that the token queue is.

Note also that operation of the token queue is completely synchronous with clock pulses AB and SH, as will be seen later, and both AB and SH are derived from a single token queue clock.

Figure 73:
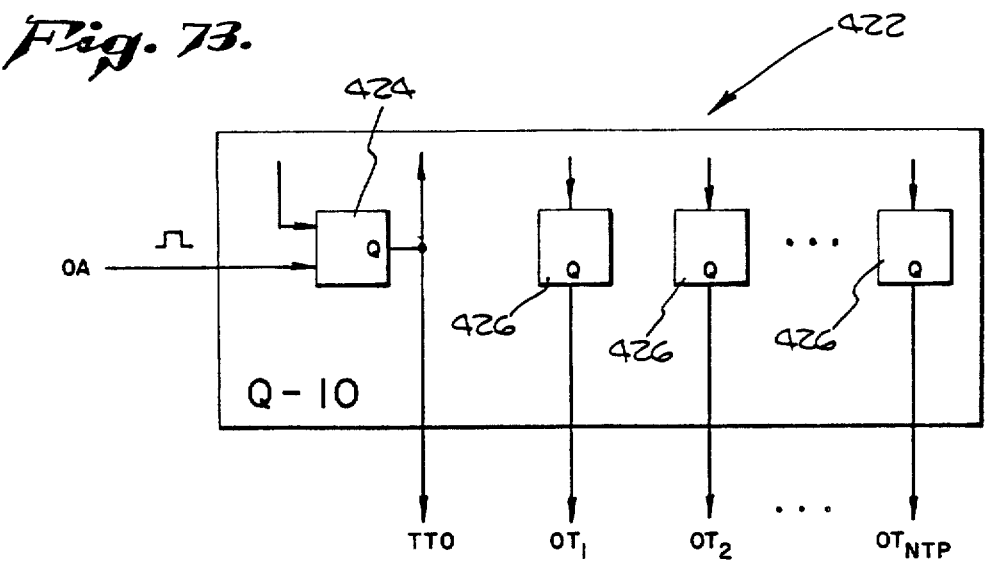
FIG. 73 shows circuit Q-10 which is a processor output port circuit.

Q-10: Processor Output Port. Generally indicated as 422 in FIG. 73.

Like circuit Q-8 416, this set of circuits is actually part of the specification of a processor and not the token queue. It is provided to clarify the interconnection of output ports to token queue. Therefore, again, only minimal functional descriptions of these elements will be provided here.

One may assume a one-bit element 424 whose output is TTO having these properties and interpretations: If this element 424 is outputting a true, then the output port to which it belongs is in LOADED state (the output port bears a token to be placed into the token queue); and, if a pulse is supplied by the token queue circuitry, shown as input OA, the rising edge of that pulse will cause this element 424 to output a false after an appropriate delay. This indicates that the output port is no longer in calling state and that the token to be output has in fact been removed onto the token queue.

One may also assume NTP elements 426 whose output represents the CL and RD elements of a token to be output when TTO is true. These are shown collectively as output TO (NTP lines).

Figure 74:
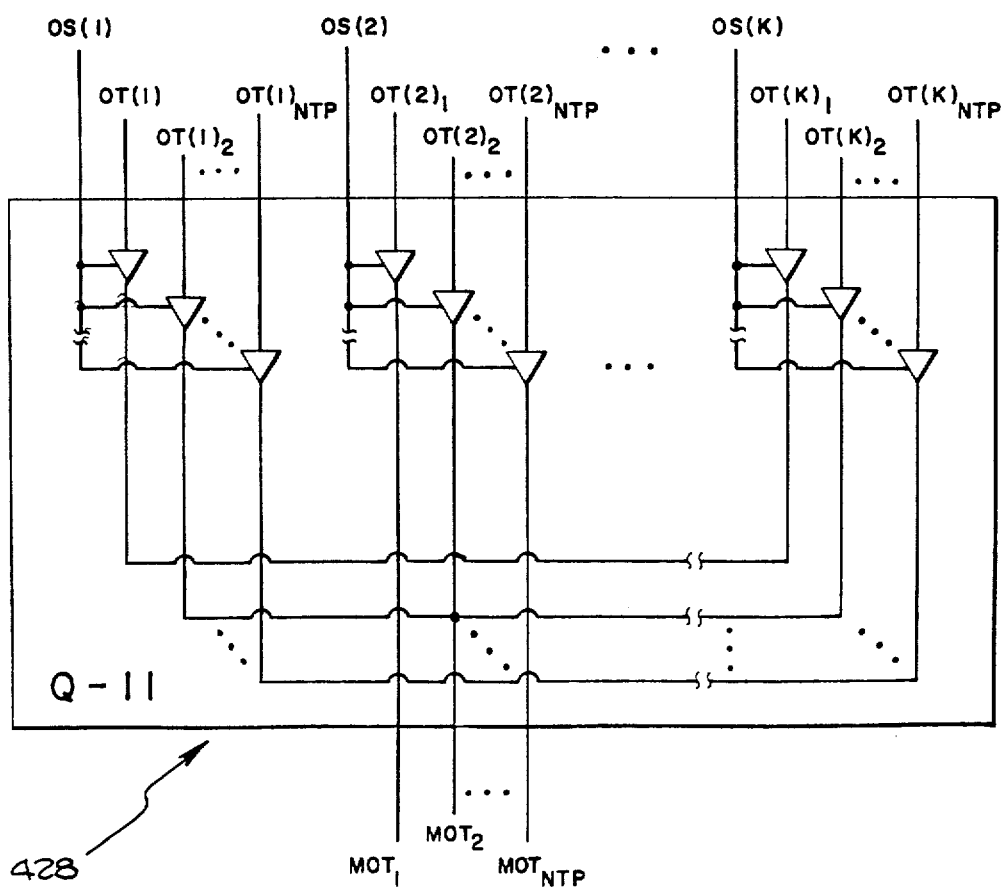
FIG. 74 shows circuit Q-11 which is an output port K-group multiplexer circuit.

Q-11: Output Port K-group Multiplexer. Generally indicated as 428 in FIG. 74.

Similar in design to the RD-field Multiplexer (Q-7 414) this multiplexer 428 has K inputs, each input being of NTP parallel lines. One of these inputs is selected and copied through to the output (NTP lines) depending on which of the K OS-inputs is true. Only one of the K OS-inputs (or none of them) may be true at a time.

The quantity K is defined as the ratio NO/L. The values of NO and L are constrained such that this ratio K must be integral. Also, NO is the total number of physical output ports in the row of processors, equal to NOP (number of output ports per processor) times Y (number of processors per row).

Figure 75:
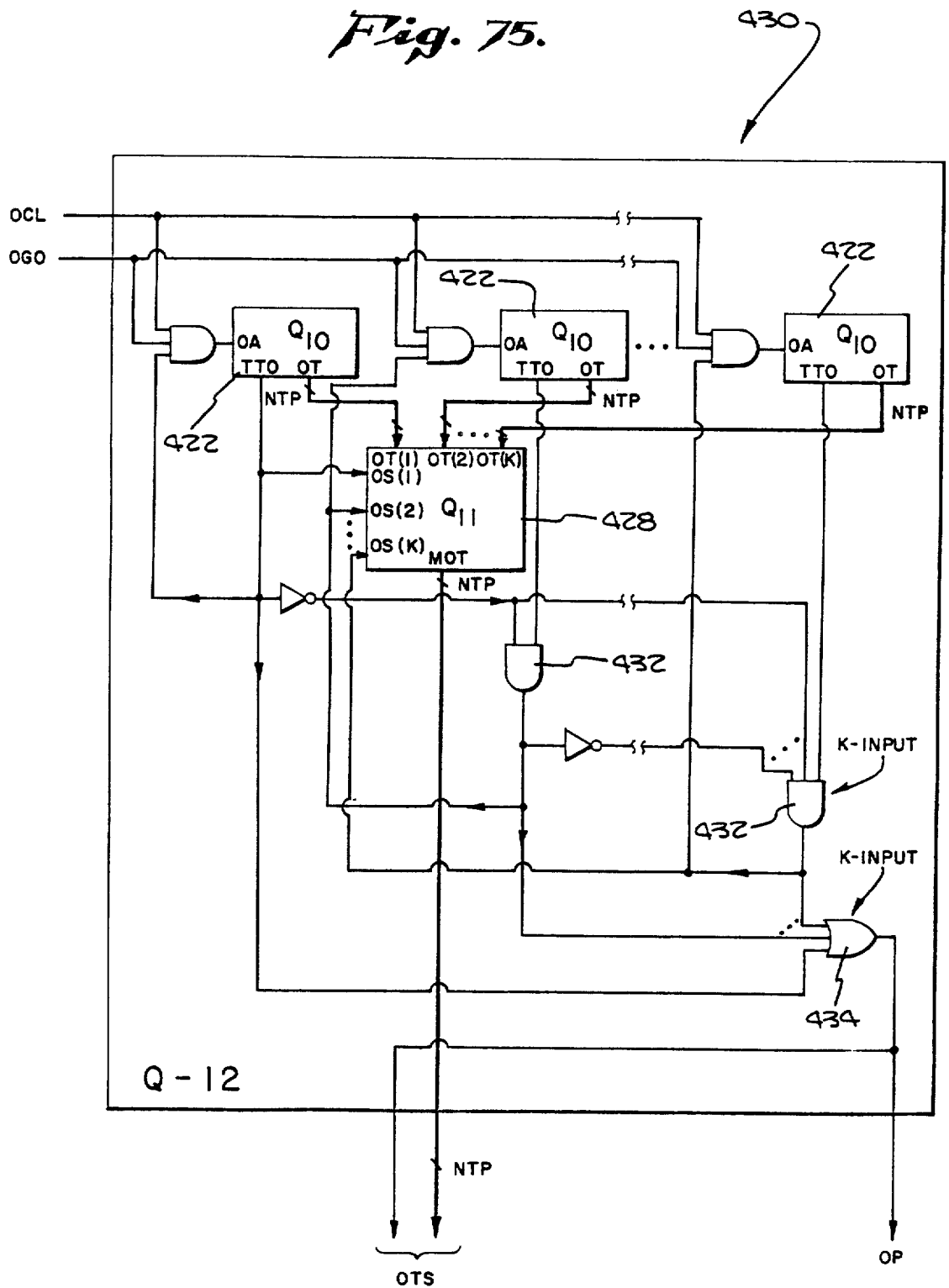
FIG. 75 shows circuit Q-12 which is an output port K-group circuit.

Q-12: Output Port K-group. Generally indicated as 430 in FIG. 75.

K adjacent output ports form a K-group, interconnected as shown. To understand this circuit, begin at the inputs OS(i) into the single circuit Q-11 328. Each OS(i) input, except for OS(1), is the output of a multi-input AND gate 432. For OS(2), this was a 2-input AND gate 432; for OS(3), a 3-input AND gate 432, and so on, up to OS(K) having a K-input AND gate 432. Each output of the AND gate 432 giving OS(i) is inverted and becomes an input to each of the subsequent AND gates 432 for OS(i+1), OS(i+2), . . . , OS(K). It should now be recognized that this is the major portion of the arbitration circuit (priority select) Q-4 406, except that the initial inputs to the circuit are not inverted, so that this is a first-true priority select. Of the K Q-10 circuits 422, that Q-10 422 having its TTO output true AND having lowest index i will have its corresponding OS(i) appear true at Q-11 428 as well as having one of the inputs of the three-input AND gate 432 whose output is the OA-input for that Q-10 422 be true. Thus the "winner" Q-10(i) 422 will be the only Q-10 422 having this AND-gate-input high. It is also the one whose TO data appears at the output of the Q-11 multiplexer 428. Assume OCL false, one of the Q-10(i) 422 having its TTO true, and that Q-10(i) 422 is also the winner of the arbitration. Then, if OGO is true, one sees that the TW output lines OTS (taking the output of the K-input OR gate 434 to be the PA-position of this token-wide output position), a clock pulse arriving at OCL will clear away the Q-10(i) 422 whose data is currently asserted at'OTS on its falling edge. After the pulse has passed, any other Q-10 422 will be able to assert itself in a similar way. Output bit OP simply means that output OTS may be taken as a real token, when OP is true, waiting to get onto the token queue. OP will be true if any of the Q-10 422 TTO outputs is true. In this way, K output ports share a sort of "funnel" onto the token queue, as shall be seen shortly. If OP is false, the PA bit of the output taken position OTS will also be false, so that when OP is false, OTS (should for some reason it be placed onto the token queue) will appear only as an empty token slot, and not as a true token.

Figure 76:
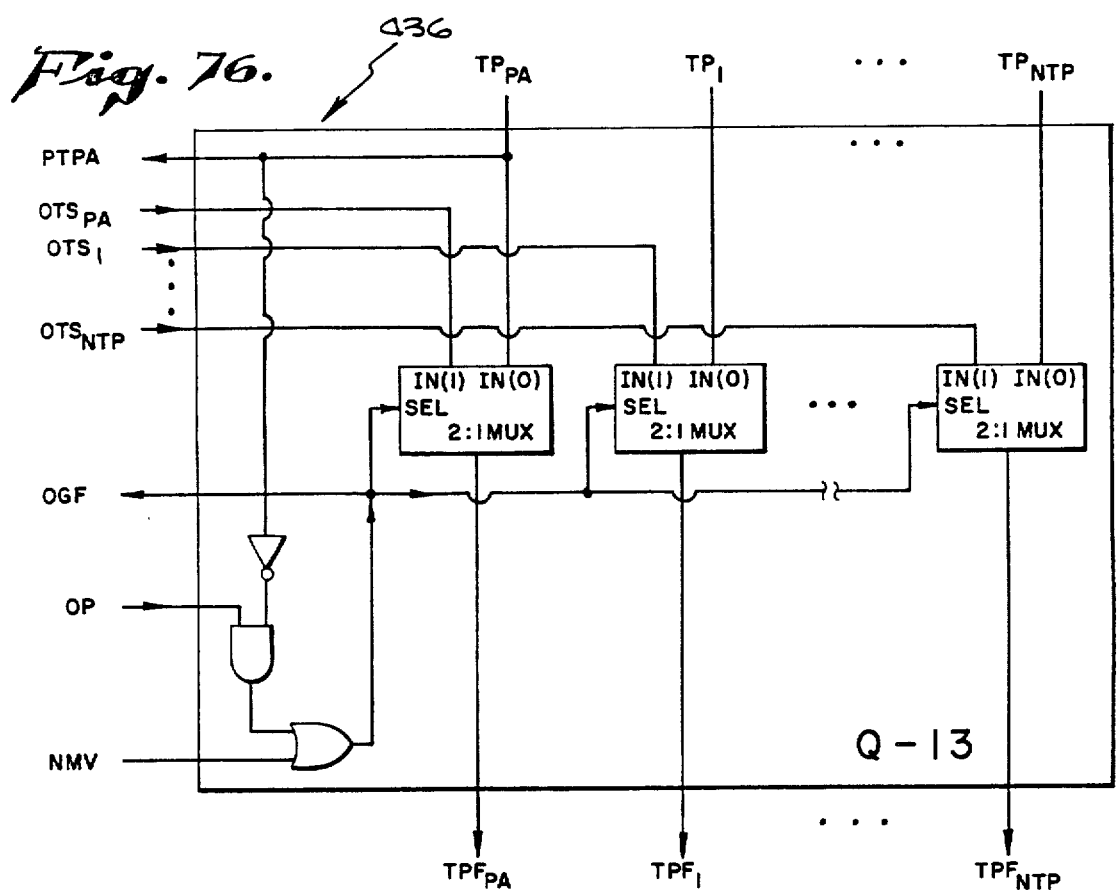
FIG. 76 shows circuit Q-13 which is an output-gating multiplexer circuit.

Q-13: Output-gating Multiplexer. Generally indicated as 436 in FIG. 76.

This is, in effect, TW 2-input multiplexers all deriving their select bit from the same circuitry. One of two token positions can be selected. The one presented at input TP (TW bits wide) or the one presented at input OTS (also TW bits wide). The select bit=true will cause OTS to be selected. The select bit is itself derived from the PA position of the TP input, and two external levels OP and NMV. If NMV is high, then the multiplexer 436 will select the OTS position, no matter what else. But, if NMV is false, OTS will be selected only if both OP is true AND the incoming token position TP is empty ($TP_{PA}$=false). Thus, in the absence of NMV, the multiplexer 436 gives priority to the TP position. The actual selection of the multiplexer appears at output OGF (false=TP, true=OTS), and the original PA bit of the TP input is brought through untouched as output PTPA.

Figure 77:
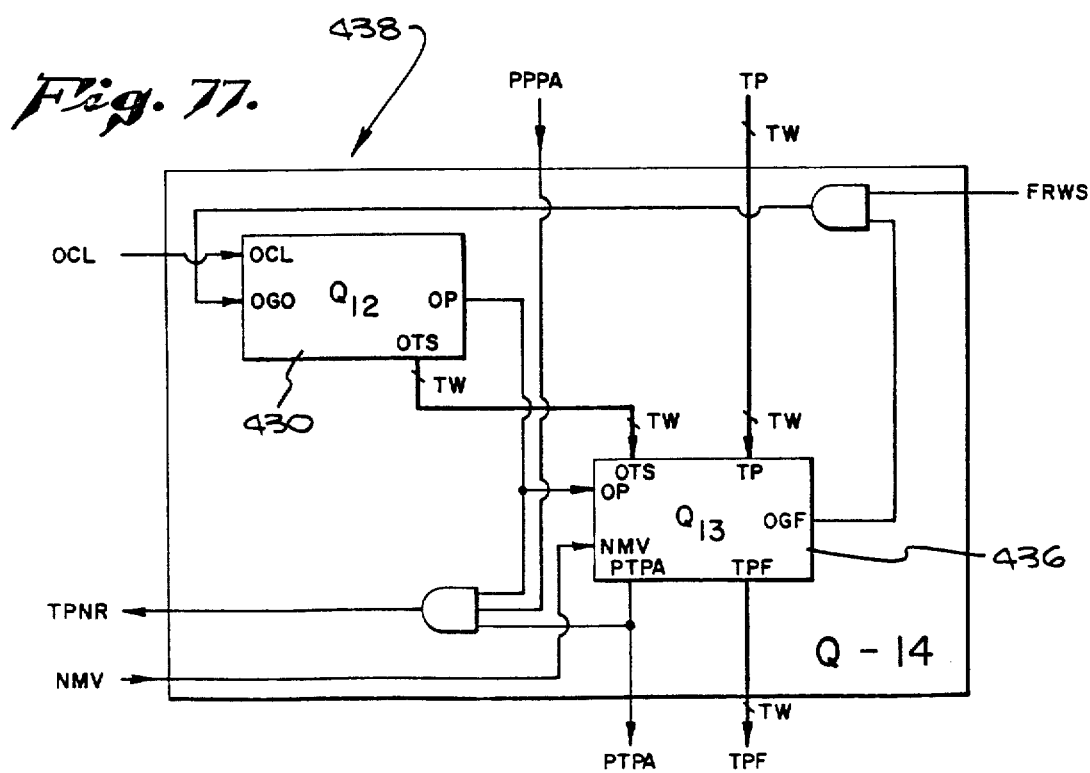
FIG. 77 shows circuit Q-14 which is a K-group merged onto token queue.

Q-14: K-group Merge Onto Token Queue. Generally indicated as 438 in FIG. 77.

With circuit Q-12 430 representing K output ports, observe the function of the interconnection with Q-13 436. If Q-12 430 has a token to output, the OP from Q-12 430 will appear as input OP of Q-13 436. This means, "if input TP to Q-13 436 represents an empty position, then let me (Q-12 430) put my data in its place". If this request is granted, then OFG will be true (from Q-13 436) and token position OTS from Q-12 430 will appear as the output TPF of Q-13 436. Input TP will be ignored, but it represents no real token anyway so this does not matter.

Q-13's 436 OGF (output K-group gated forward), if it meets a true FRWS (forward row will shift) will present a true OGO input (output will be gated out) to Q-12 430 which ultimately permits Q-12 430 to declare its selected output port to be properly emptied when the clock pulse (input OCL) arrives.

Now consider NMV. If NMV is true, TP empty (as before) and Q-12's 430 OP true (as before) then the effect is still the same: Q-12 430 will make use of the vacant TP and replace it with its own data. But, if TP had in fact been full (which can be detected by Q-13 436 output PTPA being true), then Q-12 430 would not be making use of an empty TP position, but in fact would be replacing it outright, and there is danger of the original data coming into TP being lost, as it is not asserted forward to TPF (token position forward). As shall be seen, TP comes from the token position corresponding to the Q-12 430 K-group, and, if that token position (circuit Q-6 410) receives an SH pulse (shift), the data will indeed be lost. External circuitry insures that this will not occur.

If TP is indeed full but Q-12 430 has nothing to output (OP false) then the same danger of losing TP exists, but an empty position will appear at TPF. This is important. It provides a means of placing empty space into the token queue and is the function of input NMV.

Output TPNR is derived from input PPPA (which corresponds to PTPA, from the preceding row, not this row), from PTPA (from this row's TP position), and from OP. In short, if Q-12 430 has something to output (OP true), the current token position is already full (PTPA true), AND the token position of this column for the preceding row is also full, it would appear that Q-12 430 will never see an empty slot in the near future, it generates this request TPNR (this position needs room!) which translates into an NMV signal applied to the preceding row. Hopefully, the NMV will cause the Q-14 circuit 438 of the preceding row to place an empty slot onto the token queue, so that this Q-12 430 will have someplace to put its data into the token queuer.

Figure 78:
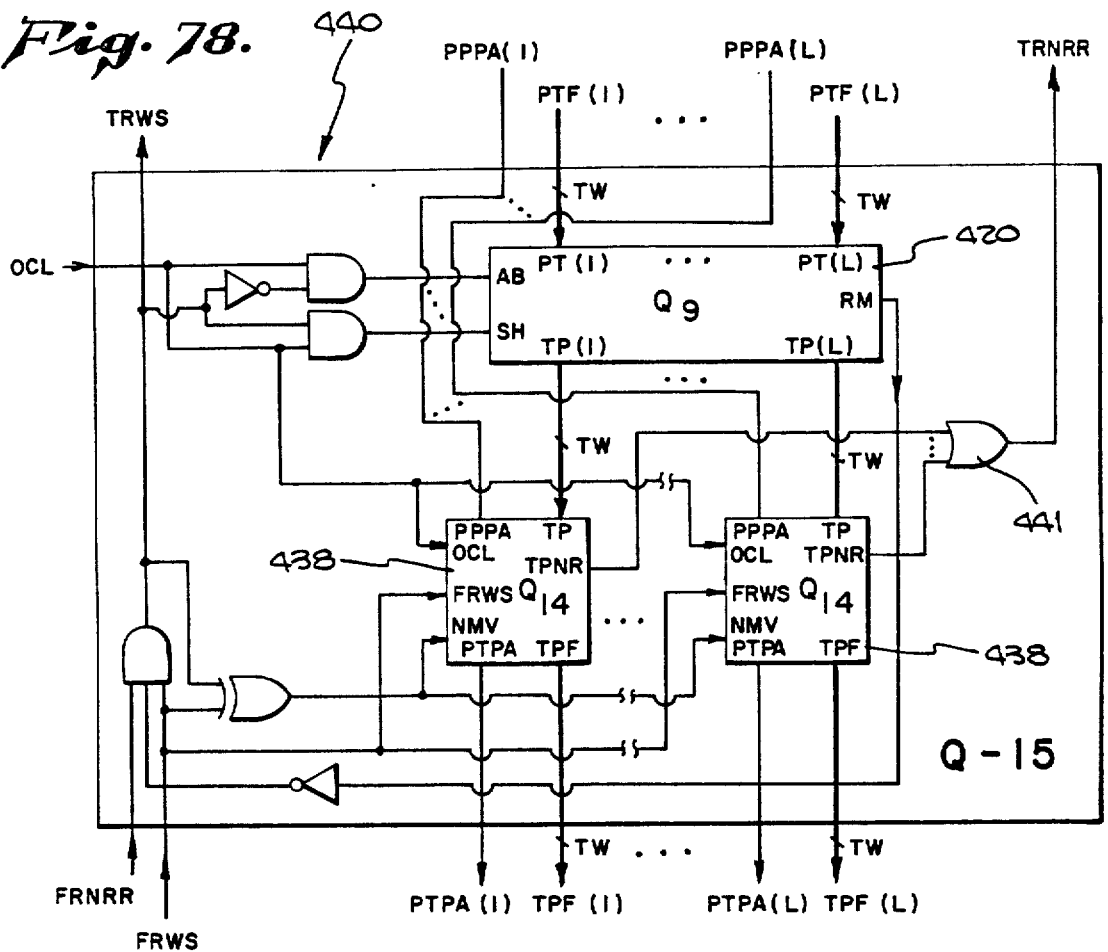
FIG. 78 shows circuit Q-15 which is a token queue row complete circuit.

Q-15: Token Queue Row Complete. Generally indicated as 440 in FIG. 78.

This circuit represents all L token positions (in Q-9 420), all NI input ports for this row (in Q-9 420) and all NO output ports for this row (K in each of the L Q-14's 438). The PA bit of the token position Q-6(i) 410 (indicated by one of the bits of output TP(i) from Q-9 420) is brought all the way out unchanged as output PTPA of Q-14(i) 438. The token position itself does not emerge directly, but only at the mercy of multiplexer Q-14(i) 438 (merge circuit), and, if lucky enough to pass through Q-14 438, appears at TPF (i).

Note now the inputs controlling the Q-14 circuits 438. Each Q-14 438 has its own individual PPPA(i) from the preceding token row. But, other controls are in common among all Q-14s 438 for this row. One is the FRWS line (forward row will shift). NMV is derived from an exclusive-or gate. If the forward row will shift but this row will not shift, NMV will be true. Therefore, the danger of losing TP inputs of the Q-14s 438 is solved, as NMV actually means that Q-9 420 will not get an SH pulse. All of the outputs TPNR (this position needs room) are NORed together at gate 441 to form a unified signal TRNRR (this row is not requesting room). The counterpart from the following row appears as input FRNRR (following row is not requesting room).

This row will give itself an SH pulse, then, only if it can generate TRWS (this row will shift)=true. To do this, all three of these conditions must be true:

(a) the following row's FRNRR must be true (following row is not requesting room);

(b) the following row will shift itself (FRWS, following row will shift); and (c) no input port for this row matches any of the tokens over this row, that is, no call labels match any of the call addresses.

In short, RM output of Q-9 420 must be false. Q-9 420 and the Q-14s 438 are all driven from a single unifying clock OCL, a constant-frequency clock having a positive (true) pulse. Thus, on each OCL event, Q-9 420 will either get a SHIFT pulse, or it will get an ABSORB pulse. It will get an absorb pulse if any one or more of the above three conditions are not met, that is, (a) the following row says it needs some room (FRNRR is false), OR (b) the following row is not shifting (FRWS is false), OR (c) this row's Q-9 420 claims that a match exists (RM is true)

so that it requires an absorb pulse to achieve the absorbtion.

Q-15 circuits 440, then, are interconnected in a natural way (see Q-24 to form the token-queue-proper matrix, representing the interface between token queue and the processor matrix).

Q-16: Self-switching Wait Stage Master Bit. Generally indicated as 442 In FIG. 79

The purpose of the next eight figures is to provide a novel storage facility for tokens which are currently not facing any processors. This too is another (complex) application of the fast forward propagating FIFO described elsewhere herein. These unexamined tokens (as no processor is examining them) must be brought to the processors as soon as reasonably possible. Thus, their storage facility should propogate them forward as quickly as possible. On the other hand, to prevent any given token from never getting to the processors, the store should not permit any token to be bypassed by any other token. One can think of this store, then, as a sort of "accordion" which shrinks and swells to accommodate whatever number of tokens may be in it at the time. The store will have some maximum capacity, and some minimum effect in terms of time needed for a token entering one end of the accordion to emerge from the other end. One would expect the best (fastest) performance to be when the accordion is empty, and its worst when the accordion is full. Tokens otherwise move through the accordion, emerging from the exit in more or less the same order in which they were entered into the other end.

One token position in this store will either be "empty" or "full", and, if empty, represents a "fold" in the accordion which is available to be filled but not unless absolutely necessary. Generally, the circuit will try to pass any tokens past the fold rather than forcing the token into the fold. Consider the PA bit of such a token position (if this bit is a one, the token is a real token, otherwise it is a non-token, a "bubble" which should be squeezed out). Recall that the token queue is, basically, a shift register which is closed on itself, a sort of massive merry-go-round. Then, consider circuit Q-16 442, and note a D-latch 444 which represents a token position in this expandable store. Coming into the D-input is data from a "previous position" and the output (Q) of the latch 444 is presented to a "forward position". Not n, however, that there are some direct connections from the previous location to the forward location (bypassing the latch) which come into play to effect the "accordion" effect. The purpose of this circuit is to bypass the latch if possible.

Consider an initial condition (before arrival of a clock pulse at the CLK input) and then the resulting condition (after the pulse) for all possible initial settings of the two independent conditions which determine the action of this circuit. These two conditions are (a) in this stage full or empty? That is, does the output of this D-latch state true (full) or false (empty)?; and (b) will the following stage shift or not? (because if it does not shift, then it will not latch the data being output from this stage's outputs). Studying the circuit will show that these four possible initial conditions are managed in this way:

(1) This stage is full (latch 444 Q-output is true) and next stage will shift (FWS is true, and is provided to this stage by the following stage): then, (a) the data in the latch 444 is brought to output DF, (b) GTS will be true, (c) this stage will shift (WS will be true), (d) input DI is presented to the latch 444 D-input, (3) the latch 444 holds a valid token. When a clock pulse arrives as CLK, then (f) the latch 444 will clock and the clock pulse will appear at output CTS. Once the clock pulse has passed, (g) whatever was in DI before the clock will appear in the latch 444 after the pulse. If it was a valid token, TSF will be true, otherwise it will be false.

(2) Now suppose this stage is full (latch 444 Q-output is true) but the next stage is not shifting (FWS supplied is false). Then, (a) a false (a non-token) is brought to output DF, (b) GTS will be true, (c) this stage will not shift (WS will be false), (d) input DI is presented to the latch 444 D-input, (e) the latch 444 holds a valid token. When a clock pulse arrives at CLK, (f) the latch will not clock, and output CTS will remain false and, after the clock pulse has passed, whatever was in the latch 444 before the shift (it will be a valid token) will still be therein.

(3) Now suppose this stage is not full (latch 444 Q-output is false) but the next stage will not shift (FWS is false). Then, (a) a false (representing a non-token) is brought to output DF, GTS will be true, (c) this stage will shift (WS will be true), (d) input DI is presented to the latch 444 D-input, and (e) the latch 444 holds nothing of value (false, not a real token). When clock pulse arrives at CLK, the latch will clock and the clock pulse will appear at CTS (f). Once the clock pulse has passed, (g) whatever was at DI before the pulse hit will be in the latch 444 after the pulse.

(4) One last case: this stage is empty (latch 444 Q-output false) and the following stage will shift (FWS is true). Then, (a) input DI is presented to output DF, (b) GTS will be false, (c) this stage will clock (SW is true), (d) a false is presented to the latch 444 D-input, and (e) the latch 444 represents a non-token. When a clock pulse hits from CLK, (f) the latch 444 will clock and the clock pulse will appear at CTS. After the pulse has passed, (g) the latch 444 will contain a false.

Here is what these four cases mean, when taken in terms of the PA bit of a full token position:

(1) This stage full, and next stage shifting, will cause this stage's data to be shifted forward to the next stage, and the preceding stage's data will be latched into this stage. In this case the accordion was full and, therefore, had to be emptied forward. Whether or not it is still full after the clock depends on what was at DI before the clock hit.

(2) This stage full, and next stage not shifting, means, do nothing. A false is presented at DF only as a convenience for later uses of the circuit. The pipeline has become plugged up for some reason, so nothing is to move.

(3) This stage empty, but next stage not shifting, means that although the forward part of the pipeline is not moving, this stage is empty so it can accommodate whatever may be coming in. Therefore, this stage will shift, that is, incoming data will be latched. DF will be false again as a convenience. And again, whether or not this stage indeed becomes "full" after the clock pulse depends on exactly what was in DI before the clock hit.

(4) This stage empty and next stage shifting means that there is no good reason to get this stage involved at all, let the incoming data propogate forward immediately and keep this stage out of the picture.

Note, the above discussions apply as long as input CONT is false. If CONT is true, then the circuit will behave as if the stage was "full", except that data at DF could actually be a false if the D-latch 444 Q-output was false. Holding CONT true means that this stage will always place itself into the path of the data, and behavior is constrained to cases (1) and (2) above, except for the discrepancy in DF output from those described above for CONT false. CONT true is used to insure that some stage in the overall accordion store is utilized, is useful in accordion-store to token-queue-proper interfacing, and management of practical considerations such as gate delay time accumulation and such.

Output TSF (this stage full) is true only if the latch 444 contains a true, regardless of input CONT.

Again, like circuit Q-6 410, use of the D-flip-flop 444 in this circuit is meant only to indicate that some appropriate form of memory device is to be employed here. Also, a positive-duty clock pulse is used such that input data is latched on the rising edge of the pulse, but the Q-output does not change until after an appropriate delay.

And, also once again, a system-wide RESET pulse (not shown) would cause the memory device in all occurrences of Q-16 442 in the system to be set to output a false. But again, (see circuit Q-6 410) special wiring of a few selected token positions could provide a means for artificially generating a token at reset pulse time. In general, though, a system-wide RESET should render the accordion store as empty, with no tokens in it, except for such special exceptions as dictated by the individual implementation.

Figure 80:
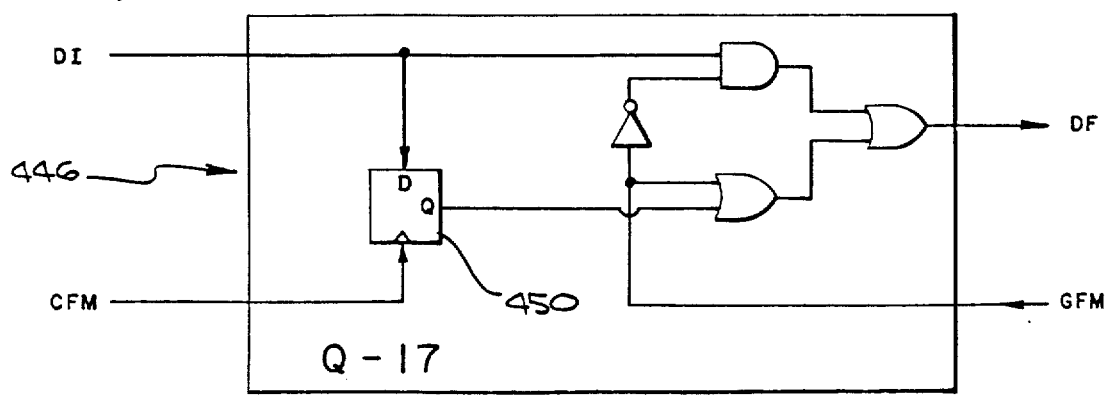
FIG. 80 shows circuit Q-17 which is a self-switching wait stage slave bit circuit.

Q-17: Self-switching Wait Stage Slave Bit. Generally indicated as 446 in FIG. 80.

Using the same type of memory device as in Q-16 442 above, the purpose of this circuit will be clear in the context of Q-18 below.

Figure 81:
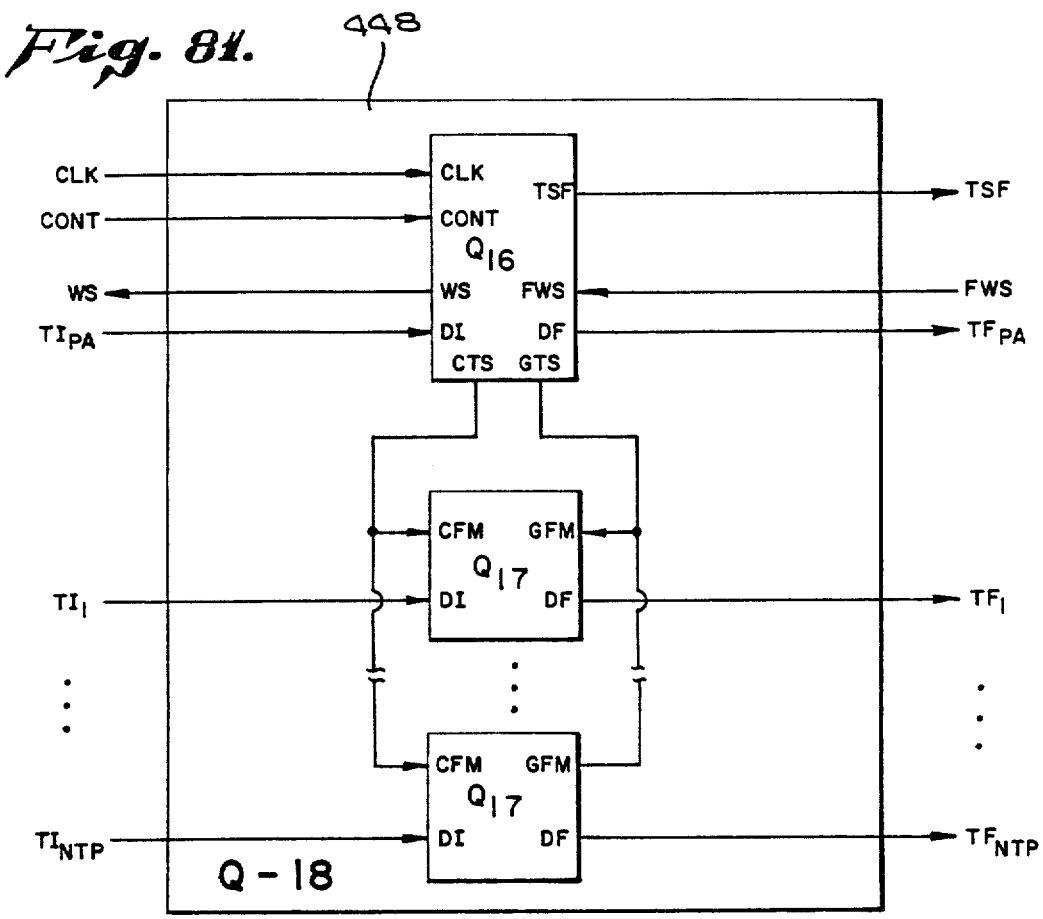
FIG. 81 shows circuit Q-18 which is a token-wide wait stage circuit.

Q-18: Token-Wide Wait Stage. Generally indicated as 448 in FIG. 81.

Using a Q-16 circuit 442 for the PA bit of a token position, and NTP Q-17 circuits 446, interconnected as shown, one has a token-wide parallel stage (TW bits wide) which is the backbone of the accordion store. It contains a potential token position, accepts the token data from the preceding stage as input TI, and presents data forward to the following stage through output TF. If this stage is full, output TSF will be true, otherwise false. If the latch in the Q-16 circuit 442 is clocked, so will be the latch 450 in all of the Q-17 circuits 446. If Q-16 442 is passing its DI directly through to its DF, all Q-17 circuits 446 will do the same.

Q-19: Wait Stage Block. Generally indicated as 452 in FIG. 82.

Now, if many Q-18s 448 are chained together as shown, with one and only one (the forward-most) having its CONT input tied true, and all others tied CONT-=false, one has a block which appears to the outside world to be of varying internal capacity (up to a maximum dictated by the total number of Q-18s 448 in the block). It will appear as a shift register which is capable of holding at most one empty position but squeezing out all other empty positions. If its FWS input is false, indicating that its "following" circuit is not shifting, this circuit will probably output WS=true, meaning "big deal, I will still shift", that is it will begin to use its varying internal capacity and will only present WS=false when it has been filled and its follower is not shifting (FWS false).

The number of Q-18s 448 in each Q-19 452 is arbitrary, dictated only by overall design considerations and engineering details. The number should be as large as such considerations will permit.

All Q-18s 448 TSFs are OR'd together, that is, output TBF will be true if any one or more of the Q-18s 448 contain a true token.

Figure 83:
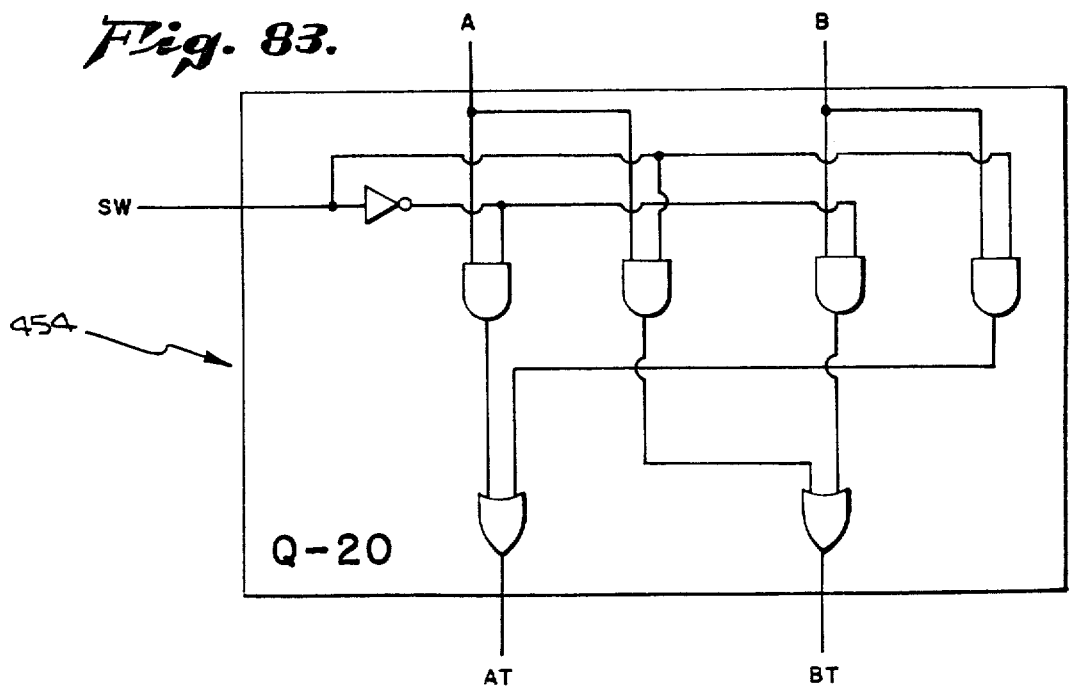
FIG. 83 shows circuit Q-20 which is a crossing switch circuit.

Q-20: Crossing Switch. Generally indicated as 454 in FIG. 83.

This circuit passes input A (one bit) to output AT, and also input B to output BT, if SW is presented as false. But, if SW is true, input A will appear at output BT, and input B will appear at output AT.

Figure 84:
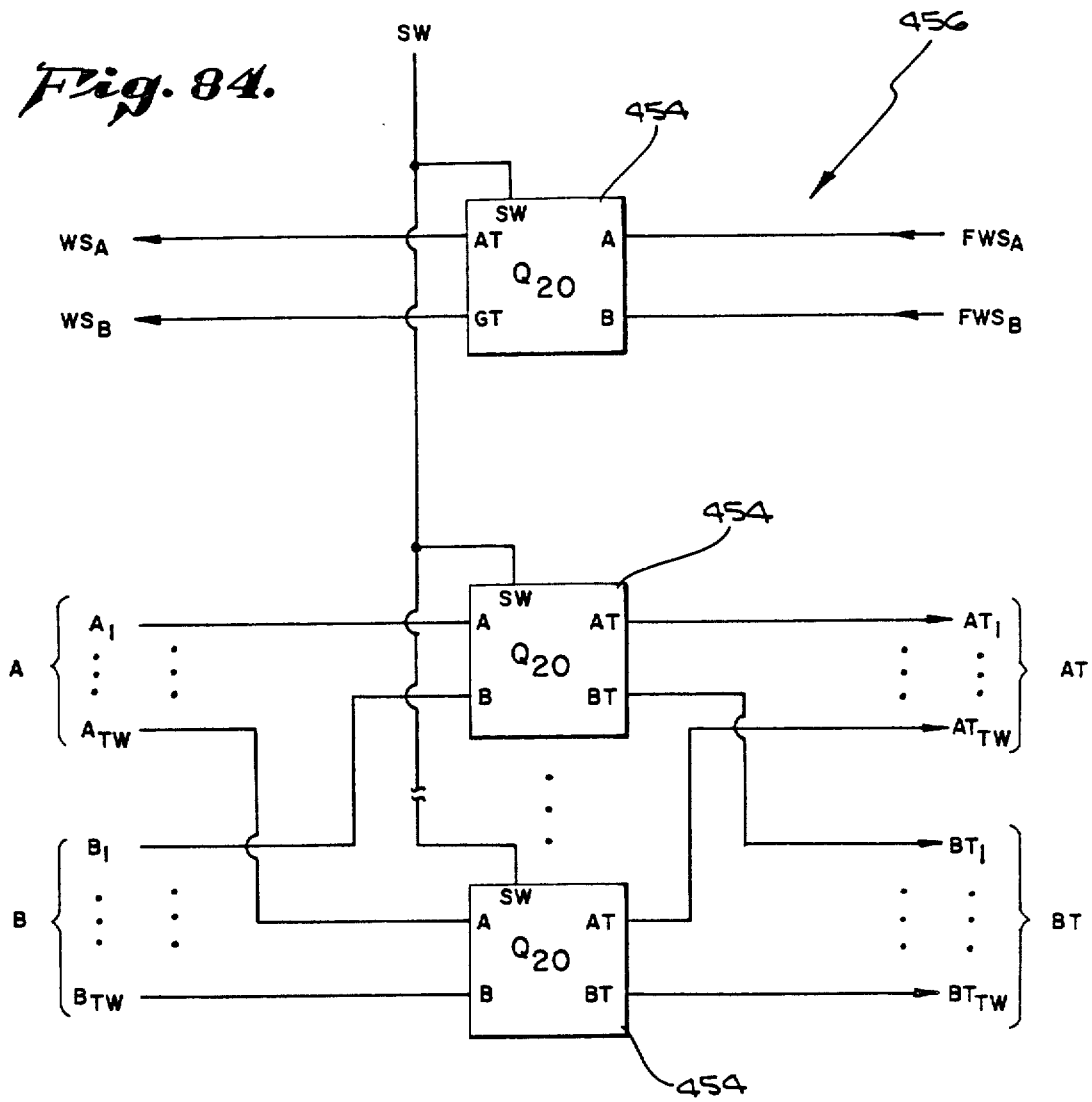
FIG. 84 shows circuit Q-21 which is a token-wide crossing switch circuit.
Figure 85:
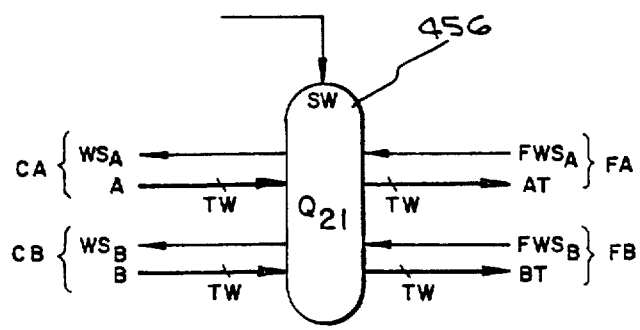
FIG. 85 shows the circuit of FIG. 84 in symbolic form.

Q-21: Token-Wide Crossing Switch. Generally indicated as 456 in FIG. 84 and shown in symbolic form in FIG. 85.

By placing TW Q-20s 454 facing the "forward" direction, and one facing the opposite direction, and grouping the inputs and outputs as shown, tying all SW inputs of the Q Os 454 together to make all Q-20s 454 switch in unison, one gets this token crossing switch with this function: If a token A (TW bits wide) and a token B are presented to the circuit, A will appear at AT and B will appear at BT if SW is false. But, if SW is true, A will appear at BT and B will appear at AT. The bit going in the reverse direction does the obvious thing. A bit FWSA will appear at WSA if SW is false, and FWSB will appear at WSB if SW is false. This is reversed if SW is true. The purpose of this reverse-direction bit will be clear looking at Q-22.

Figure 86:
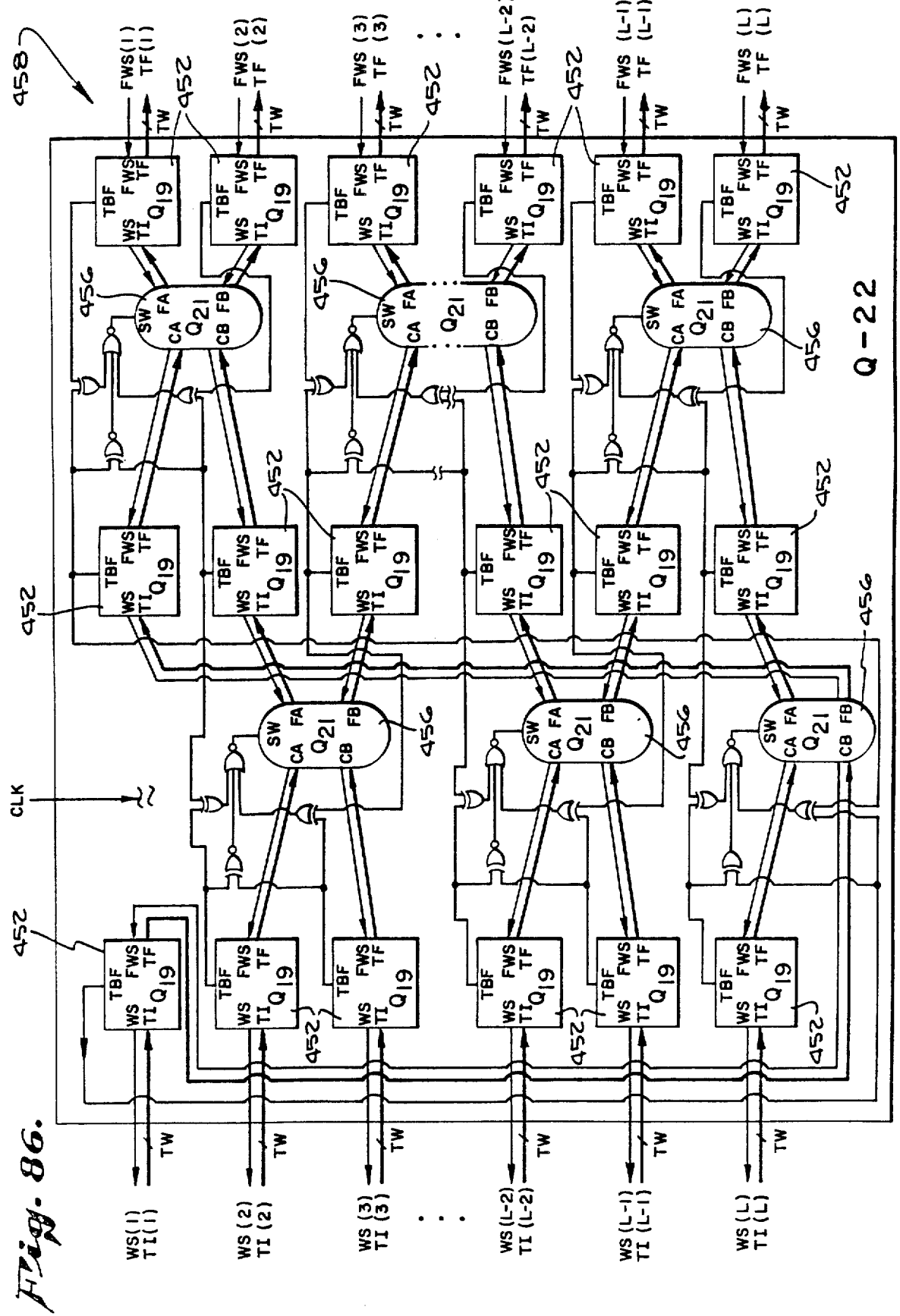
FIG. 86 shows circuit Q-22 which is an accordian store balancing stage circuit.

Q-22: Accordion Store Balancing Stage. Generally indicated as 458 in FIG. 86.

Q-19s 452 are arranged into a 3 by L matrix as shown. Then, L Q-21 circuits 456 are connected among them as shown. Consider any 2 by 2 submatrix which share a single Q-21 circuit 456. There are two Q-19s 452 "above" the Q-21 456 and two below it. The SW input of the Q-21 456 will be TRUE if: (a) the two above are either both non-empty (they both bear at least one token) or they are both empty; (b) the two below are either both non-empty or they are both empty; (c) the two above are non-empty while the two below are empty, or vice-versa. If SW is true, it is an indication that tokens are not distributed very well over the L columns of the accordion store, so SW will switch them in such a way so that on the next clock pulse, the rear-most pair will switch, so that after the pulse, although everything has moved forward one position, the load will probably be better balanced. The circuit has the property of only being able to try to balance the loading, and gains its effectiveness from the fact that the token queue proper (that section over the processors) does not shift forward on every pulse.

All Q-19 circuits 452 in the 3 by L matrix have their CLK input tied to a single source, which becomes the CLK input of Q-22 458.

Figure 87:
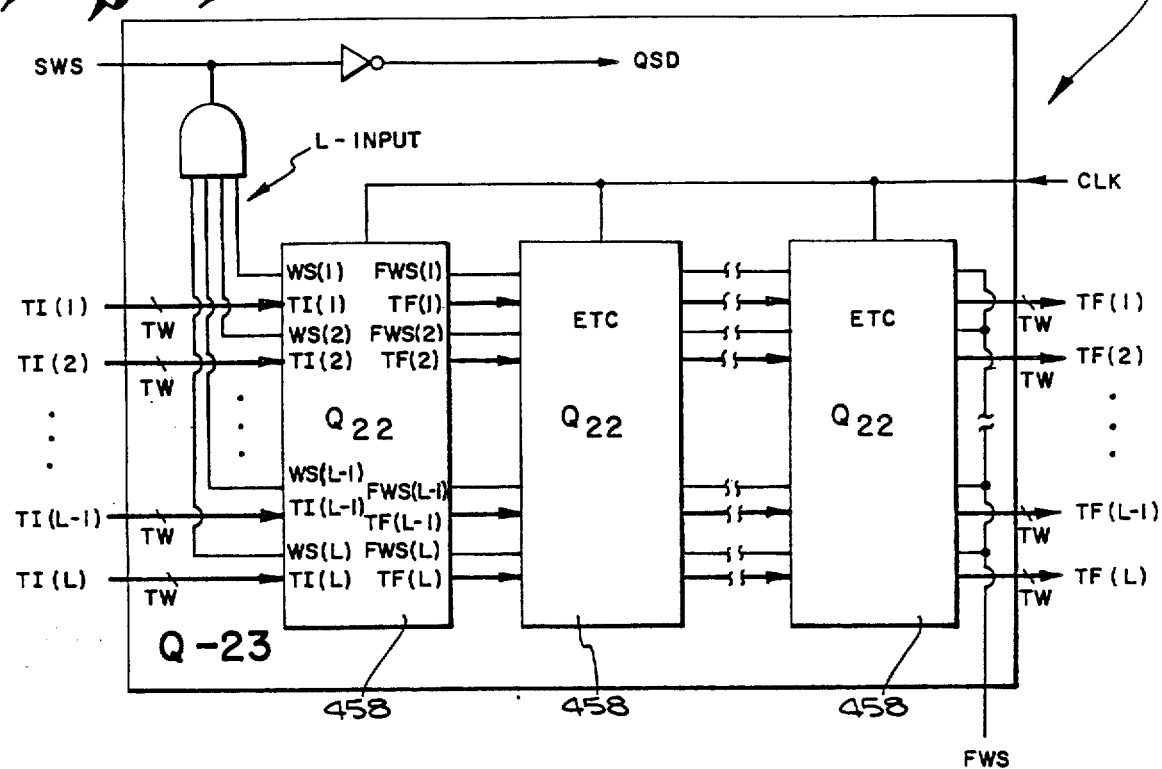
FIG. 87 shows circuit Q-23 which is an accordian store circuit.

Q-23: Accordion Store. Generally indicated as 460 in FIG. 87.

By connecting many Q-22s 458 as shown, the complete accordion store is formed. It is L columns wide, but its maximum internal capacity is (number of Q-18s 448 in each Q-19 452) times 3 times L times (number of Q-22s 458 in this Q-23 460) tokens. All WS (will shift) lines from the rearmost Q-22 458 are ANDed together so that SWS will be true only if ALL WS lines are true and all FWS inputs into the forward-most Q-22 458 are fed from a single line. QSD is a conservative declaration "queue section deadlocked", that is, this Q-23 460 will not shift in any new data, so that, effectively, it has become full. This is not necessarily an irrecoverable condition, but it is so close to it that this is as safe a means of declaring token queue deadlock as any.

Figure 88:
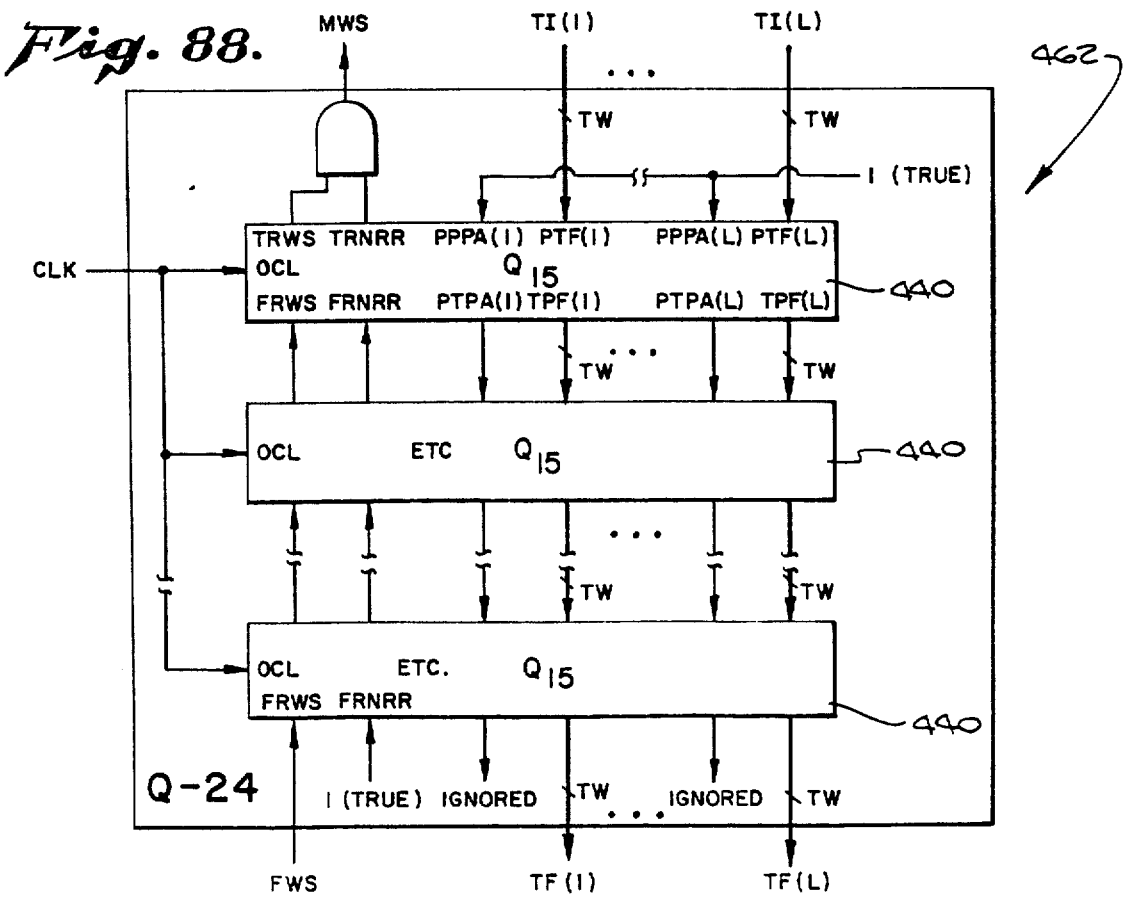
FIG. 88 shows circuit Q-24 which is a token queue proper circuit.

Q-24: Token Queue Proper. Generally indicated as 462 in FIG. 88.

Interconnecting Q-15 circuits 440 as shown forms the token queue proper, an arena of L by X token positions which are brought, row by row, to each row of processors. X Q-15 circuits 440 means that the total number of processors will be X times Y, as was the definition of the dimensions of the processor matrix. Output MWS (matrix will shift) is a unified output indicating that inputs TI(1) through TI(L) will be shifted into the token queue proper (if MWS is true). All Q-15s 440 are driven by the same clock.

Figure 89:
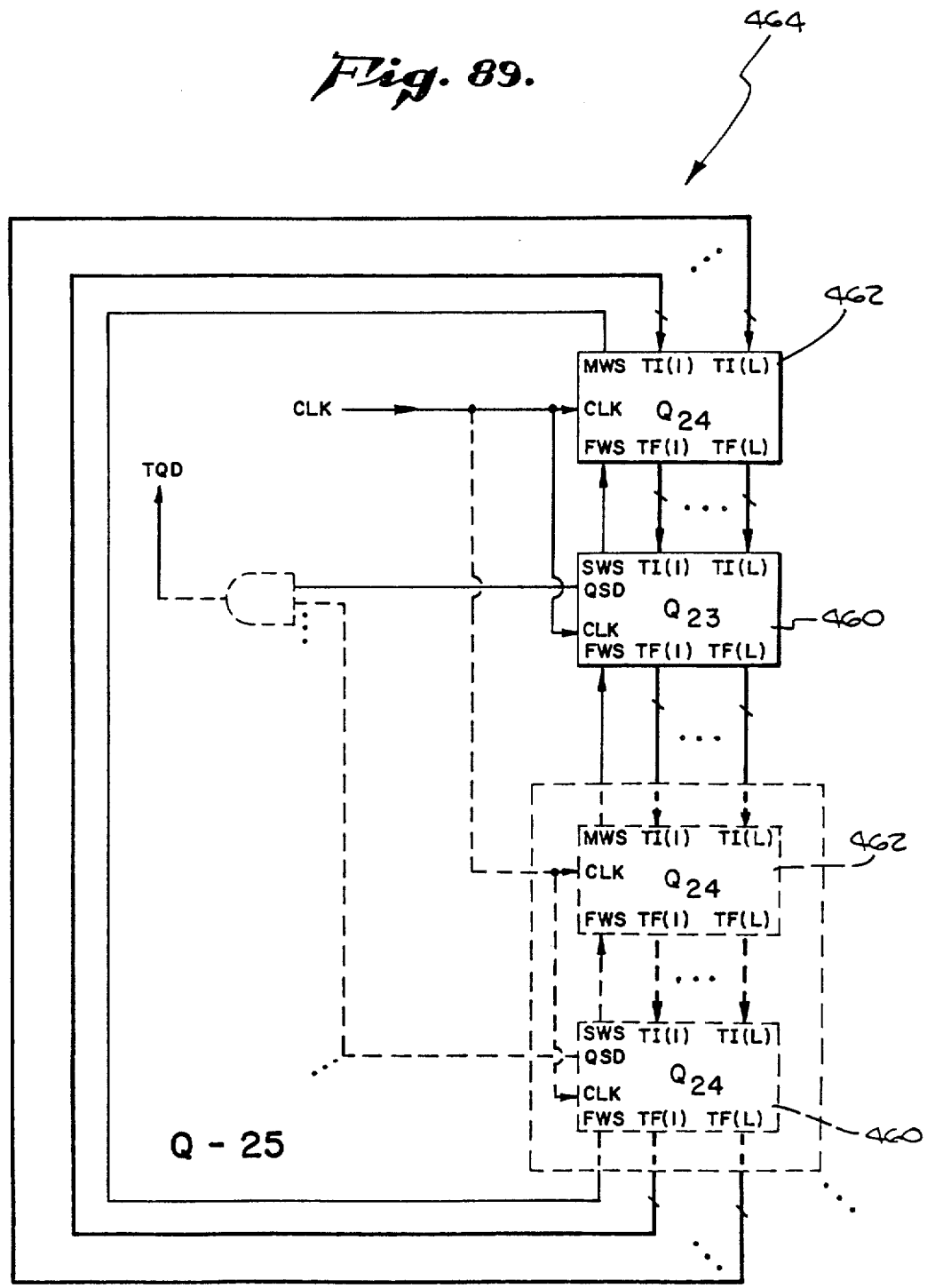
FIG. 89 shows circuit Q-25 which is a token queue complete circuit.

Q-25: Token Queue Complete. Generally indicated as 464 in FIG. 89.

By pairing a Q-23 460 with a Q-24 462 as shown and driving them off the same clock (the token queue clock), one has the complete token queue. It should be now clear that the token queue is circular.

The additional pair of Q-23/Q-24 460,462 in the dotted lines is meant to indicate that the first pair could conceivably be followed by one or more additional pairs, forming several sections of token-queue-proper separated by accordion stores. But, as Q-24 462 represents a matrix of processors as well, overall interconnections of these processors to the activity queue and the memory subsystem will determine the desireability of inserting these additional pairs of Q-23/Q-24's 460,462 into the token queue. At minimum, one of each is required, interconnected as shown. Both run from the same clock, and the TQD (token queue deadlock) would be used to indicate an irrecoverable system-wide condition, that is, token queue resource is full.

Improved Version

Figure 82:
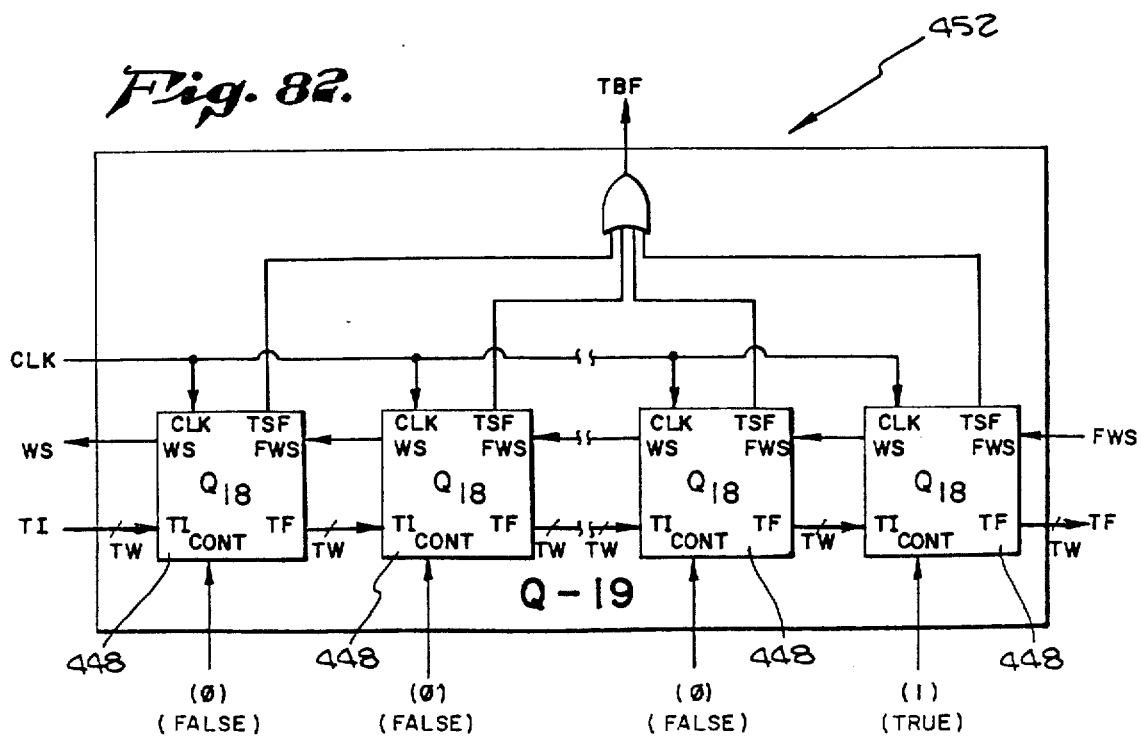
FIG. 82 shows circuit Q-19 which is a wait stage block circuit.

Regarding this fast-forward-propogation FIFO (the accordian store), important improvements should be incorporated whenever possible FIG. 82 (discussed earlier) shows the basic FIFO module without improvements. FIG. 95 shows basically the same module with the improvements, and this improved module should have general utility throughout the industry. There will be some discussion of its "stand-alone" applications in the discussion which follows.

The original module "Q-19" (see FIGS. 79-82 and the explanatory text, above) were designed using conceptual logic gates, that is, ignoring fanout and gate-delay considerations. Yet, in the application of this concept to a FIFO of any substantial size, gate-delay considerations cannot be ignored.

In those Figures, it will be seen that data will always pass through a simple 2:1 multiplexer at each stage. Even in the case of "bypassed" stages, each stage will introduce a multiplexer's gate delay. Consider one of these unimproved FIFO's which is completely empty (so that input data bypasses all latches and emerges at the output) and a clock pulse has just passed. The circuits at the input will probably want to change the input data. Ideally, this new data will appear immediately at the output of the far (last) stage. However, one can see that the data will experience the gate delays of every multiplexer in the FIFO. Suppose the FIFO was 1000 stages long, and the multiplexer delay was 20 nanoseconds; then, it would take 20 microseconds for the data being presented to the input (first) stage to propogate to the output (last) stage. This limits the performance of the circuit to 50 kilohertz, which is slow by anyone's standards.

Figure 79:
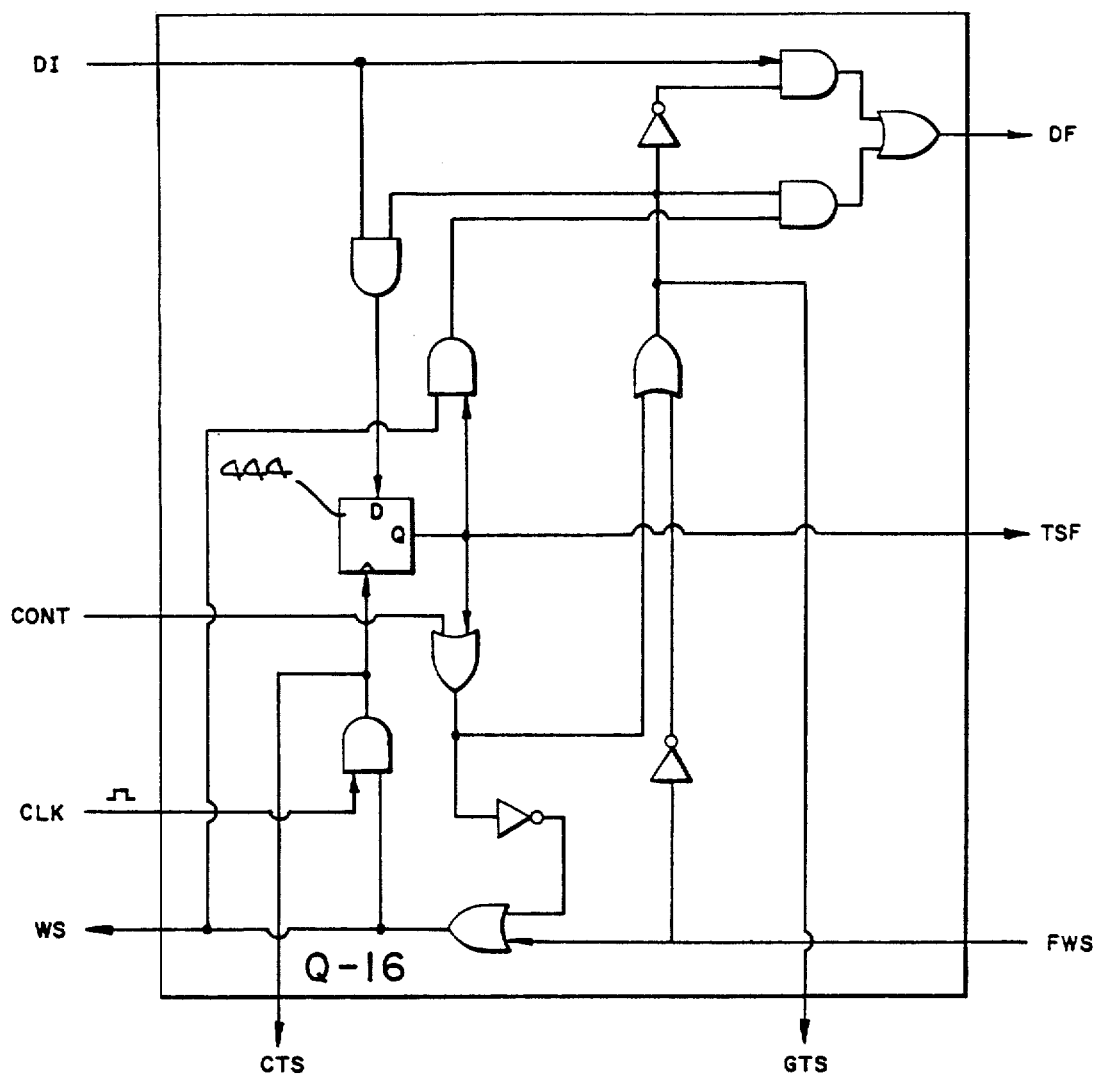
FIG. 79 shows circuit Q-16 which is a self-switching wait stage master bit circuit.

Consider also the lowest OR gate in "Q-16" of FIG. 79. Assume all stages of the FIFO are full (TSF=1); and the FWS input at the output stage (the rightmost "Q-18" module in FIG. 82) is switched from zero to one. For that logic-one to propogate all the way to the WS output of the input stage (the leftmost "Q-18" module in FIG. 82) it must ripple through that OR gate in each stage of the FIFO. The gate delays of the OR gates add together, effectively reducing the operating speed of the device.

Both of these chains of gates (the multiplexers in the "forward" direction, and the OR gates in the "reverse" direction) must be overcome, to some degree, in any effective implementation of the device. Refer now to FIGS. 90-95, which are, basically, the above-referenced circuits modified to incorporate the improvements necessary to remove these delays.

To remove the effect of the chain of OR gates, first notice that in FIG. 79 this OR gate was responsible for generating WS for this stage. Refer to FIG. 101, which is an expanded FIG. 22 for the improved device. We will ignore master bit states E, F, G, and H since these can occur only for the output stage of the FIFO. All other stages in the FIFO can take on only states A, B, C, and D (their CONT input is tied low). With CONT tied low, it should be clear that WS will be a function of only two variables: (1) the state of the latch (=Q, =TSF) which itself is not dependent, within any one clock period, on any other logic signal in the FIFO; and, (2) on FWS entering the stage, completely beyond the influence of any other status within this master bit.

Then, if we can assume that Q is set properly immediately after a clock pulse, we need not worry about the generation of WS in cases B and D, where the latch is empty after the clock, since WS is generated within the stage, forcing a logic one onto the upper input of the OR gate; and, in this case, it does not matter if the lower input is subject to some accumulating delay or not, since the logic one on the upper input has already forced the output high, leaving WS properly generated.

The problem comes when, just after a clock pulse, Q has become one, that is, the stage has become full. At that moment, what is happening on the FWS/WS chain is very important, and to solve the problem, some overall observations of a FIFO in actual operation have to be made. Notice that "full" stages always "pile up" toward the output end of the FIFO, and the following always occurs in those cases: all of the full stages are either always all in state A; that is, moving forward, or else they are always all in state C; that is, frozen. The variable which controls them, then, is simply whether or not the overall pipeline is free to move or not, and that is controlled by the FWS input into the forward-most (output) stage of the FIFO. A bus from that input would provide the control signal needed, then, since full stages all require the FWS presented to the forwardmost stage.

Figure 90:
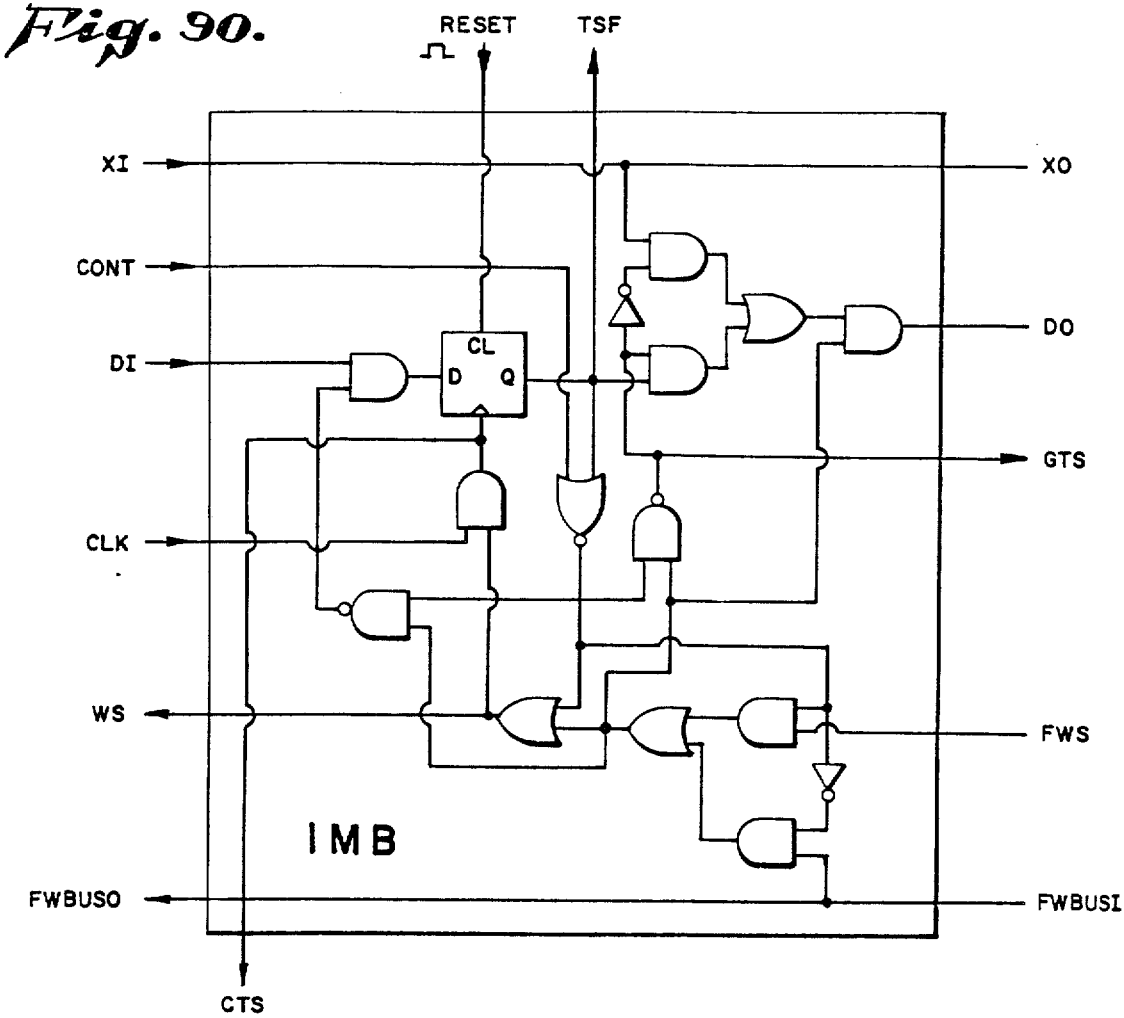
Figure 91:
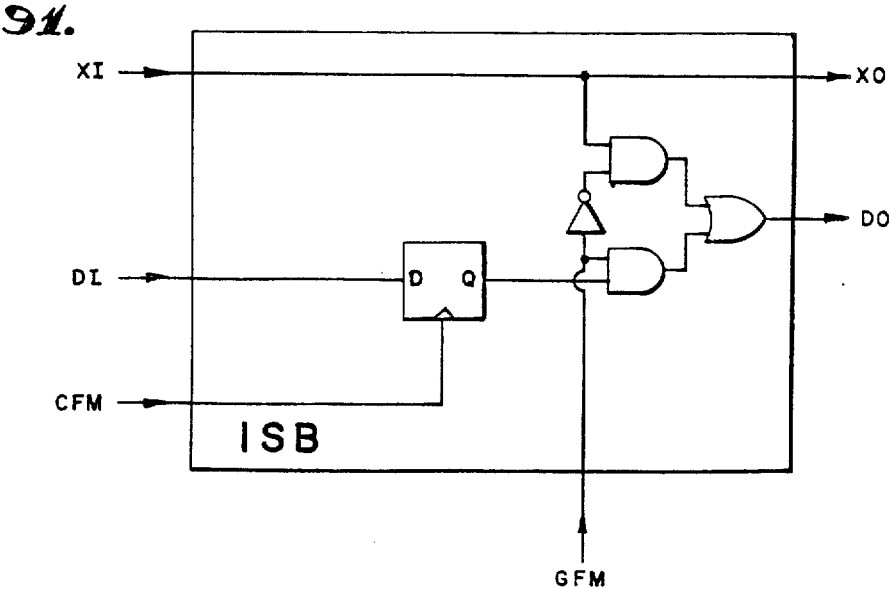

This improvement is embodied in FIG. 90, which is an improved master bit, with a 2:1 multiplexer (lower right of the figure) choosing one of two inputs for the effective FWS used in the bit's logic: (a) an incoming FWS from the preceding stage, as before, of (b) a tap onto a bus indicated by FWBUSI/FWBUSO. When the stage is empty (TSF+0), the multiplexer selects external input FWS and this signal helps the master bit determine whether it should settle into state B or D; but, as discussed earlier, output WS has already been determined so that chained gate delays are not the concern in this case.

However, when the stage is full (TSF=1), then the signal FWBUSI/FWBUSO is brought into the master bit's logic. Note that bus FWBUSI/FWBUSO is simply a conductor, and drawn as it is only for the sake of clarity in subsequent Figures. All stages in the overall FIFO will tap into this conductor once, and therefore the implementor must take care to buffer this bus in some manner, as technology requires. As shall be seen, FWBUSI of the output (rightmost) stage of a complete FIFO is the same as FWS of that stage.

The next propogation problem, that of the multiplexers in the data path DI/DO, can be solved by a similar bus approach. FIG. 90 shows the plan of attack; whereas the upper AND gate of the upper multiplexer used to get its input directly from input "DI" (see FIG. 79), it now taps a bus XI/XO. A similar change must also be made on the slave bits; the improvement is apparent in FIG. 91. Again, buffering of the XI/XO busses is left to the implementor.

A complete improved FIFO stage is constructed in a manner similar to that of "Q-18" (see FIG. 81) but there are now three distinct cases to construct:

(a) a basic stage (one internal to the data path);

(b) an input stage (the one facing input into the FIFO); and (c) an output stage (the forwardmost stage in the FIFO).

Figure 92:
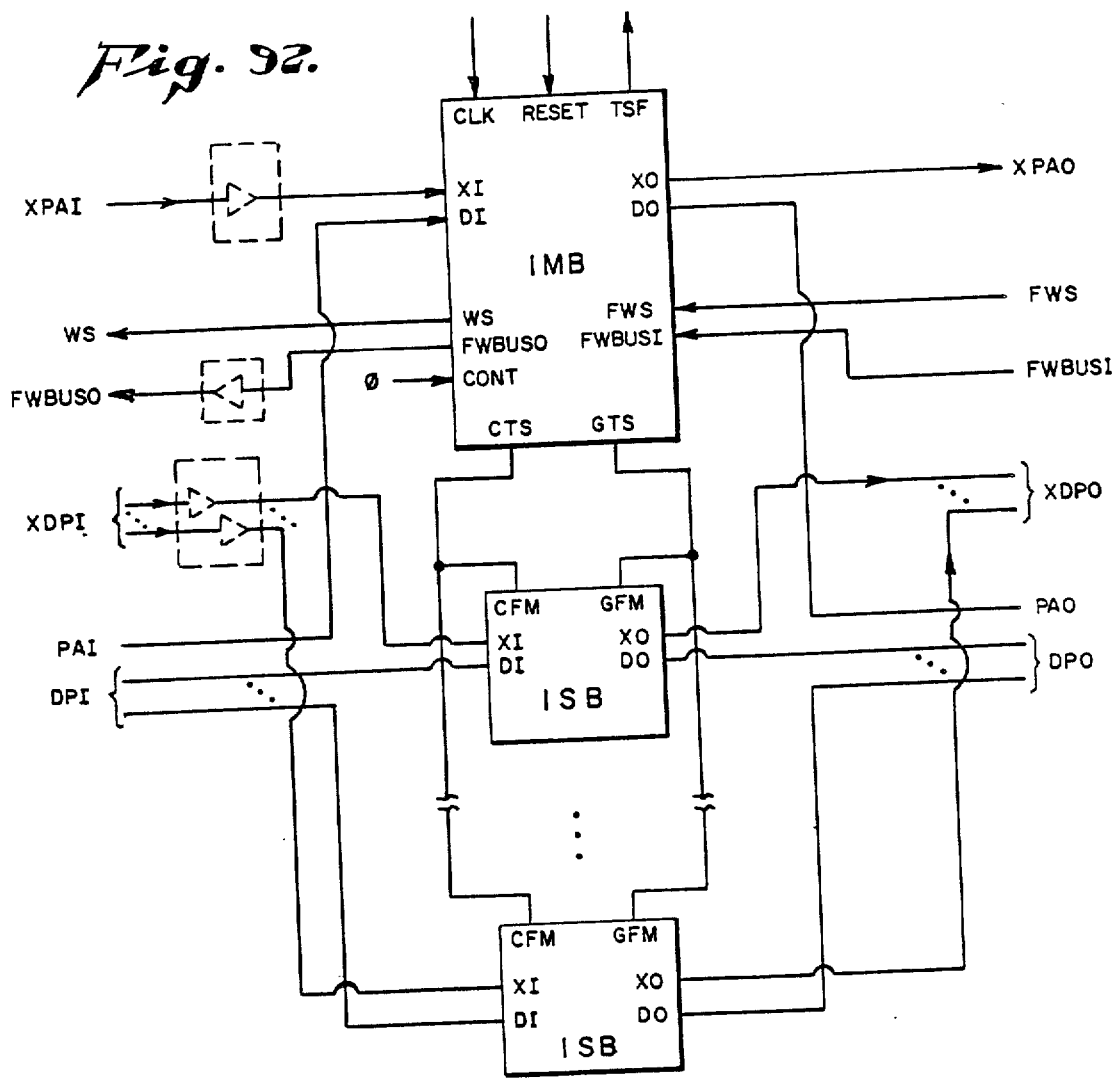
Figure 97:
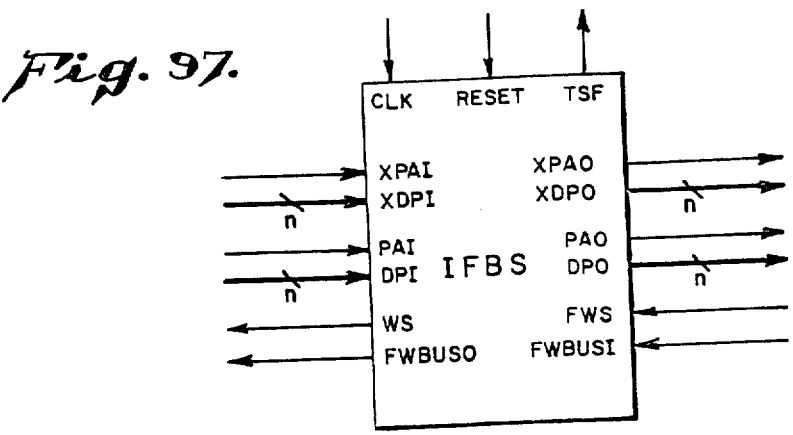
FIGS. 97-99 are symbolic representations of the circuits of 92-94.
Figure 93:
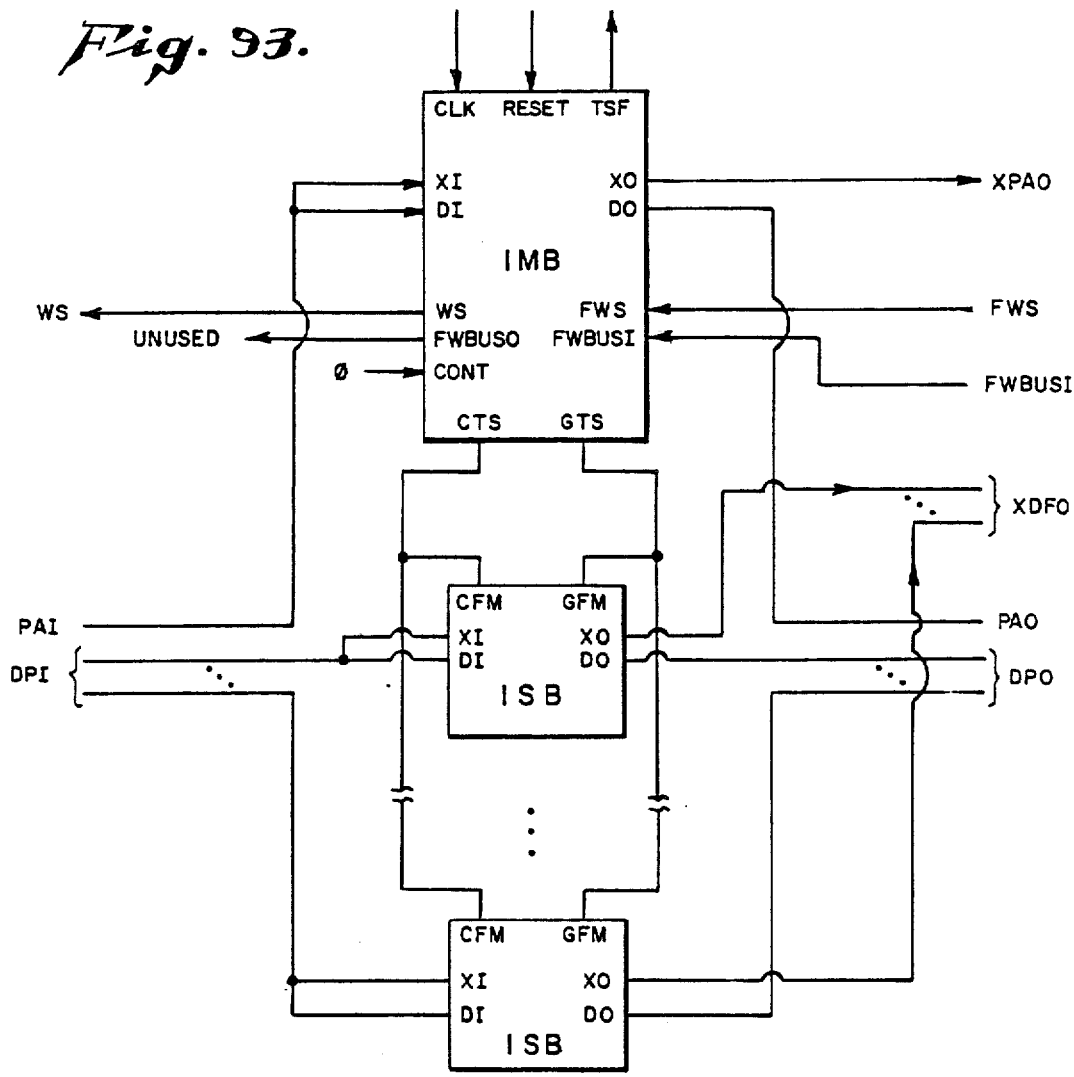
Figure 98:
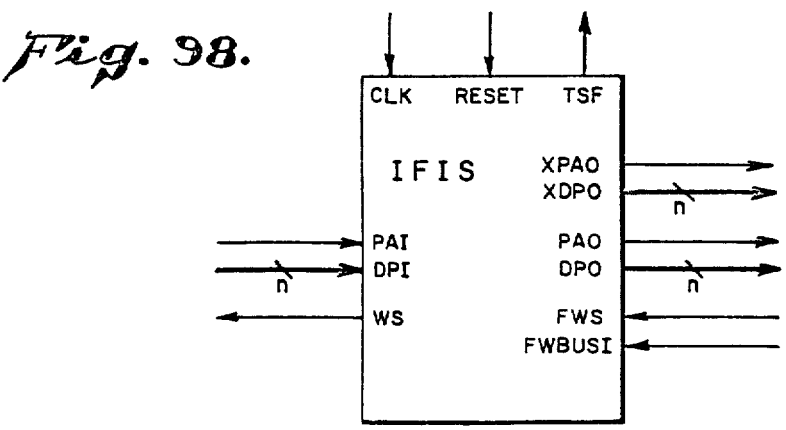
Figure 94:
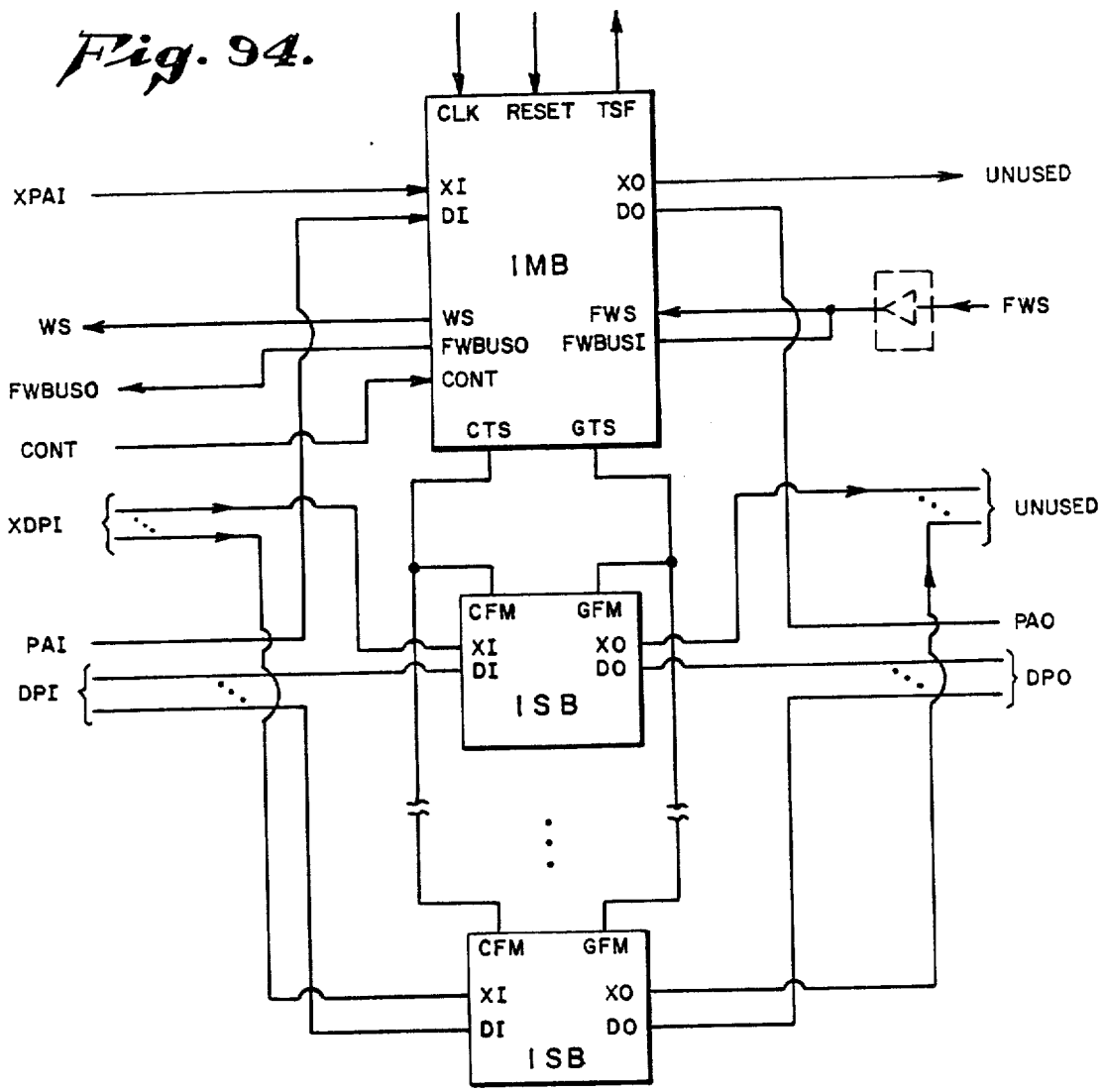
Figure 99:
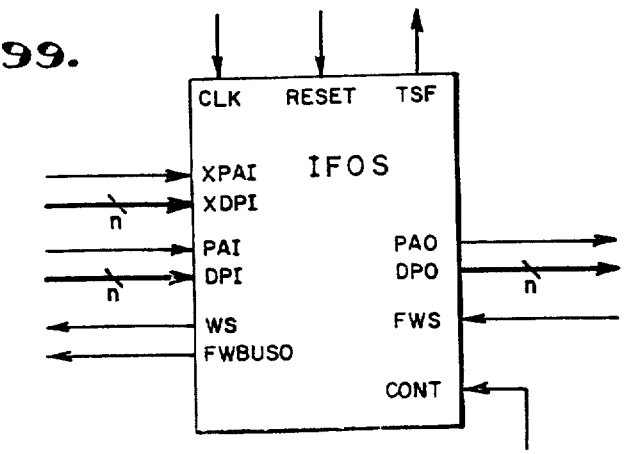

These three are similar in most respects, and shown in FIGS. 92, 93, and 94 respectively. The symbolic representations appear as FIGS. 97, 98, and 99, respectively.

FIG. 92 shows the improved basic stage. It differs over the unimproved stage in the presence of busses XPAI/XPAO, XDPI/XDPO, and FWBUSI/FWBUSO. CONT has been tied low internally so need not be brought out to the module's external inputs. Buffers have been indicated in dotted lines mainly to remind the implementor that these busses must be properly buffered in some manner.

FIG. 93 shows the single input stage of the FIFO, and shows that the XI and DI of the master bit both are derived from module input PAI; similarly for the data bit inputs. Output FWBUSO of the master bit is unused, as that bus has served its purpose at this point. Input CONT is tied low internally.

FIG. 94 is the single output stage of the FIFO. The XO outputs of all of the bits are ignored, as the busses represented by them have served their purpose by this point. FWS and FWBUSI inputs into the master bit are both derived form module input FWS. Input CONT is brought out as an external control.

FIG. 95 shows the construction of the improved FIFO. The CONT input of the output stage becomes the FIFO's FCONT input (in FIG. 82 this input would be tied high). The reader will notice that the external appearance of this FIFO is similar to that of the unimproved one (FIG. 82) except for cosmetic differences and the explicit appearance of the RESET line. The performance of this improved FIFO, however, is vastly improved over that of FIG. 82's performance. Once again, the implementor can see the need for proper buffering of the RESET and CLK lines. A well-buffered FIFO is one in which any bussed signal, including CLK and RESET, permits any change in that signal to be "felt" by all FIFO stages at the same moment (as opposed to the effect "rippling down" the stages, which would occur if the "bus" concept were taken too literally and the signals were linearly buffered).

Figure 96:
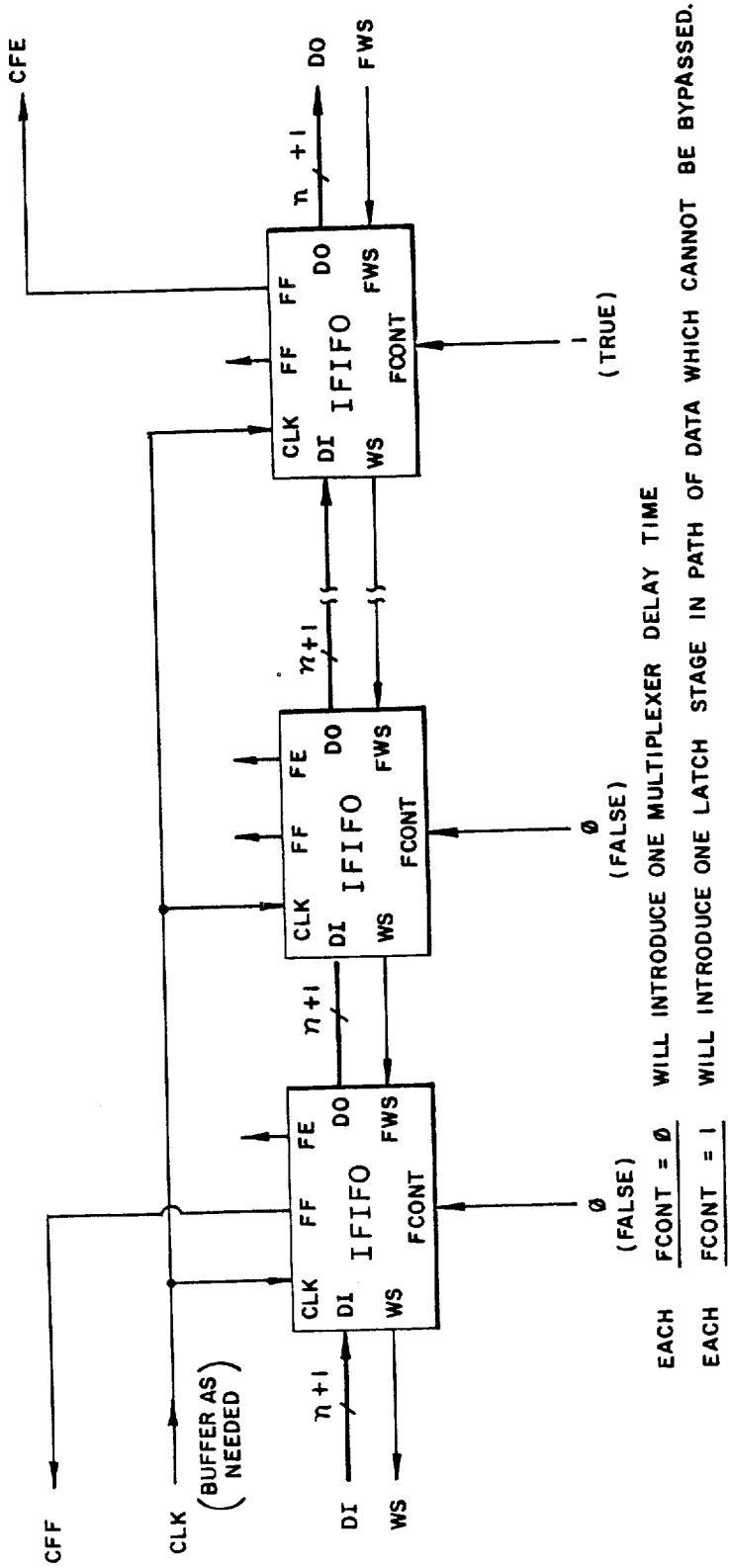
FIG. 96 is a block diagram showing the improved FIFO of FIG. 9 hooked up to form a longer FIFO.

The improved FIFO of FIG. 95 can be hooked up to form longer FIFOs, as demonstrated in FIG. 96. This provides an opportunity to explain the utility of the basic improved FIFO's "FCONT" signal. Consider a composite FIFO (as the one in FIG. 96) composed of ten basic FIFO's (from FIG. 95) in series. Assume each basic FIFO has an overall gate delay of 1 microsecond. If all ten FCONT inputs are tied low, the composite FIFO would have an overall gate delay of ten microseconds, so that the composite could not run faster than 200 kilohertz.

Now, if one reviews FIGS. 90 through 95, it will be seen that if FCONT is tied HIGH, the output stage of a basic FIFO will always place its latch in the data path, not only to latch valid data, but to latch "empty" information as well. Consider again the composite FIFO ten basic FIFO's long, with all of their FCONT inputs tied high. There are now ten latch stages in the overall composite FIFO which cannot be bypassed. But consider what this implies: since data cannot move from the input FIFO to the output (tenth) FIFO in one instant, then the clock can run at one megahertz (which is the operating speed of a single FIFO), since at this speed there is sufficient time to meet the one-microsecond delay requirements of the longest data path in the composite, namely, one end of a single FIFO to the other end of that same FIFO. With all FCONTs tied low, we had to run at 100 kHz because the longest data path was from the input of the input FIFO to the output of the output FIFO (ten FIFO's away).

The gain is that the input of the overall composite FIFO can now accept data ten times as fast as it could with the FCONT's tied low. The price paid is that the output end of the composite FIFO will emit "empty" data even though there may be valid data present within the composite. A true data event is always ten clock pulses removed from the output of the composite FIFO; but note that the clock is now running ten times as fast as it was before. Overall, there is no free ride. FCONT permits the builders of composite FIFOs to trade off various clock speeds against an increased number of "empty" data events.

The table of FIG. 101 is provided to show how a basic stage responds to the three independent variables TSF ($=$Q of the master bit for that stage), FWS (forward stage will shift) and CONT (see FIG. 90). Case A is the standard synchronous FIFO's "forward march" behavior. Case C is the "freeze" feature of the present invention. By throwing CONT$=$1, the basic stage will always behave as if it was either case A or case C. That is, either it will do a common forward march, or else it will freeze. This means that it responds solely to input FWS (forward stage will shift).

The superior performance of the present invention is the data bypass (case B) and the introduce-a-latch case (case D). These states are eliminated from any stage having CONT$=$1, that is, the "accordion" feature of the invention is eliminated, and it behaves as if the latch was always intervening in the data path. Except for the "freeze" feature, this turns it back into a common FIFO. Yet, as one can see from the discussion of FIG. 96, the users of the present invention may want to call on this option to tailor the invention to their needs.

Wherefore, having thus described my invention, I claim:

1. In a queue structure having FIFO organization comprising a plurality of stages into which data can be placed at input points and means for removing data at a plurality of output points from said queue structure upon the occurrence of respective clock pulses of a clock line to which it is synchronized and by which it is driven, the improvement comprising:
   (a) status means for indicating the presence of data in said stages and interconnecting the stages for passing the status of each stage in the queue to the stage in front of it and behind it between the clock pulses;
   (b) shifting means within each stage interconnecting the stages for shifting data between stages toward the output points over unused stages between clock pulses using combinatorial logic whereby the availability of data at the output points during the clock pulses is increased;
   (c) at least one backward combinatorial logic circuit and at least one forward combinatorial logic circuit housed within each stage, the backward and forward combinatorial logic circuits being bidirectionally linked to each for data transfer and to said data shifting means;
   (d) each of said combinatorial logic circuits being connected to at least one other of said stages, said forward logic circuit being linked to at least a forward stage and said backward logic circuit being linked to at least a forward stage, and said backward logic circuit being linked to at least a preceding stage, each logic circuit being so linked by stage-connecting signal paths; and
   (e) said shifting means including: (1) a plurality of shaft latches within each stage, each latch capable of storing at least one data bit; (2) a plurality of bypass lines within each stage for bypassing said shift latches; and (3) a plurality of data lines connecting said shift latches and bypass lines to adjoining forward and backward other of said stages.

2. The queue structure of claim 1 wherein the shifting means further includes:
   a first set of input ports for receiving gating signals from said status means, said gating signals controlling the flow of data through said shifting means, said gating signals determined by said backward and forward combinatorial logic circuits of said status means; and,
   a second set of input ports for receiving a clocked signal from said status means, so that movement of data bits through said shift latch is synchronized with movement of data through said status means.

3. In a queue structure having FIFO organization comprising a plurality of stages into which data can be placed at input points and from which data can be removed at output points upon the occurrence of respective clock pulses of a clock line to which it is synchronized and by which it is driven, the improvement comprising:
- (a) status means for indicating the presence of data in said stages, and interconnecting the stages for passing the status of each stage in the queue to the stage in front of it and behind it between the clock pulses;
- (b) shifting means within each stage interconnecting the stages for shifting data between stages toward the output points over unused stages between clock pulses using combinatorial logic whereby the availability of data at the output points during the clock pulses is increased;
- (c) at least one backward combinatorial logic circuit and at least one forward combinatorial logic circuit housed within each stage, the backward and forward combinatorial logic circuits being bidirectionally linked to each other for data transfer and to said data shifting means;
- (d) each of said combinatorial logic circuits being connected to at least one other of said stages, said forward logic circuit being linked to at least a forward stage, and said backward logic circuit being linked to at least a preceding stage, each logic circuit being so linked by stage-connecting signal paths; and
- (e) each of the forward and backward combinatorial logic circuits housed within each stage of said plurality of stages comprising: (1) a data latch which stores data and is capable of shifting this data to said forward stage according to the command of a clock signal; (2) input ports for receiving signals indicative of whether adjacent forward stage is available to receive said data; and (3) output ports which indicate to said adjacent preceding stage that the stage, which houses the combinatorial logic circuit, is available to receive new data input signals, whereby data may be stored in said data latch and retained therein until the adjacent forward stage is available to receive said data; and new data is not received from the adjacent preceding stage until the data latch is available to store the new data.

4. The queue structure of claim 3 which further includes a means for bypassing data through one stage and around the data latch resident in this stage directly to the adjacent forward stage; whereby data may be rapidly propagated through said plurality of stages, said bypassing means allowing said data to skip any of said plurality of stages having data latches cleared of data.

5. The queue structure of claim 4 including an input port which provides a control signal to the first stage, said control signal controlling propagation of data into said first stage such that said control signal will insure that data input into said first stage will not bypass said data latch when said control signal equal Logic One.

6. In a queue structure having FIFO organization comprising a plurality of stages into which data can be placed at input points and from which data can be removed at output points upon the occurrence of respective clock pulses of a clock line to which it is synchronized and by which it is driven, the improvement comprising:
- (a) status means for indicating the presence of data in said stages and interconnecting the stages for passing the status of each stage in the queue to the stage in front of it and behind it between the clock pulses;
- (b) shifting means within each stage interconnecting the stages for shifting data between stages toward the output points over unused stages between clock pulses using combinatorial logic whereby the availability of data at the output points during the clock pulses is increased;
- (c) at least one backward combinatorial logic circuit and at least one forward combinatorial logic circuit housed within each stage, the backward and forward combinatorial logic circuits being bidirectionally linked to each other for data transfer and to said data shifting means;
- (d) each of said combinatorial logic circuits being connected to at least one other of said stages, said forward logic circuit being linked to at least a forward stage, and said backward logic circuit being linked to at least a preceding stage, each logic circuit being so linked by stage-connecting signal paths; and
- (e) the plurality of stages being linked to one another in a manner such that, for a plurality of N stages, a first stage is linked to a second stage, the second stage linked to a next adjacent forward stage, until an Nth stage is reached, wherein the output of the Nth stage is linked back to the input of the first stage, forming a circular queue structure, where data may be passed stage to stage around the queue structure, and back to the first stage; so that, data may dynamically circulate within the queue structure.

7. The queue structure of claim 6, which further includes means to access said circular queue structure, said access means being linked to circuitry outside the circular queue structure and said queue structure, so that data which circulates in said queue structure may be accessed and transmitted to said circuitry outside the stages of the circular queue structure.

8. In a queue structure having FIFO organization comprising a plurality of stages into which data can be placed at input points and from which data can be removed at output points upon the occurrence of respective clock pulses of a clock line to which it is synchronized and by which it is driven, the improvement comprising:
- (a) status means for indicating the presence of data in said stages, and interconnecting the stages for passing the status of each stage in the queue to the stage in front of it and behind it between the clock pulses;
- (b) shifting means within each stage interconnecting the stages for shifting data between stages toward the output points over unused stages between clock pulses using combinatorial logic whereby the availability of data at the output points during the clock pulses is increased;
- (c) at least one backward combinatorial logic circuit and at least one forward combinatorial logic circuit housed within each stage, the backward and forward combinatorial logic circuits being bidirectionally linked to each other for data transfer and to said data shifting means;
- (d) each of said combinatorial logic circuits being connected to at least one other of said stages, said forward logic circuit being linked to at least a forward stage, and said backward logic circuit being linked to at least a preceding stage, each logic circuit being so linked by stage-connecting signal paths; and (e) supplemental bus means interconnecting the stages for significantly reducing delays in transmitting information from stage to stage, said supplemental bus means including means for indicating when data is being removed from the queue structure.

9. In a circular queue structure having FIFO organization comprising a plurality of stages into which data can be placed at input points and from which data can be removed at output points upon the occurrence of respective clock pulses of a clock line to which it is synchronized and by which it is driven, the improvement comprising:

(a) status means for indicating the presence of data in said stages and interconnecting the stages for passing the status of each stage in the queue to the stage in front of it and behind it between the clock pulses;

(b) shifting means within each stage interconnecting the stages for shifting data between stages toward the output points over unused stages between clock pulses using combinatorial logic whereby the availability of data at the output points during the clock pulses is increased;

(c) said stages being connected to form a continuous circular queue with the output of each stage being coupled to the input of another stage;

(d) means for tagging data circulating in said queue to uniquely identify the data with preselected tags; and (e) means for selectively outputting, from said queue, data uniquely identified with said preselected tags.

10. A queue structure as defined in claim 9 including a plurality of input points and a plurality of output points from said queue.

* * * * *